(12) United States Patent
Lee

(10) Patent No.: US 11,252,405 B2
(45) Date of Patent: Feb. 15, 2022

(54) IMAGE SIGNAL ENCODING/DECODING METHOD AND APPARATUS THEREFOR

(71) Applicant: GUANGDONG OPPO MOBILE TELECOMMUNICATIONS CORP., LTD., Guangdong (CN)

(72) Inventor: Bae Keun Lee, Seongnam-si (KR)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/221,669

(22) Filed: Apr. 2, 2021

(65) Prior Publication Data

US 2021/0227212 A1    Jul. 22, 2021

Related U.S. Application Data

(63) Continuation of application No. PCT/KR2019/015097, filed on Nov. 7, 2019.

(30) Foreign Application Priority Data

Nov. 8, 2018 (KR) .................. 10-2018-0136256
Nov. 27, 2018 (KR) .................. 10-2018-0148948

(51) Int. Cl.
*H04N 19/105* (2014.01)
*H04N 19/132* (2014.01)
*H04N 19/159* (2014.01)
*H04N 19/176* (2014.01)

(52) U.S. Cl.
CPC ......... *H04N 19/105* (2014.11); *H04N 19/132* (2014.11); *H04N 19/159* (2014.11); *H04N 19/176* (2014.11)

(58) Field of Classification Search
CPC .. H04N 19/105; H04N 19/132; H04N 19/159; H04N 19/176
See application file for complete search history.

(56) References Cited

U.S. PATENT DOCUMENTS

| 2007/0047648 A1 | 3/2007 | Tourapis et al. |
| 2007/0098067 A1 | 5/2007 | Kim et al. |

(Continued)

FOREIGN PATENT DOCUMENTS

| KR | 20070047522 A | 5/2007 |
| KR | 20170084055 A | 7/2017 |

(Continued)

OTHER PUBLICATIONS

International Search Report dated Feb. 11, 2020 cited in PCT/KR2019/015097.

(Continued)

*Primary Examiner* — Hesham K Abouzahra
(74) *Attorney, Agent, or Firm* — Perkins Coie LLP

(57) ABSTRACT

An image decoding method according to the present disclosure may include the steps of: determining whether a combined prediction mode is applied to a current block; when the combined prediction mode is applied to the current block, obtaining first and second prediction blocks with respect to the current block; and, on the basis of a calculation of a weighted sum of the first and second prediction blocks, obtaining a third prediction block with respect to the current block.

20 Claims, 29 Drawing Sheets

(56) References Cited

U.S. PATENT DOCUMENTS

2018/0288410 A1\* 10/2018 Park .................. H04N 19/105
2018/0359470 A1\* 12/2018 Lee ................... H04N 19/176

FOREIGN PATENT DOCUMENTS

| KR | 20180041211 A | 4/2018 |
| KR | 20180085714 A | 7/2018 |
| RU | 2595949 C2 | 8/2016 |
| WO | 2017105097 A1 | 6/2017 |

OTHER PUBLICATIONS

Extended European Search Report for European Application No. 19882020.1 dated Oct. 28, 2021. 10 pages.
First Office Action for Russian Application 2021113748 dated Aug. 27, 2021. 12 pages with English translation.
MediaTek Inc. "CE10.1.1: Multi-hypothesis prediction for improving AMVP mode, skip or merge mode, and intra mode" JVET-L0100-v1; ITU-T SG 16 WP 3 & ISO/IEC JTC 1/SC 29/WG 11; Oct. 3-12, 2018. 13 pages.
MediaTek Inc. "CE10-related: Syntax redundancy removal in triangle prediction" JVET-M0185v1; ITU-T SG 16 WP 3 and ISO/IEC JTC 1/SC 29/WG11; Jan. 9-18, 2019. 3 pages.
Qualcomm Inc. "CE1-: CIIP with position-independent weights (Test CE10-1.1)" JVET-N0302_v1; ITU-T SG 16 WP3 and ISO/IEC JTC 1/SC 29/WG 11; Mar. 19-27, 2019. 3 pages.

\* cited by examiner

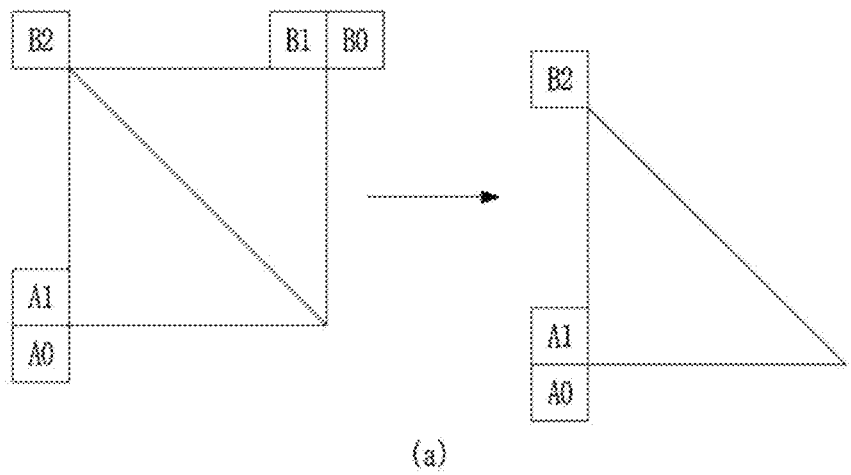
(a)
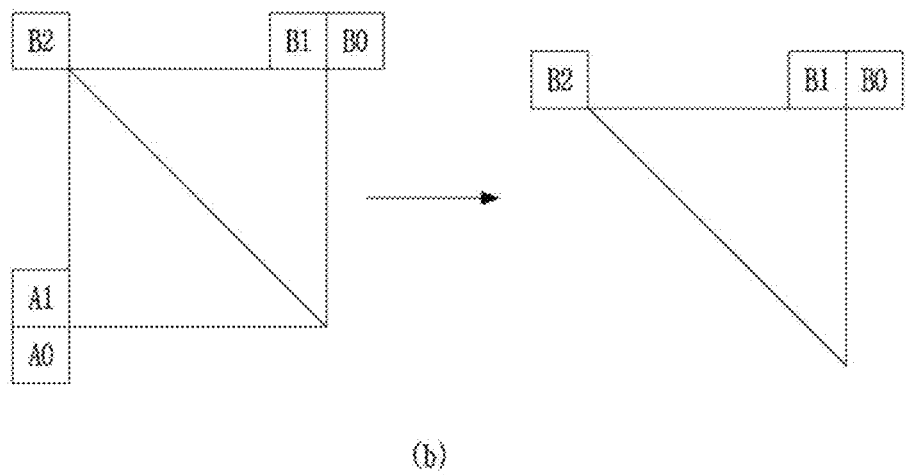
(b)
Fig. 17

| First subblock weighting value w=2 | Second subblock weighting value w=3 |
|---|---|
| Third subblock weighting value w=5 | Fourth subblock weighting value w=6 |

Unidirectional prediction (U)

(a)

| First subblock weighting value w=3 | Second subblock weighting value w=4 |
|---|---|
| Third subblock weighting value w=6 | Fourth subblock weighting value w=7 |

Bidirectional prediction (B)

1×4 subblock, Number of horizontal direction non-zero coefficients : 2

1×4 subblock, Number of horizontal direction non-zero coefficients : 1
Maximum number of horizontal direction non-zero coefficients : 2

(b)

4×1 subblock, Number of vertical direction non-zero coefficients : 3

4×1 subblock, Number of vertical direction non-zero coefficients : 1
Maximum number of vertical direction non-zero coefficients : 3

*Fig. 38*

IMAGE SIGNAL ENCODING/DECODING METHOD AND APPARATUS THEREFOR

CROSS-REFERENCE TO RELATED APPLICATION

The present application is a continuation application of International Application No. PCT/KR2019/015097, filed on Nov. 7, 2019, which claims priorities to KR Patent Application 10-2018-0136256, filed on Nov. 8, 2018, and KR Patent Application 10-2018-0148948, filed on Nov. 27, 2018. The present application claims priority and the benefit of the above-identified applications and the above-identified applications are incorporated by reference herein in their entireties.

TECHNICAL FIELD

The present disclosure relates to a video signal encoding and decoding method and an apparatus therefor.

BACKGROUND

As display panels are getting bigger and bigger, video services of further higher quality are required more and more. The biggest problem of high-definition video services is significant increase in data volume, and to solve this problem, studies for improving the video compression rate are actively conducted. As a representative example, the Motion Picture Experts Group (MPEG) and the Video Coding Experts Group (VCEG) under the International Telecommunication Union-Telecommunication (ITU-T) have formed the Joint Collaborative Team on Video Coding (JCT-VC) in 2009. The JCT-VC has proposed High Efficiency Video Coding (HEVC), which is a video compression standard having a compression performance about twice as high as the compression performance of H.264/AVC, and it is approved as a standard on Jan. 25, 2013. With rapid advancement in the high-definition video services, performance of the HEVC gradually reveals its limitations.

SUMMARY

An object of the present disclosure is to provide a combined prediction method that combines a plurality of prediction methods in encoding/decoding a video signal, and an apparatus for performing the method.

An object of the present disclosure is to provide a method of partitioning a coding block into a plurality of prediction units in encoding/decoding a video signal, and an apparatus for performing the method.

The technical problems to be achieved in the present disclosure are not limited to the technical problems mentioned above, and unmentioned other problems may be clearly understood by those skilled in the art from the following description.

A method of decoding/encoding a video signal according to the present disclosure includes the steps of: determining whether or not to apply a combined prediction mode to a current block; obtaining a first prediction block and a second prediction block for the current block when the combined prediction mode is applied to the current block; and obtaining a third prediction block for the current block based on a weighted sum operation of the first prediction block and the second prediction block. At this point, the first prediction block may be obtained based on motion information of a merge candidate of the current block, and the second prediction block may be obtained based on an intra prediction mode of the current block.

In the video signal encoding and decoding method according to the present disclosure, it may be set not to allow applying triangular partitioning to the current block when the combined prediction mode is applied to the current block.

In the video signal encoding and decoding method according to the present disclosure, the intra prediction mode of the current block may be set to a planar mode.

In the video signal encoding and decoding method according to the present disclosure, the second prediction block may be obtained based on a reference sample line included in an adjacent reference sample line.

In the video signal encoding and decoding method according to the present disclosure, in performing the weighted sum operation, weighting values applied to the first prediction block and the second prediction block may be determined based on prediction encoding modes of neighboring blocks adjacent to the current block.

In the video signal encoding and decoding method according to the present disclosure, when at least one among the width and the height of the current block is greater than a threshold value, the combined prediction mode may not be applied to the current block.

In the video signal encoding and decoding method according to the present disclosure, it may be set the combined prediction mode to be applicable to the current block when a flag indicating that a merge mode is applied to the current block is true.

Features briefly summarized above with respect to the present disclosure are merely exemplary aspects of the detailed description of the present disclosure that will be described below, and do not limit the scope of the present disclosure.

According to the present disclosure, inter prediction efficiency can be improved by providing a combined prediction method that combines a plurality of prediction methods.

According to the present disclosure, inter prediction efficiency can be improved by proposing a method of partitioning a coding block into a plurality of prediction blocks, and deriving motion information of each of the prediction blocks.

The effects that can be obtained from the present disclosure are not limited to the effects mentioned above, and unmentioned other effects may be clearly understood by those skilled in the art from the following description.

BRIEF DESCRIPTION OF THE DRAWINGS

FIG. 17 is a view for describing examples of determining availability of a neighboring block for each triangular prediction unit.

FIG. 29 is a view showing examples of assigning a different weighting value to a subblock according to whether a merge candidate has bidirectional motion information.

FIG. 38 is a view for describing examples of determining a transform type of the current block.

DETAILED DESCRIPTION OF THE PREFERRED IMPLEMENTATION

Hereafter, an implementation of the present disclosure will be described in detail with reference to the accompanying drawings.

Encoding and decoding of a video is performed by the unit of block. For example, an encoding/decoding process such as transform, quantization, prediction, in-loop filtering, reconstruction or the like may be performed on a coding block, a transform block, or a prediction block.

Hereinafter, a block to be encoded/decoded will be referred to as a 'current block'. For example, the current block may represent a coding block, a transform block or a prediction block according to a current encoding/decoding process step.

In addition, it may be understood that the term 'unit' used in this specification indicates a basic unit for performing a specific encoding/decoding process, and the term 'block' indicates a sample array of a predetermined size. Unless otherwise stated, the 'block' and 'unit' may be used to have the same meaning. For example, in an implementation described below, it may be understood that a coding block and a coding unit have the same meaning.

Figure 1:
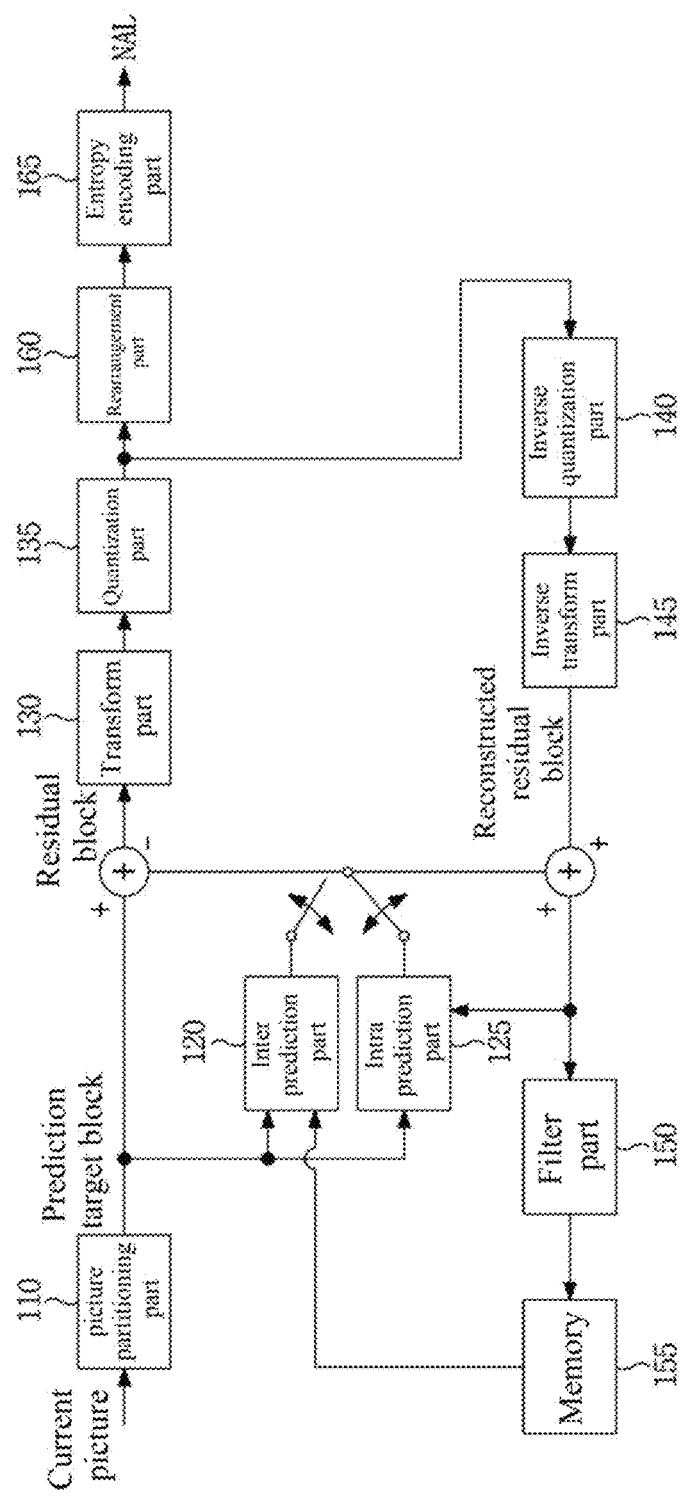
FIG. 1 is a block diagram showing a video encoder according to an implementation of the present disclosure.

FIG. 1 is a block diagram showing a video encoder according to an implementation of the present disclosure.

Referring to FIG. 1, a video encoding apparatus 100 may include a picture partitioning part 110, a prediction part 120 and 125, a transform part 130, a quantization part 135, a rearrangement part 160, an entropy coding part 165, an inverse quantization part 140, an inverse transform part 145, a filter part 150, and a memory 155.

Each of the components shown in FIG. 1 is independently shown to represent characteristic functions different from each other in a video encoding apparatus, and it does not mean that each component is formed by the configuration unit of separate hardware or single software. That is, each component is included to be listed as a component for convenience of explanation, and at least two of the components may be combined to form a single component, or one component may be divided into a plurality of components to perform a function. Integrated implementations and separate implementations of the components are also included in the scope of the present disclosure if they do not depart from the essence of the present disclosure.

In addition, some of the components are not essential components that perform essential functions in the present disclosure, but may be optional components only for improving performance. The present disclosure can be implemented by including only components essential to implement the essence of the present disclosure excluding components used for improving performance, and a structure including only the essential components excluding the optional components used for improving performance is also included in the scope of the present disclosure.

The picture partitioning part 110 may partition an input picture into at least one processing unit. At this point, the processing unit may be a prediction unit (PU), a transform unit (TU), or a coding unit (CU). The picture partitioning part 110 may partition a picture into a combination of a plurality of coding units, prediction units, and transform units, and encode a picture by selecting a combination of a coding unit, a prediction unit, and a transform unit based on a predetermined criterion (e.g., a cost function).

For example, one picture may be partitioned into a plurality of coding units. In order to partition the coding units in a picture, a recursive tree structure such as a quad tree structure may be used. A video or a coding unit partitioned into different coding units using the largest coding unit as a root may be partitioned to have as many child nodes as the number of partitioned coding units. A coding unit that is not partitioned any more according to a predetermined restriction become a leaf node. That is, when it is assumed that only square partitioning is possible for one coding unit, the one coding unit may be partitioned into up to four different coding units.

Hereinafter, in an implementation of the present disclosure, the coding unit may be used as a meaning of a unit performing encoding or a meaning of a unit performing decoding.

The prediction unit may be one that is partitioned in a shape of at least one square, rectangle or the like of the same size within one coding unit, or it may be any one prediction unit, among the prediction units partitioned within one coding unit, that is partitioned to have a shape and/or size different from those of another prediction unit.

If the coding unit is not a smallest coding unit when a prediction unit that performs intra prediction based on the coding unit is generated, intra prediction may be performed without partitioning a picture into a plurality of prediction units N×N.

The prediction part 120 and 125 may include an inter prediction part 120 that performs inter prediction and an intra prediction part 125 that performs intra prediction. It may be determined whether to use inter prediction or to perform intra prediction for a prediction unit, and determine specific information (e.g., intra prediction mode, motion vector, reference picture, etc.) according to each prediction method. At this point, a processing unit for performing prediction may be different from a processing unit for determining a prediction method and specific content. For example, a prediction method and a prediction mode may be determined in a prediction unit, and prediction may be performed in a transform unit. A residual coefficient (residual block) between the generated prediction block and the original block may be input into the transform part 130. In addition, prediction mode information, motion vector information and the like used for prediction may be encoded by the entropy coding part 165 together with the residual coefficient and transferred to a decoder. When a specific encoding mode is used, an original block may be encoded as it is and transmitted to a decoder without generating a prediction block through the prediction part 120 and 125.

The inter prediction part 120 may predict a prediction unit based on information on at least one picture among pictures before or after the current picture, and in some cases, it may predict a prediction unit based on information on a partial area that has been encoded in the current picture. The inter prediction part 120 may include a reference picture interpolation part, a motion prediction part, and a motion compensation part.

The reference picture interpolation part may receive reference picture information from the memory 155 and generate pixel information of an integer number of pixels or less from the reference picture. In the case of a luminance pixel, a DCT-based 8-tap interpolation filter with a varying filter coefficient may be used to generate pixel information of an integer number of pixels or less by the unit of ¼ pixels. In the case of a chroma signal, a DCT-based 4-tap interpolation filter with a varying filter coefficient may be used to generate pixel information of an integer number of pixels or less by the unit of ⅛ pixels.

The motion prediction part may perform motion prediction based on the reference picture interpolated by the reference picture interpolation part. Various methods such as a full search-based block matching algorithm (FBMA), a three-step search (TSS), and a new three-step search algorithm (NTS) may be used as a method of calculating a motion vector. The motion vector may have a motion vector value of a unit of ½ or ¼ pixels based on interpolated pixels. The motion prediction part may predict a current prediction unit by varying the motion prediction method. Various methods such as a skip mode, a merge mode, an advanced motion vector prediction (AMVP) mode, an intra-block copy mode and the like may be used as the motion prediction mode.

The intra prediction part 125 may generate a prediction unit based on the information on reference pixels in the neighborhood of the current block, which is pixel information in the current picture. When a block in the neighborhood of the current prediction unit is a block on which inter prediction has been performed and thus the reference pixel is a pixel on which inter prediction has been performed, the reference pixel included in the block on which inter prediction has been performed may be used in place of reference pixel information of a block in the neighborhood on which intra prediction has been performed. That is, when a reference pixel is unavailable, at least one reference pixel among available reference pixels may be used in place of unavailable reference pixel information.

In the intra prediction, the prediction mode may have an angular prediction mode that uses reference pixel information according to a prediction direction, and a non-angular prediction mode that does not use directional information when performing prediction. A mode for predicting luminance information may be different from a mode for predicting chroma information, and intra prediction mode information used to predict luminance information or predicted luminance signal information may be used to predict the chroma information.

If the size of the prediction unit is the same as the size of the transform unit when intra prediction is performed, the intra prediction may be performed for the prediction unit based on a pixel on the left side, a pixel on the top-left side, and a pixel on the top of the prediction unit. However, if the size of the prediction unit is different from the size of the transform unit when the intra prediction is performed, the intra prediction may be performed using a reference pixel based on the transform unit. In addition, intra prediction using N×N partitioning may be used only for the smallest coding unit.

The intra prediction method may generate a prediction block after applying an Adaptive Intra Smoothing (AIS) filter to the reference pixel according to a prediction mode. The type of the AIS filter applied to the reference pixel may vary. In order to perform the intra prediction method, the intra prediction mode of the current prediction unit may be predicted from the intra prediction mode of the prediction unit existing in the neighborhood of the current prediction unit. When a prediction mode of the current prediction unit is predicted using the mode information predicted from the neighboring prediction unit, if the intra prediction modes of the current prediction unit is the same as the prediction unit in the neighborhood, information indicating that the prediction modes of the current prediction unit is the same as the prediction unit in the neighborhood may be transmitted using predetermined flag information, and if the prediction modes of the current prediction unit and the prediction unit in the neighborhood are different from each other, prediction mode information of the current block may be encoded by performing entropy coding.

In addition, a residual block including a prediction unit that has performed prediction based on the prediction unit generated by the prediction part 120 and 125 and residual coefficient information, which is a difference value of the prediction unit with the original block, may be generated. The generated residual block may be input into the transform part 130.

The transform part 130 may transform the residual block including the original block and the residual coefficient information of the prediction unit generated through the prediction part 120 and 125 using a transform method such as Discrete Cosine Transform (DCT) or Discrete Sine Transform (DST). Here, the DCT transform core includes at least one among DCT2 and DCT8, and the DST transform core includes DST7. Whether or not to apply DCT or DST to transform the residual block may be determined based on intra prediction mode information of a prediction unit used to generate the residual block. The transform on the residual block may be skipped. A flag indicating whether or not to skip the transform on the residual block may be encoded. The transform skip may be allowed for a residual block having a size smaller than or equal to a threshold, a luma component, or a chroma component under the 4:4:4 format.

The quantization part 135 may quantize values transformed into the frequency domain by the transform part 130. Quantization coefficients may vary according to the block or the importance of a video. A value calculated by the quantization part 135 may be provided to the inverse quantization part 140 and the rearrangement part 160.

The rearrangement part 160 may rearrange coefficient values for the quantized residual coefficients.

The rearrangement part 160 may change coefficients of a two-dimensional block shape into a one-dimensional vector shape through a coefficient scanning method. For example, the rearrangement part 160 may scan DC coefficients up to high-frequency domain coefficients using a zig-zag scan method, and change the coefficients into a one-dimensional vector shape. According to the size of the transform unit and the intra prediction mode, a vertical scan of scanning the coefficients of a two-dimensional block shape in the column direction and a horizontal scan of scanning the coefficients of a two-dimensional block shape in the row direction may be used instead of the zig-zag scan. That is, according to the size of the transform unit and the intra prediction mode, a scan method that will be used may be determined among the zig-zag scan, the vertical direction scan, and the horizontal direction scan.

The entropy coding part 165 may perform entropy coding based on values calculated by the rearrangement part 160. Entropy coding may use various encoding methods such as Exponential Golomb, Context-Adaptive Variable Length Coding (CAVLC), Context-Adaptive Binary Arithmetic Coding (CABAC), and the like.

The entropy coding part 165 may encode various information such as residual coefficient information and block type information of a coding unit, prediction mode information, partitioning unit information, prediction unit information, and transmission unit information, motion vector information, reference frame information, block interpolation information, and filtering information input from the rearrangement part 160 and the prediction parts 120 and 125.

The entropy coding part 165 may entropy-encode the coefficient value of a coding unit input from the rearrangement part 160.

The inverse quantization part 140 and the inverse transform part 145 inverse-quantize the values quantized by the quantization part 135 and inverse-transform the values transformed by the transform part 130. The residual coefficient generated by the inverse quantization part 140 and the inverse transform part 145 may be combined with the prediction unit predicted through a motion estimation part, a motion compensation part, and an intra prediction part included in the prediction part 120 and 125 to generate a reconstructed block.

The filter part 150 may include at least one among a deblocking filter, an offset correction unit, and an adaptive loop filter (ALF).

The deblocking filter may remove block distortion generated by the boundary between blocks in the reconstructed picture. In order to determine whether or not to perform deblocking, whether or not to apply the deblocking filter to the current block may be determined based on the pixels included in several columns or rows included in the block. A strong filter or a weak filter may be applied according to the deblocking filtering strength needed when the deblocking filter is applied to a block. In addition, when vertical direction filtering and horizontal direction filtering are performed in applying the deblocking filter, horizontal direction filtering and vertical direction filtering may be processed in parallel.

The offset correction unit may correct an offset to the original picture by the unit of pixel for a picture on which the deblocking has been performed. In order to perform offset correction for a specific picture, it is possible to use a method of dividing pixels included in the picture into a certain number of areas, determining an area to perform offset, and applying the offset to the area, or a method of applying an offset considering edge information of each pixel.

Adaptive Loop Filtering (ALF) may be performed based on a value obtained by comparing the filtered reconstructed picture with the original picture. After dividing the pixels included in the picture into predetermined groups, one filter to be applied to a corresponding group may be determined, and filtering may be performed differently for each group. A luminance signal, which is the information related to whether or not to apply ALF, may be transmitted for each coding unit (CU), and the shape and filter coefficient of an ALF filter to be applied may vary according to each block. In addition, an ALF filter of the same type (fixed type) may be applied regardless of the characteristic of a block to be applied.

The memory 155 may store the reconstructed block or picture calculated through the filter part 150, and the reconstructed and stored block or picture may be provided to the prediction part 120 and 125 when inter prediction is performed.

Figure 2:
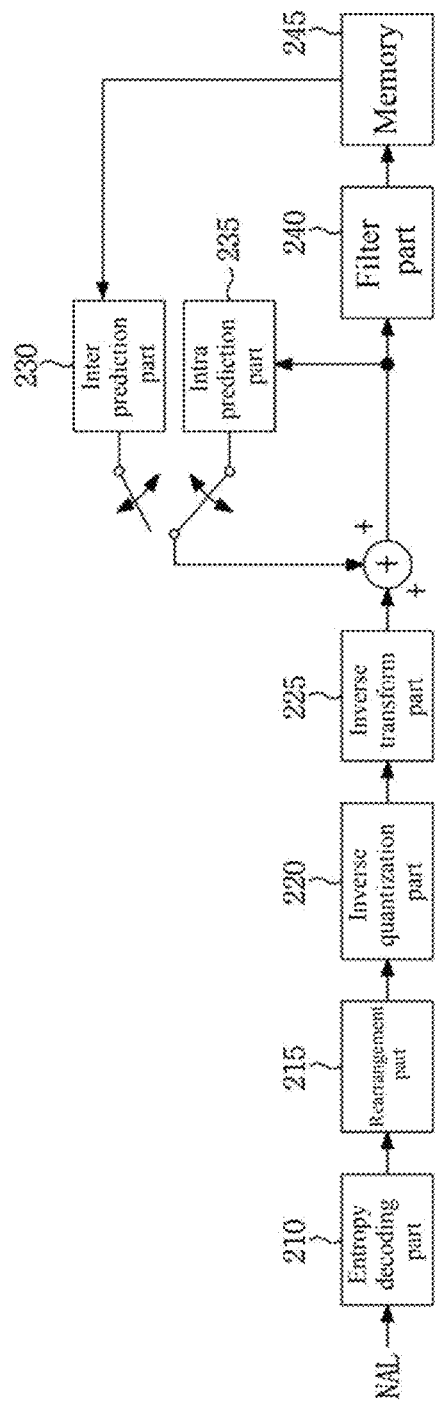
FIG. 2 is a block diagram showing a video decoder according to an implementation of the present disclosure.

FIG. 2 is a block diagram showing a video decoder according to an implementation of the present disclosure.

Referring to FIG. 2, a video decoder 200 may include an entropy decoding part 210, a rearrangement part 215, an inverse quantization part 220, an inverse transform part 225, a prediction part 230 and 235, a filter part 240, and a memory 245.

When a video bitstream is input from a video encoder, the input bitstream may be decoded in a procedure opposite to that of the video encoder.

The entropy decoding part 210 may perform entropy decoding in a procedure opposite to that of performing entropy coding in the entropy decoding part of the video encoder. For example, various methods corresponding to the method performed by the video encoder, such as Exponential Golomb, Context-Adaptive Variable Length Coding (CAVLC), and Context-Adaptive Binary Arithmetic Coding (CABAC), may be applied.

The entropy decoding part 210 may decode information related to intra prediction and inter prediction performed by the encoder.

The rearrangement part 215 may perform rearrangement on the bitstream entropy-decoded by the entropy decoding part 210 based on the rearrangement method performed by the encoder. The coefficients expressed in a one-dimensional vector shape may be reconstructed and rearranged as coefficients of two-dimensional block shape. The rearrangement part 215 may receive information related to coefficient scanning performed by the encoding part and perform reconstruction through a method of inverse-scanning based on the scanning order performed by the corresponding encoding part.

The inverse quantization part 220 may perform inverse quantization based on a quantization parameter provided by the encoder and a coefficient value of the rearranged block.

The inverse transform part 225 may perform inverse transform on the transform, i.e., DCT or DST, performed by the transform part on a result of the quantization performed by the video encoder, i.e., inverse DCT or inverse DST. Here, the DCT transform core may include at least one among DCT2 and DCT8, and the DST transform core may include DST7. Alternatively, when the transform is skipped in the video encoder, even the inverse transform part 225 may not perform the inverse transform. The inverse transform may be performed based on a transmission unit determined by the video encoder. The inverse transform part 225 of the video decoder may selectively perform a transform technique (e.g., DCT or DST) according to a plurality of pieces of information such as a prediction method, a size of a current block, a prediction direction and the like.

The prediction part 230 and 235 may generate a prediction block based on information related to generation of a prediction block provided by the entropy decoder 210 and information on a previously decoded block or picture provided by the memory 245.

As described above, if the size of the prediction unit and the size of the transform unit are the same when intra prediction is performed in the same manner as the operation of the video encoder, intra prediction is performed on the prediction unit based on the pixel existing on the left side, the pixel on the top-left side, and the pixel on the top of the prediction unit. However, if the size of the prediction unit and the size of the transform unit are different when intra prediction is performed, intra prediction may be performed using a reference pixel based on a transform unit. In addition, intra prediction using N×N partitioning may be used only for the smallest coding unit.

The prediction part 230 and 235 may include a prediction unit determination part, an inter prediction part, and an intra prediction part. The prediction unit determination part may receive various information such as prediction unit information input from the entropy decoding part 210, prediction mode information of the intra prediction method, information related to motion prediction of an inter prediction method, and the like, identify the prediction unit from the current coding unit, and determine whether the prediction unit performs inter prediction or intra prediction. The inter prediction part 230 may perform inter prediction on the current prediction unit based on information included in at least one picture among pictures before or after the current picture including the current prediction unit by using information necessary for inter prediction of the current prediction unit provided by the video encoder. Alternatively, the inter prediction part 230 may perform inter prediction based on information on a partial area previously reconstructed in the current picture including the current prediction unit.

In order to perform inter prediction, it may be determined, based on the coding unit, whether the motion prediction method of the prediction unit included in a corresponding coding unit is a skip mode, a merge mode, an advanced motion vector prediction mode (AMVP mode), or an intra-block copy mode.

The intra prediction part 235 may generate a prediction block based on the information on the pixel in the current picture. When the prediction unit is a prediction unit that has performed intra prediction, the intra prediction may be performed based on intra prediction mode information of the prediction unit provided by the video encoder. The intra prediction part 235 may include an Adaptive Intra Smoothing (AIS) filter, a reference pixel interpolation part, and a DC filter. The AIS filter is a part that performs filtering on the reference pixel of the current block, and may determine whether or not to apply the filter according to the prediction mode of the current prediction unit and apply the filter. AIS filtering may be performed on the reference pixel of the current block by using the prediction mode and AIS filter information of the prediction unit provided by the video encoder. When the prediction mode of the current block is a mode that does not perform AIS filtering, the AIS filter may not be applied.

When the prediction mode of the prediction unit is a prediction unit that performs intra prediction based on a pixel value obtained by interpolating the reference pixel, the reference pixel interpolation part may generate a reference pixel of a pixel unit having an integer value or a value smaller than the integer value by interpolating the reference pixel. When the prediction mode of the current prediction unit is a prediction mode that generates a prediction block without interpolating the reference pixel, the reference pixel may not be interpolated. The DC filter may generate a prediction block through filtering when the prediction mode of the current block is the DC mode.

The reconstructed block or picture may be provided to the filter part 240. The filter part 240 may include a deblocking filter, an offset correction unit, and an ALF.

Information on whether a deblocking filter is applied to a corresponding block or picture and information on whether a strong filter or a weak filter is applied when a deblocking filter is applied may be provided by the video encoder. The deblocking filter of the video decoder may be provided with information related to the deblocking filter provided by the video encoder, and the video decoder may perform deblocking filtering on a corresponding block.

The offset correction unit may perform offset correction on the reconstructed picture based on the offset correction type and offset value information applied to the video when encoding is performed.

The ALF may be applied to a coding unit based on information on whether or not to apply the ALF and information on ALF coefficients provided by the encoder. The ALF information may be provided to be included in a specific parameter set.

The memory 245 may store the reconstructed picture or block and use it as a reference picture or a reference block and may provide the reconstructed picture to an output unit.

Figure 3:
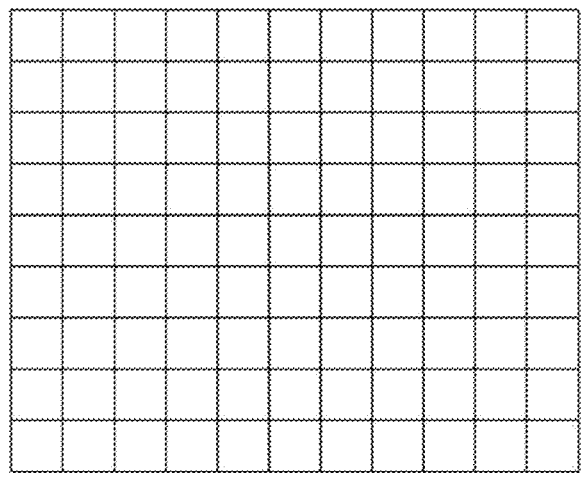
FIG. 3 is a view showing a basic coding tree unit according to an implementation of the present disclosure.

FIG. 3 is a view showing a basic coding tree unit according to an implementation of the present disclosure.

A coding block of a maximum size may be defined as a coding tree block. A picture is partitioned into a plurality of coding tree units (CTUs). The coding tree unit is a coding unit having a maximum size and may be referred to as a Large Coding Unit (LCU). FIG. 3 shows an example in which a picture is partitioned into a plurality of coding tree units.

The size of the coding tree unit may be defined at a picture level or a sequence level. To this end, information indicating the size of the coding tree unit may be signaled through a picture parameter set or a sequence parameter set.

For example, the size of the coding tree unit for the entire picture in a sequence may be set to 128×128. Alternatively, at the picture level, any one among 128×128 and 256×256 may be determined as the size of the coding tree unit. For example, the size of the coding tree unit may be set to 128×128 in a first picture, and the size of the coding tree unit may be set to 256×256 in a second picture.

Coding blocks may be generated by partitioning a coding tree unit. The coding block indicates a basic unit for performing encoding/decoding. For example, prediction or transform may be performed for each coding block, or a prediction encoding mode may be determined for each coding block. Here, the prediction encoding mode indicates a method of generating a prediction picture. For example, the prediction encoding mode may include prediction within a picture (intra prediction), prediction between pictures (inter prediction), current picture referencing (CPR) or intra-block copy (IBC), or combined prediction. For the coding block, a prediction block may be generated by using at least one prediction encoding mode among the intra prediction, the inter prediction, the current picture referencing, and the combined prediction.

Information indicating the prediction encoding mode of the current block may be signaled through a bitstream. For example, the information may be a 1-bit flag indicating whether the prediction encoding mode is an intra mode or an inter mode. Only when the prediction encoding mode of the current block is determined as the inter mode, the current picture referencing or the combined prediction may be used.

The current picture referencing is for setting the current picture as a reference picture and obtaining a prediction block of the current block from an area that has already been encoded/decoded in the current picture. Here, the current picture means a picture including the current block. Information indicating whether the current picture referencing is applied to the current block may be signaled through a bitstream. For example, the information may be a 1-bit flag. When the flag is true, the prediction encoding mode of the current block may be determined as the current picture reference, and when the flag is false, the prediction mode of the current block may be determined as inter prediction.

Alternatively, the prediction encoding mode of the current block may be determined based on a reference picture index. For example, when the reference picture index indicates the current picture, the prediction encoding mode of the current block may be determined as the current picture reference.

When the reference picture index indicates a picture other than the current picture, the prediction encoding mode of the current block may be determined as inter prediction. That is, the current picture referencing is a prediction method using information on an area in which encoding/decoding has been completed in the current picture, and inter prediction is a prediction method using information on another picture in which the encoding/decoding has been completed.

The combined prediction represents an encoding mode in which two or more among the intra prediction, the inter prediction, and the current picture referencing are combined. For example, when the combined prediction is applied, a first prediction block may be generated based on one among the intra prediction, the inter prediction, and the current picture referencing, and a second prediction block may be generated based on another one. When the first prediction block and the second prediction block are generated, a final prediction block may be generated through an average operation or a weighted sum operation of the first prediction block and the second prediction block. Information indicating whether or not the combined prediction is applied may be signaled through a bitstream. The information may be a 1-bit flag.

Figure 4:
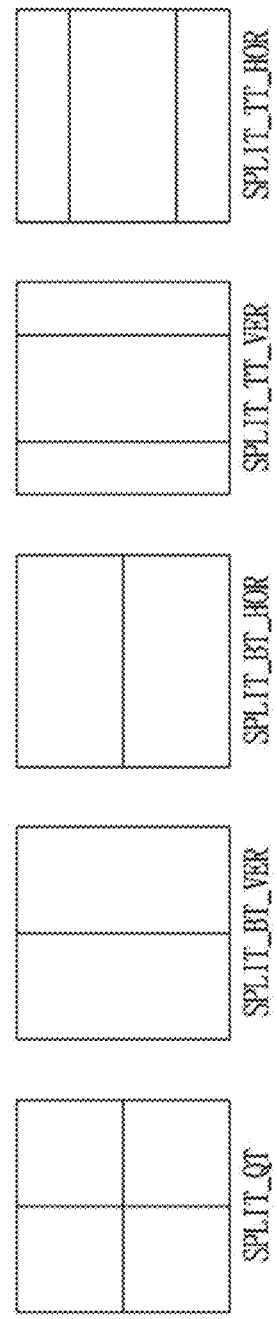
FIG. 4 is a view showing various partitioning types of a coding block.

FIG. 4 is a view showing various partitioning types of a coding block.

The coding block may be partitioned into a plurality of coding blocks based on quad tree partitioning, binary tree partitioning, or ternary tree partitioning. The partitioned coding block may be partitioned again into a plurality of coding blocks based on the quad tree partitioning, the binary tree partitioning, or the ternary tree partitioning.

The quad tree partitioning refers to a partitioning technique that partitions a current block into four blocks. As a result of the quad tree partitioning, the current block may be partitioned into four square-shaped partitions (see 'SPLIT_QT' of FIG. 4 (a)).

The binary tree partitioning refers to a partitioning technique that partitions a current block into two blocks. Partitioning a current block into two blocks along the vertical direction (i.e., using a vertical line crossing the current block) may be referred to as vertical direction binary tree partitioning, and partitioning a current block into two blocks along the horizontal direction (i.e., using a horizontal line crossing the current block) may be referred to as horizontal direction binary tree partitioning. As a result of the binary tree partitioning, the current block may be partitioned into two non-square shaped partitions. 'SPLIT_BT_VER' of FIG. 4 (b) shows a result of the vertical direction binary tree partitioning, and 'SPLIT_BT_HOR' of FIG. 4 (c) shows a result of the horizontal direction binary tree partitioning.

The ternary tree partitioning refers to a partitioning technique that partitions a current block into three blocks. Partitioning a current block into three blocks along the vertical direction (i.e., using two vertical lines crossing the current block) may be referred to as vertical direction ternary tree partitioning, and partitioning a current block into three blocks along the horizontal direction (i.e., using two horizontal lines crossing the current block) may be referred to as horizontal direction ternary tree partitioning. As a result of the ternary tree partitioning, the current block may be partitioned into three non-square shaped partitions. At this point, the width/height of a partition positioned at the center of the current block may be twice as large as the width/height of the other partitions. 'SPLIT_TT_VER' of FIG. 4 (d) shows a result of the vertical direction ternary tree partitioning, and 'SPLIT_TT_HOR' of FIG. 4 (e) shows a result of the horizontal direction ternary tree partitioning.

The number of times of partitioning a coding tree unit may be defined as a partitioning depth. The maximum partitioning depth of a coding tree unit may be determined at the sequence or picture level. Accordingly, the maximum partitioning depth of a coding tree unit may be different for each sequence or picture.

Alternatively, the maximum partitioning depth for each partitioning technique may be individually determined. For example, the maximum partitioning depth allowed for the quad tree partitioning may be different from the maximum partitioning depth allowed for the binary tree partitioning and/or the ternary tree partitioning.

The encoder may signal information indicating at least one among the partitioning type and the partitioning depth of the current block through a bitstream. The decoder may determine the partitioning type and the partitioning depth of a coding tree unit based on the information parsed from the bitstream.

Figure 5:
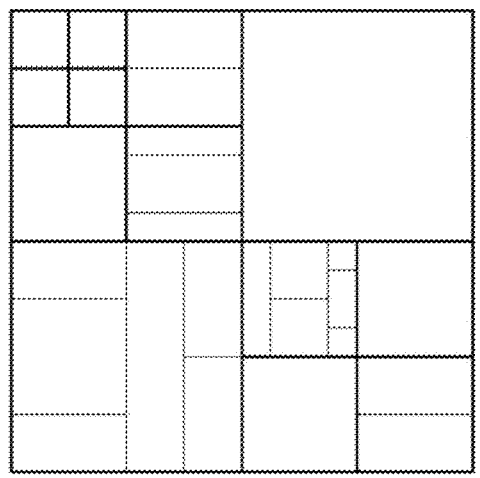
FIG. 5 is a view showing a partitioning pattern of a coding tree unit.

FIG. 5 is a view showing a partitioning pattern of a coding tree unit.

Partitioning a coding block using a partitioning technique such as quad tree partitioning, binary tree partitioning, and/or ternary tree partitioning may be referred to as multi-tree partitioning.

Coding blocks generated by applying the multi-tree partitioning to a coding block may be referred to as lower coding blocks. When the partitioning depth of a coding block is k, the partitioning depth of the lower coding blocks is set to k+1.

Contrarily, for coding blocks having a partitioning depth of k+1, a coding block having a partitioning depth of k may be referred to as an upper coding block.

The partitioning type of the current coding block may be determined based on at least one among a partitioning type of an upper coding block and a partitioning type of a neighboring coding block. Here, the neighboring coding block is a coding block adjacent to the current coding block and may include at least one among a top neighboring block and a left neighboring block of the current coding block, and a neighboring block adjacent to the top-left corner. Here, the partitioning type may include at least one among whether or not a quad tree partitioning, whether or not a binary tree partitioning, binary tree partitioning direction, whether or not a ternary tree partitioning, and ternary tree partitioning direction.

In order to determine a partitioning type of a coding block, information indicating whether or not the coding block can be partitioned may be signaled through a bitstream. The information is a 1-bit flag of 'split_cu_flag', and when the flag is true, it indicates that the coding block is partitioned by a quad tree partitioning technique.

When split_cu_flag is true, information indicating whether the coding block is quad-tree partitioned may be signaled through a bitstream. The information is a 1-bit flag of split_qt_flag, and when the flag is true, the coding block may be partitioned into four blocks.

For example, in the example shown in FIG. 5, as a coding tree unit is quad-tree partitioned, four coding blocks having a partitioning depth of 1 are generated. In addition, it is shown that quad tree partitioning is applied again to the first and fourth coding blocks among the four coding blocks generated as a result of the quad tree partitioning. As a result, four coding blocks having a partitioning depth of 2 may be generated.

In addition, coding blocks having a partitioning depth of 3 may be generated by applying the quad tree partitioning again to a coding block having a partitioning depth of 2.

When quad tree partitioning is not applied to the coding block, whether binary tree partitioning or ternary tree partitioning is performed on the coding block may be determined considering at least one among the size of the coding block, whether the coding block is positioned at the picture boundary, the maximum partitioning depth, and the partitioning type of a neighboring block. When it is determined to perform binary tree partitioning or ternary tree partitioning on the coding block, information indicating the partitioning direction may be signaled through a bitstream. The information may be a 1-bit flag of mtt_split_cu_vertical_flag. Based on the flag, whether the partitioning direction is a vertical direction or a horizontal direction may be determined. Additionally, information indicating whether binary tree partitioning or ternary tree partitioning is applied to the coding block may be signaled through a bitstream. The information may be a 1-bit flag of mtt_split_cu_binary_flag. Based on the flag, whether binary tree partitioning or ternary tree partitioning is applied to the coding block may be determined.

For example, in the example shown in FIG. 5, it is shown that vertical direction binary tree partitioning is applied to a coding block having a partitioning depth of 1, vertical direction ternary tree partitioning is applied to the left-side coding block among the coding blocks generated as a result of the partitioning, and vertical direction binary tree partitioning is applied to the right-side coding block.

When an apparatus for encoding or decoding a video is implemented, there is a problem in that a region larger than a threshold value is difficult to process due to hardware performance. For example, there is a problem in that when it is possible to simultaneously process up to 4,096 samples based on hardware performance, data units of a 64×64 size should be redundantly accessed and processed, and data cannot be processed simultaneously for the regions having samples more than 4,096. Like this, a basic unit of data processing may be defined as a pipeline-based data basic unit (Virtual Processing Data Unit, VPDU, hereinafter, referred to as a data basic unit).

The data basic unit may be classified as a square, non-square or non-rectangular type.

Figure 6:
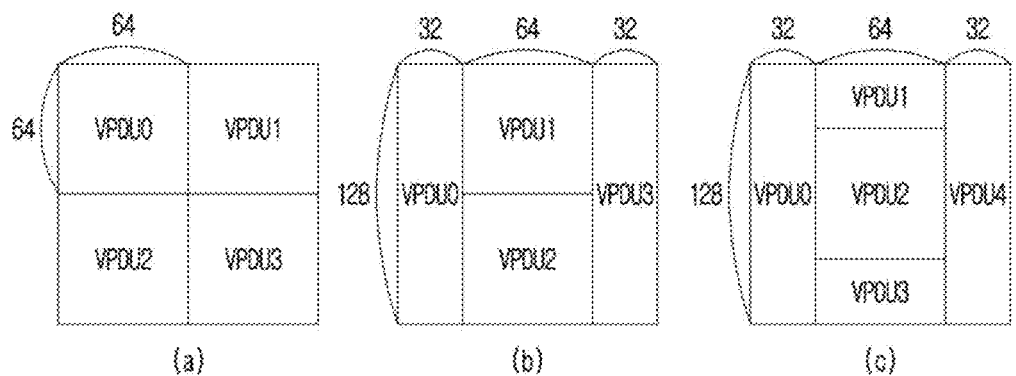
FIG. 6 is a view showing the shape of a data basic unit.

FIG. 6 is a view showing the shape of a data basic unit.

Data basic units may include samples as many as or smaller than the maximum number of samples that can be processed simultaneously. For example, as shown in the example of FIG. 6 (a), square blocks having a 64×64 size may be set as data basic units. Alternatively, non-square blocks may be set as data basic units. For example, as shown in the example of FIG. 6 (b) or 6 (c), a block having a 32×128 size or a block having a 64×32 size may be set as a data basic unit.

Although not shown, triangular, L-shaped, and polygonal data basic units may be defined.

Information for determining a data basic unit may be signaled through a bitstream. The information may be for determining at least one among the size and the shape of the data basic unit. Based on the information, whether or not to allow a non-square data basic unit or whether or not to allow a non-rectangular data basic unit may be determined.

Alternatively, at least one among the size and the shape of a data basic unit may be predefined in the encoder and the decoder.

Whether or not to allow a partitioning type of a coding block may be determined considering the size of a data basic unit. For example, when a coding block generated as a result of partitioning a coding block is larger than the data basic unit, the partitioning may not be allowed. Alternatively, when a non-square coding block generated as a result of partitioning a coding block is larger than the data basic unit, the partitioning may not be allowed. For example, when the width or the height of a coding block is greater than a threshold value or when the number of samples included in a coding block is larger than a threshold value, binary tree or ternary tree partitioning may not be allowed. Accordingly, encoding of information related to the binary tree or ternary tree partitioning may be omitted.

Alternatively, it may be set to necessarily partition a coding block larger than the data basic unit. Alternatively, it may be set to necessarily perform binary tree partitioning or ternary tree partitioning on a coding block larger than the data basic unit. Accordingly, for a coding block larger than the data basic unit, although the flag split_flag indicating whether or not to partition a coding block is not encoded, the value of the flag may be derived as 1.

As another example, a coding block larger than the data basic unit may be partitioned into a plurality of subblocks. Here, the subblock may be set as a prediction unit, which is a basic unit for prediction, or a transform unit, which is a basic unit for transform and/or quantization. At this point, partitioning a coding block into a plurality of prediction units may be defined as VPDU prediction unit partitioning, and partitioning a coding block into a plurality of transform units may be defined as VPDU transform unit partitioning.

At least one among the VPDU prediction unit partitioning and the VPDU transform unit partitioning may be applied to a coding block. The partitioning type of a coding block according to application of the VPDU prediction unit partitioning may be set to be the same as the partitioning type of a coding block according to application of the VPDU transform unit partitioning.

When only the VPDU prediction unit partitioning is applied to a coding block, prediction is performed for each subblock, but transform and/or quantization may be performed for a coding block. At this point, a prediction mode such as a prediction encoding mode, an intra prediction mode, or an inter prediction mode may be determined for a coding block.

When only the VPDU transform unit partitioning is applied to a coding block, prediction is performed for a subblock, but transform and/or quantization may be performed for each subblock.

Figure 7:
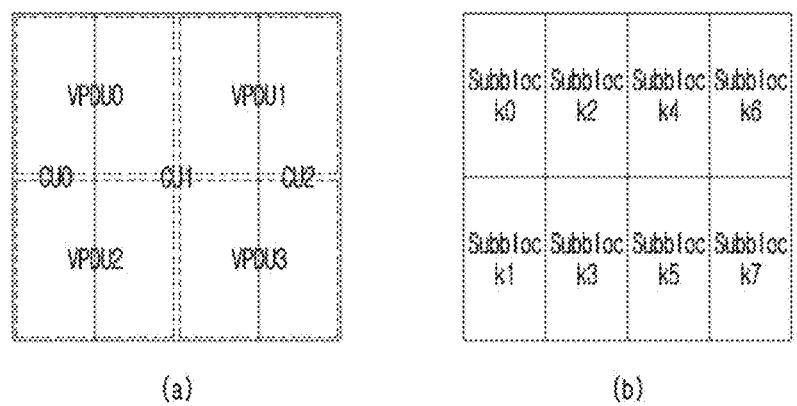
FIG. 7 is a view showing examples of partitioning a coding block into a plurality of subblocks.
Figure 8:
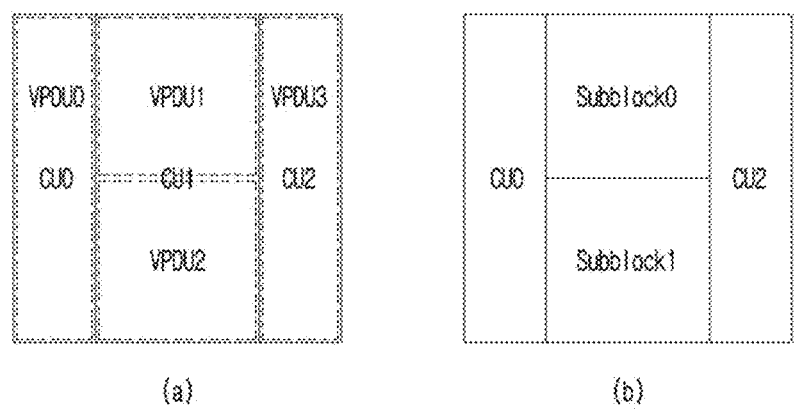
FIG. 8 is a view showing examples of partitioning a coding block into a plurality of subblocks.

FIGS. 7 and 8 are views showing examples of partitioning a coding block into a plurality of subblocks.

FIG. 7 is a view showing a partitioning pattern when only a square data basic unit is allowed, and FIG. 8 is a view showing a partitioning pattern when a square data basic unit and a non-square data basic unit are allowed.

When it is assumed that only square data basic units are allowed, in FIGS. 7 (a) and 7 (b), CU0 and CU2 are defined as two different VPDUs, and CU1 is defined as four different VPDUs. Accordingly, CU0 and CU2 may be partitioned into two subblocks, and CU1 may be partitioned into four subblocks.

When it is assumed that square data basic units and non-square data basic units are allowed, in FIGS. 8 (a) and 8 (b), CU0 and CU2 may be defined as one VPDU, whereas CU1 may be defined using two different VPDUs. Accordingly, CU0 and CU2 are not partitioned into subblocks, whereas CU1 may be partitioned into two subblocks.

At this point, CU1 may be partitioned into square subblocks or non-square subblocks. For example, CU1 may be partitioned into two square subblocks based on a horizontal line that partitions CU1 up and down. Alternatively, CU1 may be partitioned into two non-square subblocks based on a vertical line that partitions CU1 left and right.

When there is a plurality of partitioning type candidates applicable to a coding block, information indicating any one among the plurality of partitioning type candidates may be signaled through a bitstream. For example, the information may indicate whether a coding block is partitioned into square subblocks or whether a coding block is partitioned into non-square subblocks.

Alternatively, partitioning a coding block into square subblocks may be set to have a priority higher than that of partitioning a coding block into non-square subblocks. For example, partitioning a coding block into non-square subblocks may be allowed when it is not allowed to partition a coding block into square subblocks.

Alternatively, the partitioning type of a coding block may be determined based on the partitioning type of a parent node coding block. For example, it may be set to partition a coding block into square subblocks when the parent node coding block is partitioned based on a ternary tree. On the other hand, it may be set to partition a coding block into non-square subblocks when the parent node coding block is partitioned based on a binary tree or a ternary tree.

Inter prediction is a prediction encoding mode that predicts a current block by using information of a previous picture. For example, a block at the same position as the current block in the previous picture (hereinafter, a collocated block) may be set as the prediction block of the current block. Hereinafter, a prediction block generated based on a block at the same position as the current block will be referred to as a collocated prediction block.

On the other hand, when an object existing in the previous picture has moved to another position in the current picture, the current block may be effectively predicted by using a motion of the object. For example, when the moving direction and the size of an object can be known by comparing the previous picture and the current picture, a prediction block (or a prediction picture) of the current block may be generated considering motion information of the object. Hereinafter, the prediction block generated using motion information may be referred to as a motion prediction block.

A residual block may be generated by subtracting the prediction block from the current block. At this point, when there is a motion of an object, the energy of the residual block may be reduced by using the motion prediction block instead of the collocated prediction block, and therefore, compression performance of the residual block can be improved.

As described above, generating a prediction block by using motion information may be referred to as motion compensation prediction. In most inter prediction, a prediction block may be generated based on the motion compensation prediction.

The motion information may include at least one among a motion vector, a reference picture index, a prediction direction, and a bidirectional weight index. The motion vector represents the moving direction and the size of an object. The reference picture index specifies a reference picture of the current block among reference pictures included in a reference picture list. The prediction direction indicates any one among unidirectional L0 prediction, unidirectional L1 prediction, and bidirectional prediction (L0 prediction and L1 prediction). According to the prediction direction of the current block, at least one among motion information in the L0 direction and motion information in the L1 direction may be used. The bidirectional weight index specifies a weighting value applied to a L0 prediction block and a weighting value applied to a L1 prediction block.

Figure 9:
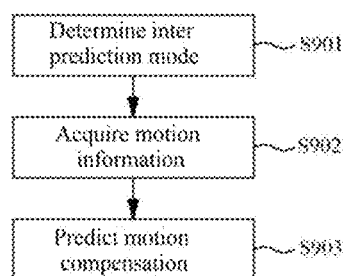
FIG. 9 is a flowchart illustrating an inter prediction method according to an implementation of the present disclosure.

FIG. 9 is a flowchart illustrating an inter prediction method according to an implementation of the present disclosure.

Referring to FIG. 9, the inter prediction method includes the steps of determining an inter prediction mode of a current block (S901), acquiring motion information of the current block according to the determined inter prediction mode (S902), and performing motion compensation prediction for the current block based on the acquired motion information (S903).

Here, the inter prediction mode represents various techniques for determining motion information of the current block, and may include an inter prediction mode that uses translational motion information and an inter prediction mode that uses affine motion information. For example, the inter prediction mode using translational motion information may include a merge mode and an advanced motion vector prediction mode, and the inter prediction mode using affine motion information may include an affine merge mode and an affine motion vector prediction mode. The motion information of the current block may be determined based on a neighboring block adjacent to the current block or information parsed from a bitstream according to the inter prediction mode.

Motion information of the current block may be derived from motion information of another block. Here, another block may be a block encoded/decoded by inter prediction before the current block. Setting the motion information of the current block to be equal to the motion information of another block may be defined as a merge mode. In addition, setting the motion vector of another block as the prediction value of the motion vector of the current block may be defined as an advanced motion vector prediction mode.

Figure 10:
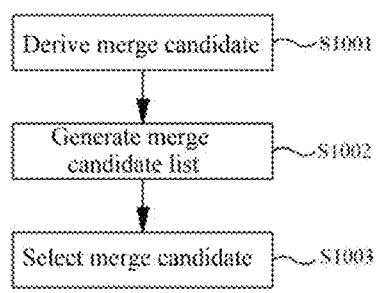
FIG. 10 is a flowchart illustrating a process of deriving motion information of a current block using a merge mode.

FIG. 10 is a flowchart illustrating a process of deriving motion information of a current block using a merge mode.

A merge candidate of the current block may be derived (S1001). The merge candidate of the current block may be derived from a block encoded/decoded by inter prediction before the current block.

Figure 11:
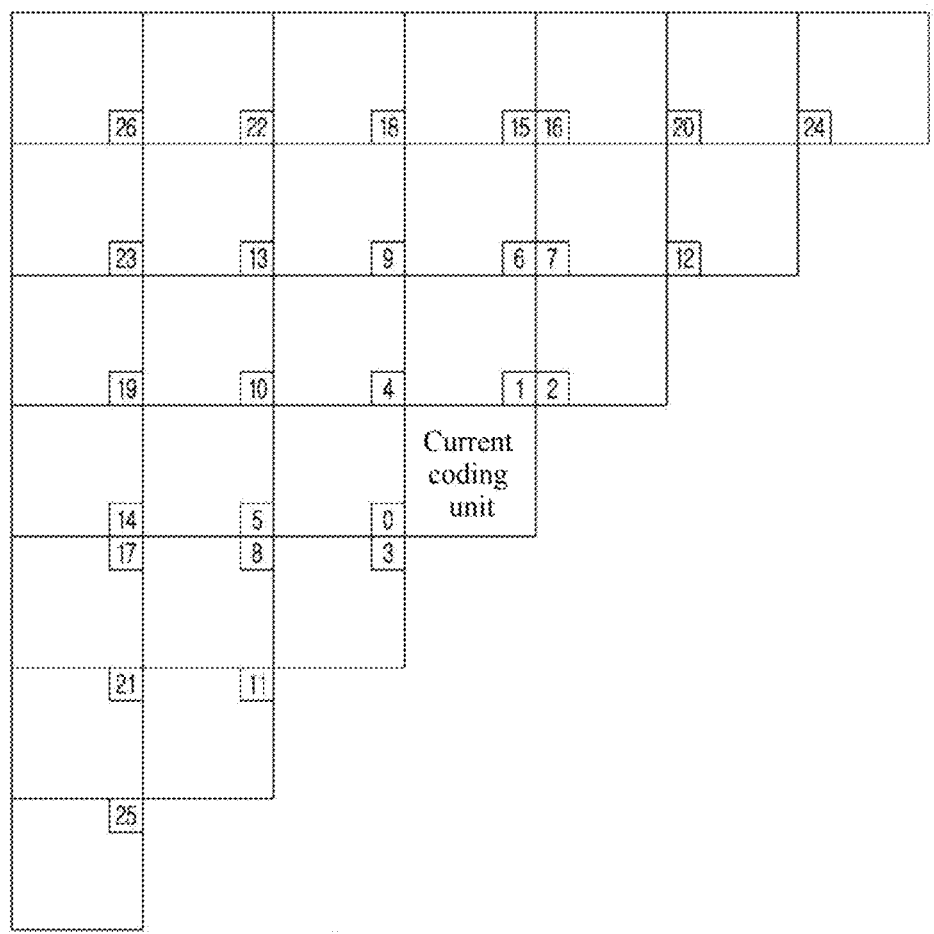
FIG. 11 is a view showing an example of candidate blocks used for deriving a merge candidate.

FIG. 11 is a view showing an example of candidate blocks used for deriving a merge candidate.

The candidate blocks may include at least one among neighboring blocks including a sample adjacent to the current block or non-neighboring blocks including a sample not adjacent to the current block. Hereinafter, samples for determining candidate blocks are defined as reference samples. In addition, a reference sample adjacent to the current block is referred to as a neighboring reference sample, and a reference sample not adjacent to the current block is referred to as a non-neighboring reference sample.

The neighboring reference sample may be included in a neighboring column of the leftmost column of the current block or a neighboring row of the uppermost row of the current block. For example, when the coordinates of the top-left sample of the current block is (0, 0), at least one among a block including a reference sample at the position of (−1, H−1), a block including a reference sample at the position of (W−1, −1), a block including a reference sample at the position of (W, −1), a block including a reference sample at the position of (−1, H), and a block including a reference sample at the position of (−1, −1) may be used as a candidate block. Referring to the drawing, neighboring blocks of index 0 to 4 may be used as candidate blocks.

The non-neighboring reference sample represents a sample of which at least one among an x-axis distance and a y-axis distance from a reference sample adjacent to the current block has a predefined value. For example, at least one among a block including a reference sample of which the x-axis distance from the left reference sample is a predefined value, a block including a non-neighboring sample of which the y-axis distance from the top reference sample is a predefined value, and a block including a non-neighboring sample of which the x-axis distance and the y-axis distance from the top-left reference sample are predefined values may be used as a candidate block. The predefined values may be a natural number such as 4, 8, 12, 16 or the like. Referring to the drawing, at least one among the blocks of index 5 to 26 may be used as a candidate block.

Alternatively, a candidate block that does not belong to the same coding tree unit as the current block may be set to be unavailable as a merge candidate. For example, when a reference sample deviates from the top boundary of a coding tree unit to which the current block belongs, a candidate block including the reference sample may be set to be unavailable as a merge candidate.

A merge candidate may also be derived from a temporally neighboring block included in a picture different from the current block. For example, a merge candidate may be derived from a collocated block included in a collocated picture. Any one among the reference pictures included in the reference picture list may be set as a collocated picture. Index information for identifying the collocated picture among the reference pictures may be signaled through a bitstream. Alternatively, a reference picture having a predefined index among the reference pictures may be determined as the collocated picture.

The motion information of the merge candidate may be set to be equal to the motion information of the candidate block. For example, at least one among a motion vector, a reference picture index, a prediction direction, and a bidirectional weight index of the candidate block may be set as motion information of the merge candidate.

A merge candidate list including merge candidates may be generated (S1002).

Indexes of merge candidates in the merge candidate list may be assigned according to a predetermined order. For example, the indexes may be assigned in order of a merge candidate derived from a left neighboring block, a merge candidate derived from a top neighboring block, a merge candidate derived from a top-right neighboring block, a merge candidate derived from a bottom-left neighboring block, a merge candidate derived from a top-left neighboring block, and a merge candidate derived from a temporally neighboring block.

When a plurality of merge candidates is included in the merge candidate list, at least one among the plurality of merge candidates may be selected (S1003). Specifically, information for specifying any one among a plurality of merge candidates may be signaled through a bitstream. For example, information merge_idx indicating an index of any one among the merge candidates included in the merge candidate list may be signaled through a bitstream.

When the number of merge candidates included in the merge candidate list is smaller than a threshold value, the merge candidate included in the inter-region motion information list may be added to the merge candidate list. Here, the threshold value may be the maximum number of merge candidates that the merge candidate list may include or a value obtained by subtracting an offset from the maximum number of merge candidates. The offset may be a natural number such as 1, 2 or the like. The inter-region motion information list may include a merge candidate derived based on a block encoded/decoded before the current block.

The inter-region motion information list includes a merge candidate derived from a block encoded/decoded based on inter prediction in the current picture. For example, motion information of a merge candidate included in the inter-region motion information list may be set to be equal to motion information of a block encoded/decoded based on inter prediction. Here, the motion information may include at least one among a motion vector, a reference picture index, a prediction direction, and a bidirectional weight index.

A coding block may be partitioned into a plurality of prediction units, and prediction may be performed on each of the partitioned prediction units. Here, a prediction unit represents a basic unit for performing the prediction.

A coding block may be partitioned using at least one among a vertical line, a horizontal line, an oblique line, and a diagonal line. Information for determining at least one among the number, the angles, and the positions of lines partitioning a coding block may be signaled through a bitstream. For example, information indicating any one among partition type candidates of a coding block may be signaled through a bitstream, or information specifying any one among a plurality of line candidates for partitioning a coding block may be signaled through a bitstream. Alternatively, information for determining the number or types of line candidates partitioning a coding block may be signaled through the bitstream. For example, whether an oblique line having an angle greater than that of a diagonal line and/or an oblique line having an angle smaller than that of a diagonal line may be used as a line candidate may be determined using a 1-bit flag.

Alternatively, at least one among the number, the angles, and the positions of lines partitioning a coding block may be adaptively determined based on at least one among the intra prediction mode of the coding block, the inter prediction mode of the coding block, the position of an available merge candidate of the coding block, and a partitioning pattern of a neighboring block.

When a coding block is partitioned into a plurality of prediction units, intra prediction or inter prediction may be performed on each of the partitioned prediction units.

Figure 12:
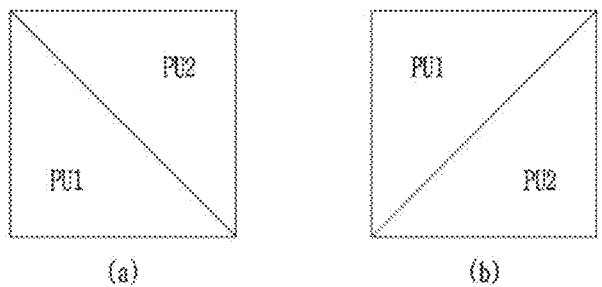
FIG. 12 is a view showing examples of partitioning a coding block into a plurality of prediction units using a diagonal line.

FIG. 12 is a view showing examples of partitioning a coding block into a plurality of prediction units using a diagonal line.

As shown in the examples of FIGS. 12 (a) and 12 (b), a coding block may be partitioned into two triangular prediction units using a diagonal line.

In FIGS. 12 (a) and 12 (b), it is shown that a coding block is partitioned into two prediction units using a diagonal line connecting two vertices of the coding block. However, the coding block may be partitioned into two prediction units using an oblique line, at least one end of which does not pass through a vertex of the coding block.

Figure 13:
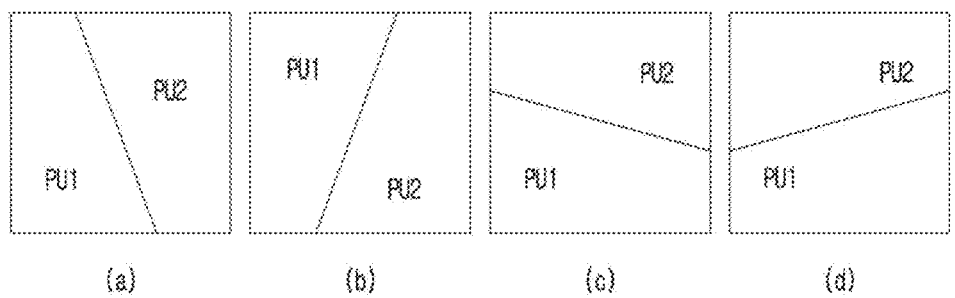
FIG. 13 is a view showing examples of partitioning a coding block into two prediction units.

FIG. 13 is a view showing examples of partitioning a coding block into two prediction units.

As shown in the examples of FIGS. 13 (a) and 13 (b), a coding block may be partitioned into two prediction units using an oblique line, both ends of which are in contact with the top boundary and the bottom boundary of the coding block, respectively.

Alternatively, as shown in the examples of FIGS. 13 (c) and 13 (d), a coding block may be partitioned into two prediction units using an oblique line, both ends of which are in contact with the left boundary and the right boundary of the coding block, respectively.

Alternatively, a coding block may be partitioned into two prediction blocks of different size. For example, a coding block may be partitioned into two prediction units of different size by setting an oblique line partitioning the coding block to contact two boundary surfaces that form one vertex.

Figure 14:
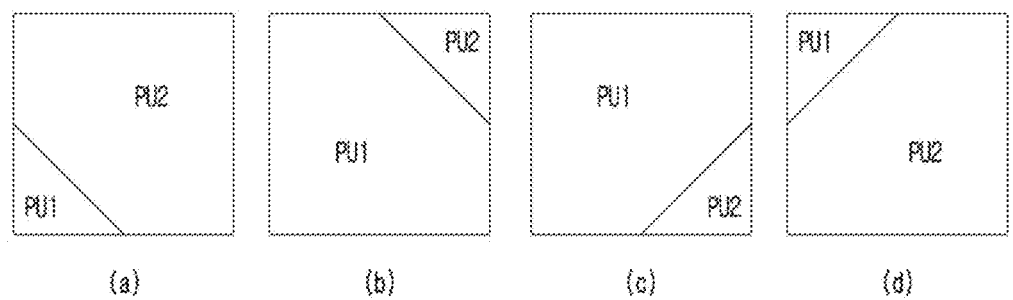
FIG. 14 is a view showing examples of partitioning a coding block into a plurality of prediction blocks of different size.

FIG. 14 is a view showing examples of partitioning a coding block into a plurality of prediction blocks of different size.

As shown in the examples of FIGS. 14 (a) and 14 (b), as a diagonal line connecting the top-left and bottom-right corners of the coding block is set to pass through the left boundary, the right boundary, the top boundary, or the bottom boundary, instead of passing through the top-left corner or the bottom-right corner of the coding block, the coding block may be partitioned into two prediction units having different sizes.

Alternatively, as shown in the examples of FIGS. 14 (c) and 14 (d), as a diagonal line connecting the top-right and bottom-left corners of the coding block is set to pass through the left boundary, the right boundary, the top boundary, or the bottom boundary, instead of passing through the top-left corner or the bottom-right corner of the coding block, the coding block may be partitioned into two prediction units having different sizes.

Each of the prediction units generated by partitioning a coding block will be referred to as an 'N-th prediction unit'. For example, in the examples shown in FIGS. 12 to 14, PU1 may be defined as a first prediction unit, and PU2 may be defined as a second prediction unit. The first prediction unit means a prediction unit including a sample positioned at the bottom left or a sample positioned at the top left in the coding block, and the second prediction unit means a prediction unit including a sample positioned at the top right or a sample positioned at the bottom right in the coding block.

Contrarily, a prediction unit including a sample positioned at the top right or a sample positioned at the bottom right in the coding block may be defined as a first prediction unit, and a prediction unit including a sample positioned at the bottom left or a sample positioned at the top left in the coding block may be defined as a second prediction unit.

Implementations below are described focusing on examples of partitioning a coding block using a diagonal line. Particularly, partitioning a coding block into two prediction units using a diagonal line is referred to as diagonal partitioning or triangular partitioning, and a prediction unit generated based on the diagonal partitioning is referred to as a triangular prediction unit. However, it is also possible to apply the implementations described below to the examples of partitioning a coding block using an oblique line of an angle different from that of a vertical line, a horizontal line, or a diagonal line.

Whether or not to apply the diagonal partitioning to a coding block may be determined based on at least one among a slice type, the maximum number of merge candidates that the merge candidate list may include, the size of the coding block, the shape of the coding block, the prediction encoding mode of the coding block, and the partitioning pattern of the parent node.

For example, whether or not to apply the diagonal partitioning to a coding block may be determined based on whether the current slice is type B. Diagonal partitioning may be allowed only when the current slice is type B.

Alternatively, whether or not to apply the diagonal partitioning to a coding block may be determined based on whether the maximum number of merge candidates included in the merge candidate list is two or more. Diagonal partitioning may be allowed only when the maximum number of merge candidates included in the merge candidate list is two or more.

Alternatively, when at least one among the width and the height is greater than 64 in hardware implementation, there is a problem in that a data processing unit of a 64×64 size is redundantly accessed. Accordingly, when at least one among the width and the height of the coding block is greater than a threshold value, partitioning a coding block into a plurality of prediction blocks may not be allowed. For example, when at least one among the width and the height of a coding block is greater than 64 (e.g., when at least one among the width and the height is 128), diagonal partitioning may not be used.

Alternatively, diagonal partitioning may not be allowed for a coding block of which the number of samples is larger than a threshold value, considering the maximum number of samples that can be simultaneously processed in hardware implementation. For example, diagonal partitioning may not be allowed for a coding tree block of which the number of samples is larger than 4,096.

Alternatively, diagonal partitioning may not be allowed for a coding block of which the number of samples included in the coding block is smaller than a threshold value. For example, it may be set not to apply the diagonal partitioning to a coding block when the number of samples included in the coding block is smaller than 64.

Alternatively, whether or not to apply the diagonal partitioning to a coding block may be determined based on whether the width to height ratio of the coding block is lower than a first threshold value or whether the width to height ratio of the coding block is higher than a second threshold value. Here, the width to height ratio whRatio of the coding block may be determined as a ratio of the width CbW to the height CbH of the coding block as shown in Equation 1.

$$whRatio = CbW/CbH \quad \text{[Equation 1]}$$

The second threshold value may be an inverse number of the first threshold value. For example, when the first threshold value is k, the second threshold value may be 1/k.

The diagonal partitioning may be applied to a coding block only when the width to height ratio of the coding block is between the first threshold value and the second threshold value.

Alternatively, triangular partitioning may be used only when the width to height ratio of the coding block is lower than the first threshold value or higher than the second threshold value. For example, when the first threshold value is 16, diagonal partitioning may not be allowed for a coding block of a 64×4 or 4×64 size.

Alternatively, whether or not to allow the diagonal partitioning may be determined based on the partitioning pattern of the parent node. For example, when a parent node coding block is partitioned based on quad-tree partitioning, diagonal partitioning may be applied to a leaf node coding block. On the other hand, it may be set not to allow the diagonal partitioning to the leaf node coding block when the parent node coding block is partitioned based on binary tree or ternary tree partitioning.

Alternatively, whether or not to allow the diagonal partitioning may be determined based on the prediction encoding mode of a coding block. For example, the diagonal partitioning may be allowed only when the coding block is encoded by intra prediction, when the coding block is encoded by inter prediction, or when the coding block is encoded by a predefined inter prediction mode. Here, the predefined inter prediction mode may represent at least one among a merge mode, an advanced motion vector prediction mode, an affine merge mode, and an affine motion vector prediction mode.

Alternatively, whether or not to allow the diagonal partitioning may be determined based on the size of a parallel processing region. For example, when the size of a coding block is larger than the size of a parallel processing region, diagonal partitioning may not be used.

Whether or not to apply the diagonal partitioning to a coding block may be determined considering two or more of the conditions listed above.

As another example, information indicating whether or not to apply the diagonal partitioning to a coding block may be signaled through a bitstream. The information may be signaled at a sequence, picture, slice, or block level. For example, flag triangle_partition_flag indicating whether triangular partitioning is applied to a coding block may be signaled at a coding block level.

When it is determined to apply the diagonal partitioning to a coding block, information indicating the number of lines partitioning the coding block or the positions of the lines may be signaled through a bitstream.

For example, when a coding block is partitioned by a diagonal line, information indicating the direction of the diagonal line partitioning the coding block may be signaled through a bitstream. For example, flag triangle_partition_type_flag indicating the direction of the diagonal line may be signaled through a bitstream. The flag indicates whether the coding block is partitioned by a diagonal line connecting the top-left corner and the bottom-right corner or whether the coding block is partitioned by a diagonal line connecting the top-right corner and the bottom-left corner. Partitioning a coding block by a diagonal line connecting the top-left corner and the bottom-right corner may be referred to as a left triangular partition type, and partitioning a coding block by a diagonal line connecting the top-right corner and the bottom-left corner may be referred to as a right triangular partition type. For example, when the value of the flag is 0, it may indicate that the partition type of the coding block is the left triangular partition type, and when the value of the flag is 1, it may indicate that the partition type of the coding block is the right triangular partition type.

Additionally, information indicating whether the prediction units have the same size or information indicating the position of a diagonal line for partitioning the coding block may be signaled through a bitstream. For example, when the information indicating the sizes of the prediction units indicates that the sizes of the prediction units are the same, encoding of the information indicating the position of the diagonal is omitted, and the coding block may be partitioned into two prediction units using a diagonal line passing through two vertices of the coding block. On the other hand, when the information indicating the sizes of the prediction units indicates that the sizes of the prediction units are not the same, the position of the diagonal line partitioning the coding block may be determined based on the information indicating the position of the diagonal line. For example, when the left triangular partition type is applied to a coding block, the position information may indicate whether the diagonal line is in contact with the left boundary and the bottom boundary or the top boundary and the right boundary of the coding block. Alternatively, when the right triangular partition type is applied to a coding block, the position information may indicate whether the diagonal line is in contact with the right boundary and the bottom boundary or the top boundary and the left boundary of the coding block.

Information indicating the partition type of a coding block may be signaled at a coding block level. Accordingly, the partition type may be determined for each coding block to which the diagonal partitioning is applied.

As another example, information indicating the partition type may be signaled for a sequence, a picture, a slice, a tile, or a coding tree unit. In this case, partition types of coding blocks to which the diagonal partitioning is applied in a sequence, a picture, a slice, a tile, or a coding tree unit may be set to be the same.

Alternatively, information for determining the partition type may be encoded and signaled for the first coding unit to which the diagonal partitioning is applied in the coding tree unit, and the second and subsequent coding units to which the diagonal partitioning is applied may be set to use a partition type the same as that of the first coding unit.

As another example, the partition type of a coding block may be determined based on the partition type of a neighboring block. Here, the neighboring block may include at least one among a neighboring block adjacent to the top-left corner of the coding block, a neighboring block adjacent to the top-right corner, a neighboring block adjacent to the bottom-left corner, a neighboring block positioned on the top, and a neighboring block positioned on the left side. For example, the partition type of the current block may be set to be the same as the partition type of a neighboring block. Alternatively, the partition type of the current block may be determined based on whether the left triangular partition type is applied to the top-left neighboring block or whether the right triangular partition type is applied to the top-right neighboring block or the bottom-left neighboring block.

The size of a prediction unit may be set not to be larger than that of a transform unit. In addition, it may be set to necessarily include one prediction unit in one transform unit. Accordingly, when VPDU transform unit partitioning is applied to a coding block, diagonal partitioning may be applied to the transform unit instead of applying the diagonal partitioning to the coding block.

Figure 15:
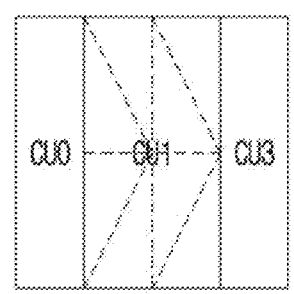
FIG. 15 is a view showing an example of applying diagonal partitioning to a transform unit.

FIG. 15 is a view showing an example of applying diagonal partitioning to a transform unit.

As shown in the example of FIG. 15, when a coding block is partitioned into a plurality of transform units, whether or not to apply the diagonal partitioning to each transform unit may be determined. Alternatively, it may be determined whether the diagonal partitioning is applied by the unit of block having a size smaller than that of the transform unit.

Alternatively, when VPDU transform unit partitioning is applied to a coding block, whether or not to apply the diagonal partitioning to the coding block is determined, and all transform units included in the coding block may be set to follow the determination. For example, when it is determined to apply the diagonal partitioning to a coding block, all transform units included in the coding block may be partitioned into two prediction units.

In order to perform motion prediction compensation on a first triangular prediction unit and a second triangular prediction unit, motion information of each of the first triangular prediction unit and the second triangular prediction unit may be derived. At this point, the motion information of the first triangular prediction unit and the second triangular prediction unit may be derived from merge candidates included in the merge candidate list. To distinguish a general merge candidate list from a merge candidate list used for deriving the motion information of the triangular prediction units, the merge candidate list for deriving the motion information of the triangular prediction units is referred to as a triangular merge candidate list, and a merge candidate included in the triangular merge candidate list will be referred to as a triangular merge candidate. However, using the method of deriving a merge candidate and the method of constructing a merge candidate list described above for the sake of the triangular merge candidates and the method of constructing the triangular merge candidate list is also included in the spirit of the present disclosure.

Information for determining the maximum number of triangular merge candidates that the triangular merge candidate list may include may be signaled through a bitstream. The information may indicate a difference between the maximum number of merge candidates that the merge candidate list may include and the maximum number of triangular merge candidates that the triangular merge candidate list may include.

The triangular merge candidates may be derived from a spatially neighboring block and a temporally neighboring block of a coding block.

Figure 16:
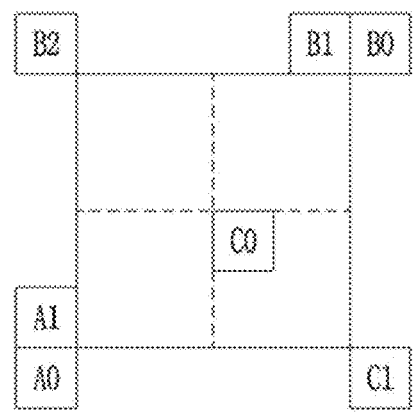
FIG. 16 is a view showing neighboring blocks used for deriving a triangular merge candidate.

FIG. 16 is a view showing neighboring blocks used for deriving a triangular merge candidate.

A triangular merge candidate may be derived using at least one among a neighboring block positioned on the top of a coding block, a neighboring block positioned on the left side of the coding block, and a collocated block included in a picture different from the coding block. The top neighboring block may include at least one among a block including a sample (xCb+CbW−1, yCb−1) positioned on the top of the coding block, a block including a sample (xCb+CbW, yCb−1) positioned on the top of the coding block, and a block including a sample (xCb−1, yCb−1) positioned on the top of the coding block. The left neighboring block may include at least one among a block including a sample (xCb−1, yCb+CbH−1) positioned on the left side of the coding block and a block including a sample (xCb−1, yCb+CbH) positioned on the left side of the coding block. The collocated block may be determined as any one among a block including a sample (xCb+CbW, yCb+CbH) adjacent to the top-right corner of the coding block and a block including a sample (xCb/2, yCb/2) positioned at the center of the coding block, in a collocated picture.

The neighboring blocks may be searched in a predefined order, and triangular merge candidates may be constructed as a triangular merge candidate list according to a predefined order. For example, the triangular merge candidate list may be constructed by searching the triangular merge candidates in the order of B1, A1, B0, A0, C0, B2 and C1.

Motion information of the triangular prediction units may be derived based on the triangular merge candidate list. That is, the triangular prediction units may share one triangular merge candidate list.

In order to derive motion information of the triangular merge unit, information for specifying at least one among the triangular merge candidates included in the triangular merge candidate list may be signaled through a bitstream. For example, index information merge_triangle_idx for specifying at least one among the triangular merge candidates may be signaled through a bitstream.

The index information may specify a combination of a merge candidate of the first triangular prediction unit and a merge candidate of the second triangular prediction unit. For example, Table 1 shows an example of a combination of merge candidates according to index information merge_triangle_idx.

TABLE 1

| merge_triangle_idx | 0 | 1 | 2 | 3 | 4 | 5 | 6 | 7 | 8 |
|---|---|---|---|---|---|---|---|---|---|
| First prediction unit | 1 | 0 | 0 | 0 | 2 | 0 | 0 | 1 | 3 |
| Second prediction unit | 0 | 1 | 2 | 1 | 0 | 3 | 4 | 0 | 0 |
| merge_triangle_idx | 9 | 10 | 11 | 12 | 13 | 14 | 15 | 16 | 17 |

TABLE 1-continued

| First prediction unit | 4 | 0 | 1 | 1 | 0 | 0 | 1 | 1 | 1 |
|---|---|---|---|---|---|---|---|---|---|
| Second prediction unit | 0 | 2 | 2 | 2 | 4 | 3 | 3 | 4 | 4 |
| merge_triangle_idx | 18 | 19 | 20 | 21 | 22 | 23 | 24 | 25 | 26 |
| First triangular prediction unit | 1 | 2 | 2 | 2 | 4 | 3 | 3 | 3 | 4 |
| Second triangular prediction unit | 3 | 1 | 0 | 1 | 3 | 0 | 2 | 4 | 0 |
| merge_triangle_idx | 27 | 28 | 29 | 30 | 31 | 32 | 33 | 34 | 35 |
| First triangular prediction unit | 3 | 2 | 4 | 4 | 2 | 4 | 3 | 4 | 3 |
| Second triangular prediction unit | 1 | 3 | 1 | 1 | 3 | 2 | 2 | 3 | 1 |
| merge_triangle_idx | 36 | 37 | 38 | 39 | | | | | |
| First triangular prediction unit | 2 | 2 | 4 | 3 | | | | | |
| Second triangular prediction unit | 4 | 4 | 2 | 4 | | | | | |

When the value of index information merge_triangle_idx is 1, it indicates that the motion information of the first triangular prediction unit is derived from a merge candidate having an index of 1, and the motion information of the second triangular prediction unit is derived from a merge candidate having an index of 0. A triangular merge candidate for deriving motion information of the first triangular prediction unit and a triangular merge candidate for deriving motion information of the second triangular prediction unit may be determined through index information merge_triangle_idx.

A partition type of a coding block to which the diagonal partitioning is applied may be determined based on the index information. That is, the index information may specify a combination of a merge candidate of the first triangular prediction unit, a merge candidate of the second triangular prediction unit, and a partitioning direction of the coding block. When a partition type of the coding block is determined based on the index information, information triangle_partition_type_flag indicating the direction of a diagonal line partitioning the coding block may not be coded. Table 2 expresses partition types of a coding block with respect to index information merge_triangle_idx.

TABLE 2

| merge_triangle_idx | 0 | 1 | 2 | 3 | 4 | 5 | 6 | 7 | 8 |
|---|---|---|---|---|---|---|---|---|---|
| TriangleDir | 0 | 1 | 1 | 0 | 0 | 1 | 1 | 1 | 0 |
| merge_triangle_idx | 9 | 10 | 11 | 12 | 13 | 14 | 15 | 16 | 17 |
| TriangleDir | 0 | 0 | 0 | 1 | 0 | 0 | 0 | 0 | 1 |
| merge_triangle_idx | 18 | 19 | 20 | 21 | 22 | 23 | 24 | 25 | 26 |
| TriangleDir | 1 | 1 | 1 | 0 | 0 | 1 | 1 | 1 | 1 |
| merge_triangle_idx | 27 | 28 | 29 | 30 | 31 | 32 | 33 | 34 | 35 |
| TriangleDir | 1 | 1 | 1 | 0 | 0 | 1 | 0 | 1 | 0 |
| merge_triangle_idx | 36 | 37 | 38 | 39 | | | | | |
| TriangleDir | 0 | 1 | 0 | 0 | | | | | |

When variable TriangleDir is 0, it indicates that the left triangle partition type is applied to the coding block, and when variable TriangleDir is 1, it indicates that the right triangle partition type is applied to the coding block. By combining Table 1 and Table 2, it may be set to specify a combination of the merge candidate of the first triangular prediction unit, the merge candidate of the second triangular prediction unit, and the partitioning direction of the coding block by index information merge_triangle_idx.

As another example, index information only for any one among the first triangular prediction unit and the second triangular prediction unit may be signaled, and an index of a triangular merge candidate for the other one among the first triangular prediction unit and the second triangular prediction unit may be determined based on the index information. For example, a triangular merge candidate of the first triangular prediction unit may be determined based on index information merge_triangle_idx indicating an index of any one among the triangular merge candidates. In addition, a triangular merge candidate of the second triangular prediction unit may be specified based on merge_triangle_idx. For example, the triangular merge candidate of the second triangular prediction unit may be derived by adding or subtracting an offset to or from index information merge_triangle_idx. The offset may be an integer such as 1 or 2. For example, a triangular merge candidate having a value obtained by adding 1 to merge traingle idx as an index may be determined as the triangular merge candidate of the second triangular prediction unit. When merge_triangle_idx indicates a triangular merge candidate having the largest index value among the triangular merge candidates, motion information of the second triangular prediction unit may be derived from a triangular merge candidate having an index of 0 or a triangular merge candidate having a value obtained by subtracting 1 from merge_triangle_idx as an index.

Alternatively, motion information of the second triangular prediction unit may be derived from a triangular merge candidate having a reference picture the same as that of the triangular merge candidate of the first triangular prediction unit specified by the index information. Here, the triangular merge candidate having a reference picture the same as that of the triangular merge candidate of the first triangular prediction unit may indicate a triangular merge candidate having at least one among L0 reference picture and L1 reference picture the same as those of the triangular merge candidate of the first triangular prediction unit. When there is a plurality of triangular merge candidates having a reference picture the same as that of the triangular merge candidate of the first triangular prediction unit, at least one among the triangular merge candidates may be selected based on whether the merge candidate includes bidirectional motion information or a difference value between the index of the merge candidate and the index information.

As another example, index information may be signaled for each of the first triangular prediction unit and the second triangular prediction unit. For example, first index information 1st_merge_idx for determining a triangular merge candidate of the first triangular prediction unit and second index information 2nd_merge_idx for determining a triangular merge candidate of the second triangular prediction unit may be signaled through a bitstream. The motion information of the first triangular prediction unit may be derived from the triangular merge candidate determined based on first index information 1st_merge_idx, and the motion information of the second triangular prediction unit may be derived from the triangular merge candidate determined based on second index information 2nd_merge_idx.

First index information 1st_merge_idx may indicate an index of any one among the triangular merge candidates included in the triangular merge candidate list. The triangular merge candidate of the first triangular prediction unit may be determined as a triangular merge candidate indicated by first index information 1st_merge_idx.

The triangular merge candidate indicated by first index information 1st_merge_idx may be set not to be used as a triangular merge candidate of the second triangular prediction unit. Accordingly, second index information 2nd_merge_idx of the second triangular prediction unit may indicate an index of any one among the remaining triangular merge candidates excluding the triangular merge candidate indicated by the first index information. When the value of second index information 2nd_merge_idx is smaller than the value of first index information 1st_merge_idx, the triangular merge candidate of the second triangular prediction unit may be determined as a triangular merge candidate having the index information indicated by second index information 2nd_merge_idx. On the other hand, when the value of second index information 2nd_merge_idx is equal to or larger than the value of first index information 1st_merge_idx, the triangular merge candidate of the second triangular prediction unit may be determined as a triangular merge candidate having a value obtained by adding 1 to the value of second index information 2nd_merge_idx as an index.

Alternatively, whether or not to signal the second index information may be determined according to the number of triangular merge candidates included in the triangular merge candidate list. For example, when the maximum number of triangular merge candidates that the triangular merge candidate list may include does not exceed 2, signaling of the second index information may be omitted. When signaling of the second index information is omitted, a second triangular merge candidate may be derived by adding or subtracting an offset to or from the first index information. For example, when the maximum number of triangular merge candidates that the triangular merge candidate list may include is 2 and the first index information indicates index 0, the second triangular merge candidate may be derived by adding 1 to the first index information. Alternatively, when the maximum number of triangular merge candidates that the triangular merge candidate list may include is 2 and the first index information indicates 1, the second triangular merge candidate may be derived by subtracting 1 from the first index information.

Alternatively, when signaling of the second index information is omitted, the second index information may be set to a default value. Here, the default value may be 0. The second triangular merge candidate may be derived by comparing the first index information and the second index information. For example, when the second index information is smaller than the first index information, a merge candidate having index 0 may be set as the second triangular merge candidate, and when the second index information is equal to or greater than the first index information, a merge candidate having index 1 may be set as the second triangular merge candidate.

When the triangular merge candidate has unidirectional motion information, the unidirectional motion information of the triangular merge candidate may be set as motion information of the triangular prediction unit. On the other hand, when the triangular merge candidate has bidirectional motion information, only one among L0 motion information and L1 motion information may be set as motion information of the triangular prediction unit. Which one among L0 motion information and L1 motion information will be taken may be determined based on the index of the triangular merge candidate or motion information of another triangular prediction unit.

For example, when the index of the triangular merge candidate is an even number, L0 motion information of the triangular prediction unit may be set to 0, and L1 motion information of the triangular merge candidate may be set as L1 motion information of the triangular prediction unit. On the other hand, when the index of the triangular merge candidate is an odd number, L1 motion information of the triangular prediction unit may be set to 0, and L0 motion information of the triangular merge candidate may be set to 0. Contrarily, when the index of the triangular merge candidate is an even number, L0 motion information of the triangular merge candidate may be set as L0 motion information of the triangular prediction unit, and when the index of the triangular merge candidate is an odd number, L1 motion information of the triangular merge candidate may be set as L1 motion information of the triangular prediction unit. Alternatively, when the triangular merge candidate is an even number for the first triangular prediction unit, L0 motion information of the triangular merge candidate may be set as L0 motion information of the first triangular prediction unit, whereas when the triangular merge candidate is an odd number for the second triangular prediction unit, L1 motion information of the triangular merge candidate may be set as L1 motion information of the second triangular prediction unit.

Alternatively, when the first triangular prediction unit has L0 motion information, L0 motion information of the second triangular prediction unit may be set to 0, and L1 motion information of the triangular merge candidate may be set as L1 motion information of the second triangular prediction unit. On the other hand, when the first triangular prediction unit has L1 motion information, L1 motion information of the second triangular prediction unit may be set to 0, and L0 motion information of the triangular merge candidate may be set as L0 motion information of the second triangular prediction unit.

A triangular merge candidate list for deriving motion information of the first triangular prediction unit and a triangular merge candidate list for deriving motion information of the second triangular prediction unit may be set differently.

For example, when a triangular merge candidate for deriving motion information of the first triangular prediction unit in the triangular merge candidate list is specified based on the index information for the first triangular prediction unit, motion information of the second triangular prediction unit may be derived using the triangular merge candidate list including the remaining triangular merge candidates excluding the triangular merge candidate indicated by the index information. Specifically, the motion information of the second triangular prediction unit may be derived from any one among the remaining triangular merge candidates.

Accordingly, the maximum number of triangular merge candidates that the triangular merge candidate list of the first triangular prediction unit includes and the maximum number of triangular merge candidates that the triangular merge candidate list of the second triangular prediction unit includes may be different. For example, when the triangular merge candidate list of the first triangular prediction unit includes M merge candidates, the triangular merge candidate list of the second triangular prediction unit may include M−1 merge candidates excluding the triangular merge candidate indicated by the index information of the first triangular prediction unit.

As another example, a merge candidate of each triangular prediction unit is derived based on neighboring blocks adjacent to a coding block, and availability of the neighboring blocks may be determined considering the shape or the position of the triangular prediction unit.

FIG. 17 is a view for describing examples of determining availability of a neighboring block for each triangular prediction unit.

A neighboring block not adjacent to the first triangular prediction unit may be set as unavailable for the first triangular prediction unit, and a neighboring block not adjacent to the second triangular prediction unit may be set as unavailable for the second triangular prediction unit.

For example, as shown in the example of FIG. 17 (a), when the left triangular partition type is applied to a coding block, it may be determined that blocks A1, A0 and A2 adjacent to the first triangular prediction unit among the neighboring blocks adjacent to the coding block are available for the first triangular prediction unit, whereas blocks B0 and B1 are unavailable for the first triangular prediction unit. Accordingly, the triangular merge candidate list for the first triangular prediction unit may include triangular merge candidates derived from blocks A1, A0 and A2 and may not include triangular merge candidates derived from blocks B0 and B1.

As shown in the example of FIG. 17 (b), when the left triangular partition type is applied to a coding block, it may be determined that blocks B0 and B1 adjacent to the second triangular prediction unit are available for the second triangular prediction unit, whereas blocks A1, A0 and A2 are unavailable for the second triangular prediction unit. Accordingly, the triangular merge candidate list for the second triangular prediction unit may include triangular merge candidates derived from blocks B0 and B1 and may not include triangular merge candidates derived from blocks A1, A0 and A2.

Accordingly, the number of triangular merge candidates or the range of triangular merge candidates that the triangular prediction unit may use may be determined based on at least one among the position of the triangular prediction unit or the partition type of the coding block.

As another example, the merge mode may be applied to only one among the first triangular prediction unit and the second triangular prediction unit. In addition, the motion information of the other one among the first triangular prediction unit and the second triangular prediction unit may be set to be the same as the motion information of the triangular prediction unit to which the merge mode is applied, or may be derived by refining the motion information of the triangular prediction unit to which the merge mode is applied.

For example, a motion vector and a reference picture index of the first triangular prediction unit may be derived based on a triangular merge candidate, and a motion vector of the second triangular prediction unit may be derived by refining the motion vector of the first triangular prediction unit. For example, the motion vector of the second triangular prediction unit may be derived by adding or subtracting a refine motion vector {Rx, Ry} to or from the motion vector {mvD1LXx, mvD1LXy} of the first triangular prediction unit. The reference picture index of the second triangular prediction unit may be set to be the same as the reference picture index of the first triangular prediction unit.

Information for determining a refine motion vector indicating the difference between the motion vector of the first triangular prediction unit and the motion vector of the second triangular prediction unit may be signaled through a bitstream. The information may include at least one among information indicating the size of the refine motion vector and information indicating the sign of the refine motion vector.

Alternatively, the sign of the refine motion vector may be derived based on at least one among the position of the triangular prediction unit, the index of the triangular prediction unit, and the partition type applied to the coding block.

As another example, the motion vector and the reference picture index of any one among the first triangular prediction unit and the second triangular prediction unit may be signaled. The motion vector of the other one among the first triangular prediction unit and the second triangular prediction unit may be derived by refining the signaled motion vector.

For example, the motion vector and the reference picture index of the first triangular prediction unit may be determined based on information signaled from a bitstream. In addition, the motion vector of the second triangular prediction unit may be derived by refining the motion vector of the first triangular prediction unit. For example, the motion vector of the second triangular prediction unit may be derived by adding or subtracting a refine motion vector {Rx, Ry} to or from the motion vector {mvD1LXx, mvD1LXy} of the first triangular prediction unit. The reference picture index of the second triangular prediction unit may be set to be the same as the reference picture index of the first triangular prediction unit.

Motion prediction compensation prediction for each coding block may be performed based on the motion information of the first triangular prediction unit and the motion information of the second triangular prediction unit. At this point, degradation of video quality may occur at the boundary between the first triangular prediction unit and the second triangular prediction unit. For example, continuity of video quality may be degraded in the neighborhood of an edge existing at the boundary between the first triangular prediction unit and the second triangular prediction unit. In order to reduce the degradation of video quality at the boundary, a prediction sample may be derived through a smoothing filter or a weighted prediction.

The prediction samples in a coding block to which diagonal partitioning is applied may be derived based on a weighted sum operation of a first prediction sample obtained based on the motion information of the first triangular prediction unit and a second prediction sample obtained based on the motion information of the second triangular prediction unit. Alternatively, a prediction sample of the first triangular prediction unit is derived from a first prediction block determined based on the motion information of the first triangular prediction unit, and a prediction sample of the second triangular prediction unit is derived from a second prediction block determined based on the motion information of the second triangular prediction unit, and a prediction sample positioned at the boundary region of the first triangular prediction unit and the second triangular prediction unit may be derived based on a weighted sum operation of the first prediction sample included in the first prediction block and the second prediction sample included in the second prediction block. For example, Equation 2 shows an example of deriving prediction samples of the first triangular prediction unit and the second triangular prediction unit.

$$P(x,y) = w1*P1(x,y) + (1-w1)*P2(x,y) \quad \text{[Equation 2]}$$

In Equation 2, P1 denotes a first prediction sample, and P2 denotes a second prediction sample. w1 denotes a weighting value applied to the first prediction sample, and (1-w1) denotes a weighting value applied to the second prediction sample. As shown in the example of Equation 2, the weighting value applied to the second prediction sample may be derived by subtracting the weighting value applied to the first prediction sample from a constant value.

When the left triangular partition type is applied to a coding block, the boundary region may include prediction samples of which the x-axis coordinate and the y-axis coordinate are the same. On the other hand, when the right triangular partition type is applied to a coding block, the boundary region may include prediction samples of which the sum of the x-axis coordinate and the y-axis coordinate is larger than or equal to a first threshold value and smaller than a second threshold value.

A size of the boundary region may be determined based on at least one among the size of the coding block, the shape of the coding block, motion information of the triangular prediction units, a value of difference between the motion vectors of the triangular prediction units, an output order of reference pictures, and a value of difference between the first prediction sample and the second prediction sample at the diagonal boundary.

Figure 18:
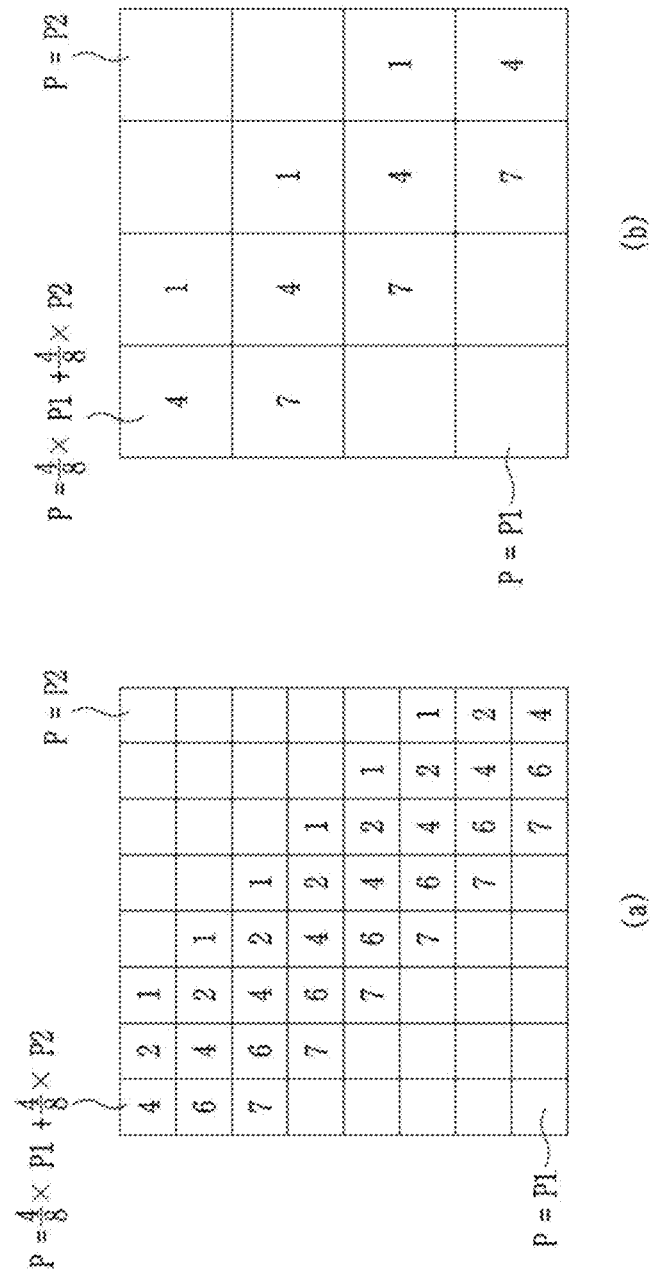
FIG. 18 is a view showing examples of deriving a prediction sample based on a weighted sum operation of a first prediction sample and a second prediction sample.
Figure 19:
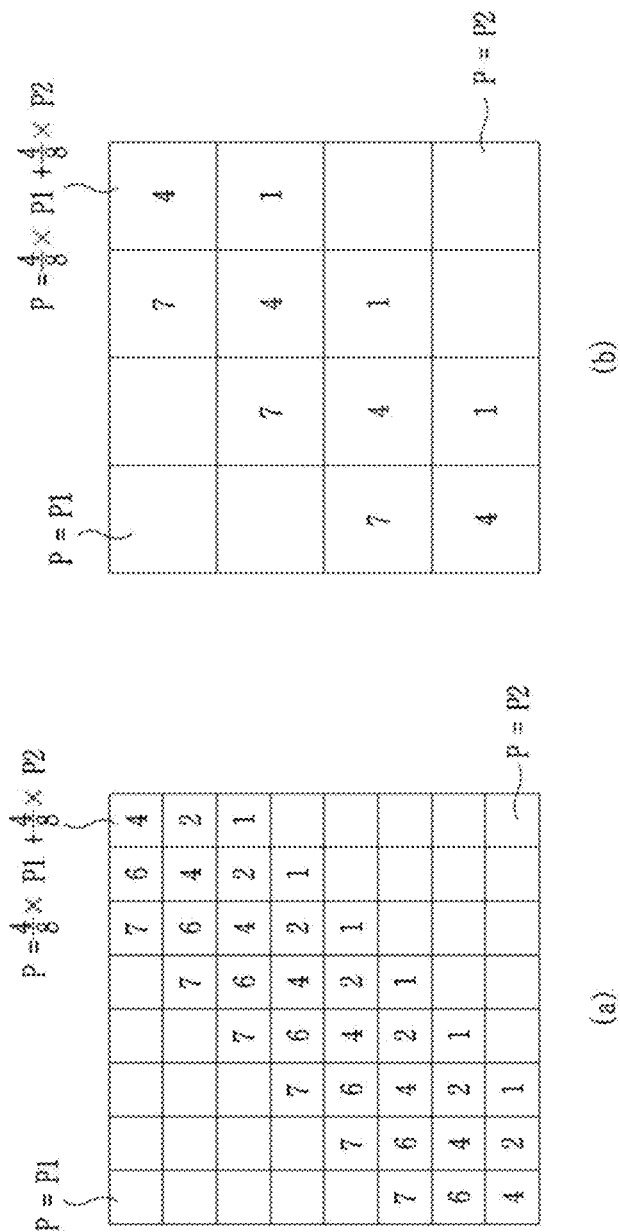
FIG. 19 is a view showing examples of deriving a prediction sample based on a weighted sum operation of a first prediction sample and a second prediction sample.

FIGS. 18 and 19 are views showing examples of deriving a prediction sample based on a weighted sum operation of a first prediction sample and a second prediction sample. FIG. 18 shows an example of applying the left triangular partition type to a coding block, and FIG. 19 shows an example of applying the right triangular partition type to a coding block. In addition, FIGS. 18 (a) and 19 (a) are views showing prediction patterns for a luma component, and FIGS. 18 (b) and 19 (b) are views showing prediction patterns for a chroma component.

In the drawings, the numbers marked on the prediction samples positioned near the boundary between the first prediction unit and the second prediction unit indicate weighting values applied to the first prediction sample. For example, when a number marked on a prediction sample is N, the prediction sample may be derived by applying a weighting value of N/8 to the first prediction sample and applying a weighting value of (1−(N/8)) to the second prediction sample.

In a non-boundary region, the first prediction sample or the second prediction sample may be determined as a prediction sample. Referring to the example of FIG. 18, in a region belonging to the first triangular prediction unit among the regions in which the absolute value of the difference between the x-axis coordinate and the y-axis coordinate is larger than a threshold value, the first prediction sample derived based on the motion information of the first triangular prediction unit may be determined as a prediction sample. On the other hand, in a region belonging to the second triangular prediction unit among the regions in which the value of difference between the x-axis coordinate and the y-axis coordinate is larger than a threshold value, the second prediction sample derived based on the motion information of the second triangular prediction unit may be determined as a prediction sample.

Referring to the example of FIG. 19, in a region in which the sum of the x-axis coordinate and the y-axis coordinate is smaller than a first threshold value, the first prediction sample derived based on the motion information of the first triangular prediction unit may be determined as a prediction sample. On the other hand, in a region in which the sum of the x-axis coordinate and the y-axis coordinate is larger than a second threshold value, the second prediction sample derived based on the motion information of the second triangular prediction unit may be determined as a prediction sample.

A threshold value for determining a non-boundary region may be determined based on at least one among the size of a coding block, the shape of the coding block, and a color component. For example, when the threshold value for a luma component is set to N, the threshold value for a chroma component may be set to N/2.

The prediction samples included in the boundary region may be derived based on a weighted sum operation of the first prediction sample and the second prediction sample. At this point, the weighting values applied to the first prediction sample and the second prediction sample may be determined based on at least one among the position of a prediction sample, the size of a coding block, the shape of the coding block, and a color component.

For example, as shown in the example of FIG. 18 (a), prediction samples at the position of the same x-axis coordinate and y-axis coordinate may be derived by applying the same weighting value to the first prediction sample and the second prediction sample. Prediction samples of which the absolute value of the difference between the x-axis coordinate and the y-axis coordinate is 1 may be derived by setting the weighting value ratio applied to the first prediction sample and the second prediction sample to (3:1) or (1:3). In addition, prediction samples of which the absolute value of the difference of the x-axis coordinate and the y-axis coordinate is 2 may be derived by setting the weighting value ratio applied to the first prediction sample and the second prediction sample to (7:1) or (1:7).

Alternatively, as shown in the example of FIG. 18 (b), prediction samples at the position of the same x-axis coordinate and y-axis coordinate may be derived by applying the same weighting value to the first prediction sample and the second prediction sample, and prediction samples of which the absolute value of the difference between the x-axis coordinate and the y-axis coordinate is 1 may be derived by setting the weighting value ratio applied to the first prediction sample and the second prediction sample to (7:1) or (1:7).

For example, as shown in the example of FIG. 19 (a), prediction samples of which the sum of the x-axis coordinate and the y-axis coordinate is smaller than the width or the height of a coding block by 1 may be derived by applying the same weighting value to the first prediction sample and the second prediction sample. Prediction samples of which the sum of the x-axis coordinate and the y-axis coordinate is equal to or smaller than the width or the height of the coding block by 2 may be derived by setting the weighting value ratio applied to the first prediction sample and the second prediction sample to (3:1) or (1:3). Predicted samples of which the sum of the x-axis coordinates and the y-axis coordinates is greater than or smaller than the width or the height of the coding block by 1 or 3 may be derived by setting the weighting value ratio applied to the first prediction sample and the second prediction sample to (7:1) or (1:7).

Alternatively, as shown in the example of FIG. 19 (b), prediction samples of which the sum of the x-axis coordinate and the y-axis coordinate is smaller than the width or the height of a coding block by 1 may be derived by applying the same weighting value to the first prediction sample and the second prediction sample. Prediction samples of which the sum of the x-axis coordinate and the y-axis coordinate is equal to or smaller than the width or the height of the coding block by 2 may be derived by setting the weighting value ratio applied to the first prediction sample and the second prediction sample to (7:1) or (1:7).

As another example, the weighting value may be determined considering the position of a prediction sample or the shape of a coding block. Equations 3 to 5 show an example of deriving a weighting value when the left triangular partition type is applied to a coding block. Equation 3 shows an example of deriving a weighting value applied to the first prediction sample when the coding block is a square shape.

$$w1=(x-y+4)/8 \qquad \text{[Equation 3]}$$

In Equation 3, x and y denote the position of a prediction sample. When a coding block is a non-square shape, a weighting value applied to the first prediction sample may be derived as shown in Equation 4 or 5. Equation 4 shows a case where the width of a coding block is greater than the height, and Equation 5 shows a case where the width of a coding block is smaller than the height.

$$w1=((x/whRatio)-y+4)/8 \quad \text{[Equation 4]}$$

$$w1=(x-(y*whRatio)+4)/8 \quad \text{[Equation 5]}$$

When the right triangular partition type is applied to a coding block, a weighting value applied to the first prediction sample may be determined as shown in Equations 6 to 8. Equation 6 shows an example of deriving a weighting value applied to the first prediction sample when the coding block is a square shape.

$$w1=(CbW-1-x-y)+4)/8 \quad \text{[Equation 6]}$$

In Equation 6, CbW denotes the width of a coding block. When the coding block is a non-square shape, the weighting value applied to the first prediction sample may be derived as shown in Equation 7 or Equation 8. Equation 7 shows a case where the width of a coding block is greater than the height, and Equation 8 shows a case where the width of a coding block is smaller than the height.

$$w1=((CbH|1|(x/whRatio)-y)+4)/8 \quad \text{[Equation 7]}$$

$$w1=(CbW-1-x(y*whRatio)+4)/8 \quad \text{[Equation 8]}$$

In Equation 7, CbH denotes the height of the coding block.

As shown in the example, among the prediction samples in the boundary region, prediction samples included in the first triangular prediction unit are derived by assigning a weighting value larger than that of the second prediction sample to the first prediction sample, and prediction samples included in the second triangular prediction unit are derived by assigning a weighting value larger than that of the first prediction sample to the second prediction sample.

When diagonal partitioning is applied to a coding block, it may be set not to apply a combined prediction mode combining the intra prediction mode and the merge mode to the coding block.

Intra prediction is for predicting a current block using reconstructed samples that have been encoded/decoded in the neighborhood of the current block. At this point, samples reconstructed before an in-loop filter is applied may be used for intra prediction of the current block.

The intra prediction technique includes matrix-based intra prediction, and general intra prediction considering directionality with respect to neighboring reconstructed samples. Information indicating the intra prediction technique of the current block may be signaled through a bitstream. The information may be a 1-bit flag. Alternatively, the intra prediction technique of the current block may be determined based on at least one among the position of the current block, the size of the current block, the shape of the current block, and an intra prediction technique of a neighboring block. For example, when the current block exists across a picture boundary, it may be set not to apply the matrix-based intra prediction intra prediction to the current block.

The matrix-based intra prediction intra prediction is a method of acquiring a prediction block of the current block by an encoder and a decoder based on a matrix product between a previously stored matrix and reconstructed samples in the neighborhood of the current block. Information for specifying any one among a plurality of previously stored matrixes may be signaled through a bitstream. The decoder may determine a matrix for intra prediction of the current block based on the information and the size of the current block.

The general intra prediction is a method of acquiring a prediction block for the current block based on a non-angular intra prediction mode or an angular intra prediction mode. Hereinafter, a process of performing intra prediction based on general intra prediction will be described in more detail with reference to the drawings.

Figure 20:
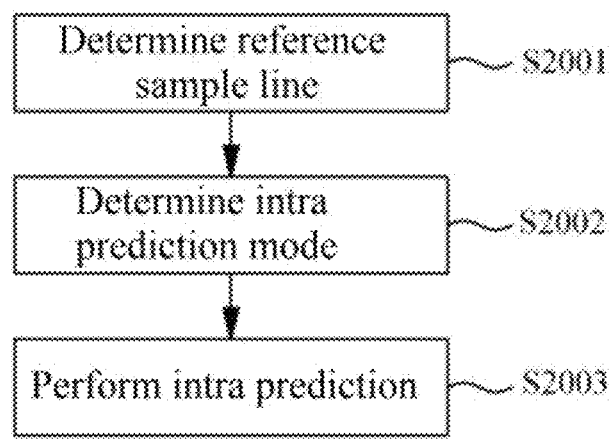
FIG. 20 is a flowchart illustrating an intra prediction method according to an implementation of the present disclosure.

FIG. 20 is a flowchart illustrating an intra prediction method according to an implementation of the present disclosure.

A reference sample line of the current block may be determined (S2001). The reference sample line means a set of reference samples included in a k-th line apart from the top and/or the left side of the current block. The reference samples may be derived from reconstructed samples that have been encoded/decoded in the neighborhood of the current block.

Index information for identifying the reference sample line of the current block among a plurality of reference sample lines may be signaled through a bitstream. For example, index information intra_luma_ref_idx for specifying the reference sample line of the current block may be signaled through a bitstream. The index information may be signaled by the unit of coding block.

The plurality of reference sample lines may include at least one among a first line, a second line, a third line, and a fourth line on the top and/or left side of the current block. A reference sample line configured of a row adjacent to the top of the current block and a column adjacent to the left side of the current block among the plurality of reference sample lines is referred to as an adjacent reference sample line, and the other reference sample lines may be referred to as non-adjacent reference sample lines.

Only some of the plurality of reference sample lines may be selected as the reference sample line of the current block. For example, remaining reference sample lines excluding a third non-adjacent reference sample line among the plurality of reference sample lines may be set as candidate reference sample lines. Table 3 shows indexes respectively assigned to candidate reference sample lines.

TABLE 3

| Indexes (intra_luma_ref_idx) | Reference sample lines |
| --- | --- |
| 0 | Adjacent reference sample |
| 1 | First non-adjacent reference sample line |
| 2 | Second non-adjacent reference sample line |

A larger number of candidate reference sample lines or a smaller number of candidate reference sample lines than the candidate reference sample lines described above may be set. In addition, the number or positions of non-adjacent reference sample lines set as candidate reference sample lines is not limited to the example described above. For example, a first non-adjacent reference sample line and a third non-adjacent reference sample line may be set as candidate reference sample lines, or a second non-adjacent reference sample line and a third non-adjacent reference sample line may be set as candidate reference sample lines. Alternatively, all of the first non-adjacent reference sample line, the second non-adjacent reference sample line, and the third non-adjacent reference sample line may be set as candidate reference sample lines.

The number or types of candidate reference sample lines may be determined based on at least one among the size of the current block, the shape of the current block, the position of the current block, whether or not the current block is partitioned into subblocks, and the intra prediction mode of the current block.

The reference sample line of the current block may be determined based on at least one among the position of the current block, the size of the current block, the shape of the current block, and a prediction encoding mode of a neighboring block. For example, when the current block is in contact with the boundary of a picture, a tile, a slice, or a coding tree unit, the adjacent reference sample line may be determined as the reference sample line of the current block.

Alternatively, when the current block is a non-square shape, an adjacent reference sample line may be determined as the reference sample line of the current block. Alternatively, when the width to height ratio of the current block is higher than or equal to a threshold value, the adjacent reference sample line may be determined as the reference sample line of the current block.

The reference sample line may include top reference samples positioned on the top of the current block and left reference samples positioned on the left side of the current block. The top reference samples and the left reference samples may be derived from reconstructed samples in the neighborhood of the current block. The reconstructed samples may be in a state before the in-loop filter is applied.

Next, the intra prediction mode of the current block may be determined (S2002). As for the intra prediction mode of the current block, at least one among a non-angular intra prediction mode and an angular intra prediction mode may be determined as the intra prediction mode of the current block. The non-angular intra prediction mode includes a planar mode and a DC mode, and the angular intra prediction mode includes 33 or 65 modes between the bottom-left diagonal direction and the top-right diagonal direction.

Figure 21:
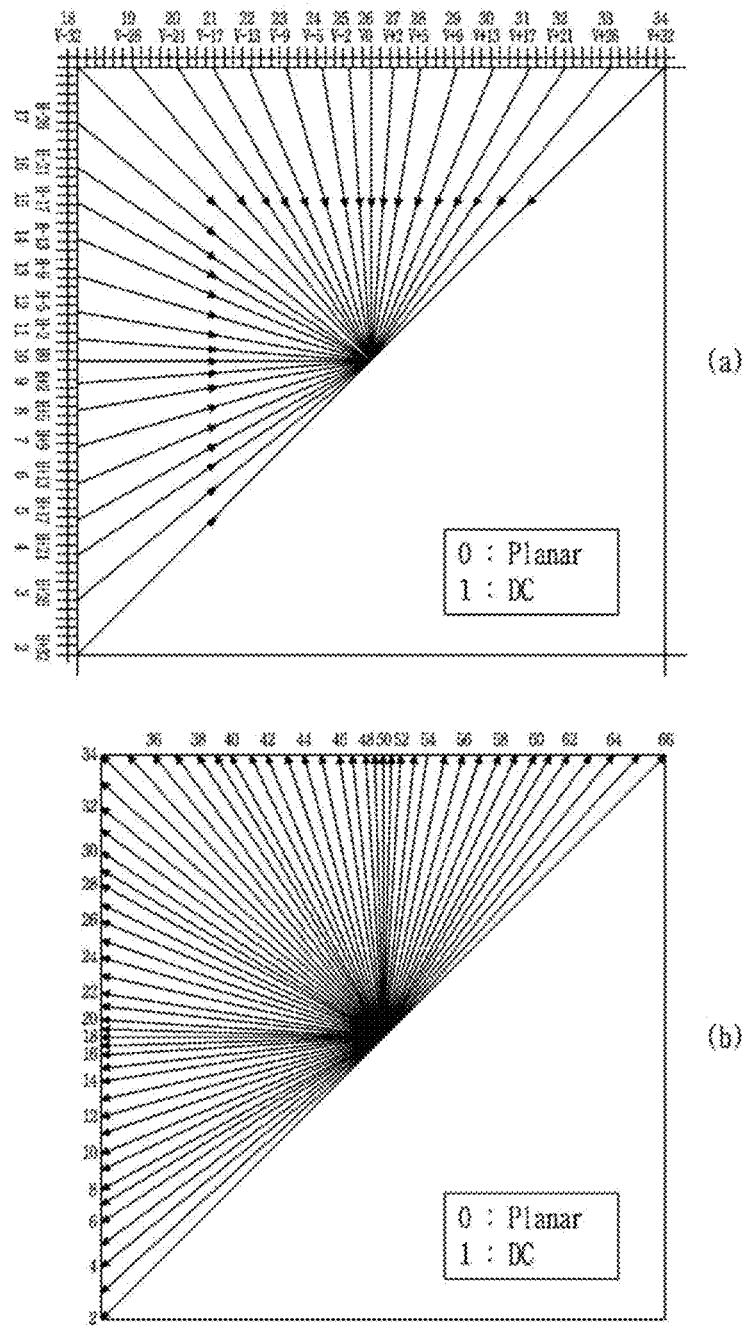
FIG. 21 is a view showing intra prediction modes.

FIG. 21 is a view showing intra prediction modes.

FIG. 21 (a) shows 35 intra prediction modes, and FIG. 21 (b) shows 67 intra prediction modes.

A larger or smaller number of intra prediction modes than those shown in FIG. 21 may be defined.

A Most Probable Mode (MPM) may be set based on the intra prediction mode of a neighboring block adjacent to the current block. Here, the neighboring block may include a left neighboring block adjacent to the left side of the current block and a top neighboring block adjacent to the top of the current block.

The number of MPMs included in an MPM list may be previously set in the encoder and the decoder. The number of MPMs included in the MPM list may be preset in the encoder and the decoder. For example, the number of MPMs may be 3, 4, 5 or 6. Alternatively, information indicating the number of MPMs may be signaled through a bitstream. Alternatively, the number of MPMs may be determined based on at least one among the prediction encoding mode of a neighboring block, and the size, the shape, and the reference sample line index of the current block. For example, when an adjacent reference sample line is determined as the reference sample line of the current block, N MPMs may be used, whereas when a non-adjacent reference sample line is determined as the reference sample line of the current block, M MPMs may be used. M is a natural number smaller than N, and for example, N may be 6, and M may be 5, 4 or 3. Accordingly, when the index of the reference sample line of the current block is 0 and the MPM flag is true, any one among 6 candidate intra prediction modes may be determined as the intra prediction mode of the current block, whereas when the index of the reference sample line of the current block is larger than 0 and the MPM flag is true, any one among 5 candidate intra prediction modes may be determined as the intra prediction mode of the current block.

Alternatively, a fixed number (e.g., 6 or 5) of MPM candidates may be used regardless of the index of the reference sample line of the current block.

An MPM list including a plurality of MPMs is generated, and information indicating whether an MPM that is the same as the intra prediction mode of the current block is included in the MPM list may be signaled through a bitstream. The information is a 1-bit flag and may be referred to as an MPM flag. When the MPM flag indicates that an MPM the same as that of the current block is included in the MPM list, index information identifying one among the MPMs may be signaled through a bitstream. For example, index information mpm_idx specifying any one among the plurality of MPMs may be signaled through a bitstream. The MPM specified by the index information may be set as the intra prediction mode of the current block. When the MPM flag indicates that an MPM the same as that of the current block is not included in the MPM list, residual mode information indicating any one among residual intra prediction modes other than MPMs may be signaled through a bitstream. The residual mode information indicates an index value corresponding to the intra prediction mode of the current block when indexes are reassigned to the residual intra prediction modes excluding the MPMs. The decoder may arrange the MPMs in ascending order and determine the intra prediction mode of the current block by comparing the residual mode information with the MPMs. For example, when the residual mode information is equal to or smaller than the MPM, the intra prediction mode of the current block may be derived by adding 1 to the residual mode information.

When the intra prediction mode of the current block is derived, comparison between some of the MPMs and the residual mode information may be omitted. For example, among the MPMs, MPMs of non-angular intra prediction mode may be excluded from comparison targets. When non-angular intra prediction modes are set as MPMs, it is clear that the residual mode information indicates the angular intra prediction mode, and thus the intra prediction mode of the current block may be derived through comparison between the residual MPMs excluding the non-angular intra prediction modes and the residual mode information. Instead of excluding the non-angular intra prediction modes from the comparison targets, the number of the non-angular intra prediction modes is added to the residual mode information, and then a result value of the comparison may be compared with the residual MPMs.

Instead of setting the default mode to MPM, information indicating whether or not the intra prediction mode of the current block is the default mode may be signaled through a bitstream. The information is a 1-bit flag, and the flag may be referred to as a default mode flag. The default mode flag may be signaled only when the MPM flag indicates that an MPM the same as that of the current block is included in the MPM list. As described above, the default mode may include at least one among a planar mode, a DC mode, a vertical direction mode, and a horizontal direction mode. For example, when the planar mode is set as the default mode, the default mode flag may indicate whether or not the intra prediction mode of the current block is a planar mode. When the default mode flag indicates that the intra prediction mode of the current block is not the default mode, one among the MPMs indicated by the index information may be set as the intra prediction mode of the current block.

When the default mode flag is used, it may be set not to set an intra prediction mode the same as the default mode as an MPM. For example, when the default mode flag indicates whether the intra prediction mode of the current block is a planar mode, the intra prediction mode of the current block may be derived by using 5 MPMs excluding the MPM corresponding to the planar mode.

When a plurality of intra prediction modes is set as default modes, index information indicating any one among the default modes may be further signaled. The intra prediction mode of the current block may be set as the default mode indicated by the index information.

When the index of the reference sample line of the current block is not 0, it may be set not to use the default mode. For example, it may be set not to use a non-angular intra prediction mode such as a DC mode or a planar mode when a non-adjacent reference sample line is determined as the reference sample line of the current block. Accordingly, when the index of the reference sample line is not 0, the default mode flag is not signaled, and the value of the default mode flag may be set to a predefined value (i.e., false).

When the intra prediction mode of the current block is determined, prediction samples may be acquired for the current block based on the determined intra prediction mode (S2003).

When the DC mode is selected, prediction samples are generated for the current block based on an average value of reference samples. Specifically, values of all the samples in a prediction block may be generated based on an average value of the reference samples. The average value may be derived using at least one among top reference samples positioned on the top of the current block and left reference samples positioned on the left side of the current block.

Depending on the shape of the current block, the number or range of the reference samples used for deriving the average value may vary. For example, when the current block is a non-square shaped block of which the width is greater than the height, the average value may be calculated using only the top reference samples. On the other hand, when the current block is a non-square shaped block of which the width is smaller than the height, the average value may be calculated using only the left reference samples. That is, when the width and the height of the current block are different, the average value may be calculated using only reference samples adjacent to the longer one. Alternatively, based on the ratio of width to height of the current block, whether or not to calculate the average value using only the top reference samples or whether or not to calculate the average value using only the left reference samples may be determined.

When the planar mode is selected, a prediction sample may be acquired using a horizontal direction prediction sample and a vertical direction prediction sample. Here, the horizontal direction prediction sample is acquired based on a left reference sample and a right reference sample positioned on a horizontal line the same as that of the prediction sample, and the vertical direction prediction sample is acquired based on a top reference sample and a bottom reference sample positioned on a vertical line the same as that of the prediction sample. Here, the right reference sample may be generated by copying a reference sample adjacent to the top-right corner of the current block, and the bottom reference sample may be generated by copying a reference sample adjacent to the bottom-left corner of the current block. The horizontal direction prediction sample may be acquired based on a weighted sum operation of the left reference sample and the right reference sample, and the vertical direction prediction sample may be acquired based on a weighted sum operation of the top reference sample and the bottom reference sample. At this point, a weighting value assigned to each reference sample may be determined according to the position of the prediction sample. The prediction sample may be acquired based on an average operation or a weighted sum operation of the horizontal direction prediction sample and the vertical direction prediction sample. When the weighted sum operation is performed, weighting values applied to the horizontal direction prediction sample and the vertical direction prediction sample may be determined based on the position of the prediction sample.

When an angular prediction mode is selected, a parameter indicating the prediction direction (or prediction angle) of the selected angular prediction mode may be determined. Table 4 shows intra direction parameter intraPredAng of each intra prediction mode.

TABLE 4

| PredModeIntra | 1 | 2 | 3 | 4 | 5 | 6 | 7 |
|---|---|---|---|---|---|---|---|
| IntraPredAng | — | 32 | 26 | 21 | 17 | 13 | 9 |
| PredModeIntraI | 8 | 9 | 10 | 11 | 12 | 13 | 14 |
| ntraPredAng | 5 | 2 | 0 | −2 | −5 | −9 | −13 |
| PredModeIntra | 15 | 16 | 17 | 18 | 19 | 20 | 21 |
| IntraPredAng | −17 | −21 | −26 | −32 | −26 | −21 | −17 |
| PredModeIntra | 22 | 23 | 24 | 25 | 26 | 27 | 28 |
| IntraPredAng | −13 | −9 | −5 | −2 | 0 | 2 | 5 |
| PredModeIntra | 29 | 30 | 31 | 32 | 33 | 34 | |
| IntraPredAng | 9 | 13 | 17 | 21 | 26 | 32 | |

When 35 intra prediction modes are defined, Table 4 shows the intra direction parameter of each intra prediction mode having an index of any one among 2 to 34. When more than 33 angular intra prediction modes are defined, Table 4 is further subdivided to set the intra direction parameter of each angular intra prediction mode.

After arranging top reference samples and left reference samples of the current block in a line, a prediction sample may be acquired based on the value of the intra direction parameter. At this point, when the value of the intra direction parameter is a negative value, the left reference samples and the top reference samples may be arranged in a line.

Figure 22:
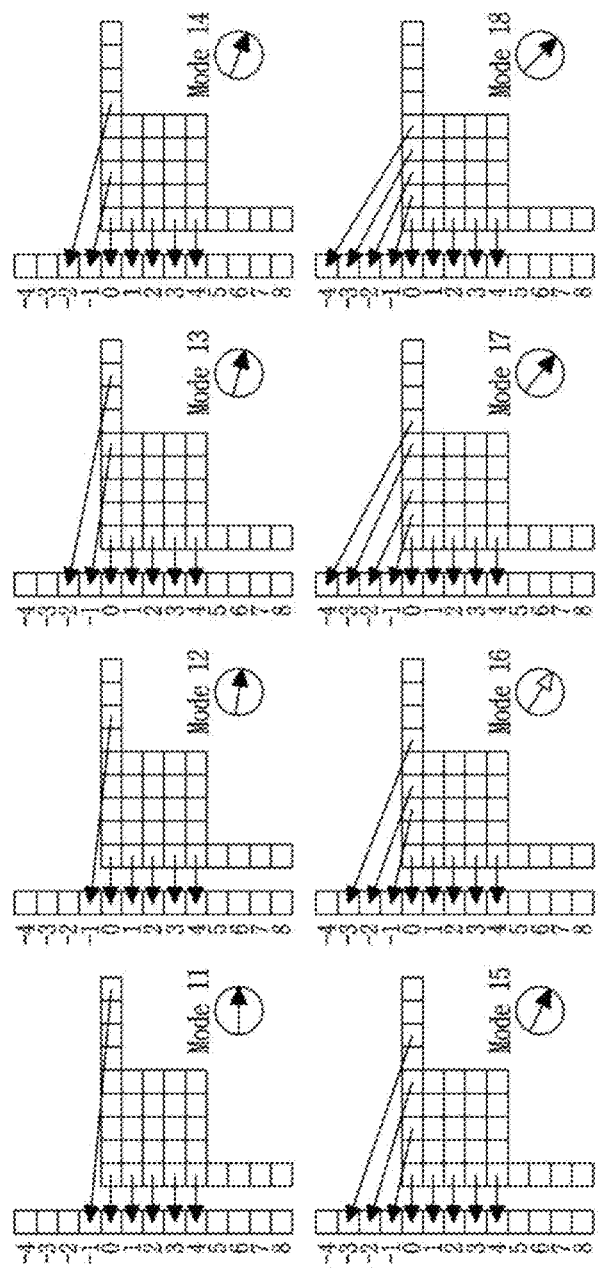
FIG. 22 is a view showing an example of a one-dimensional array arranging reference samples in a line.
Figure 23:
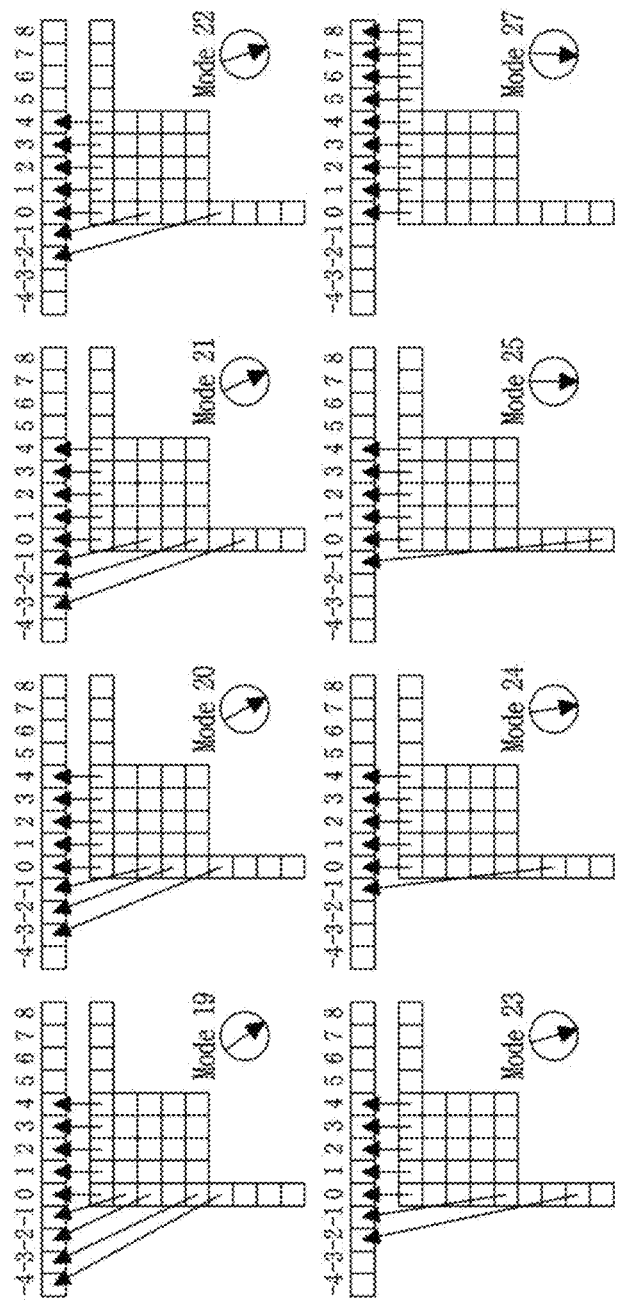
FIG. 23 is a view showing an example of a one-dimensional array arranging reference samples in a line.

FIGS. 22 and 23 are views showing an example of a one-dimensional array arranging reference samples in a line.

FIG. 22 is a view showing an example of a vertical direction one-dimensional array arranging reference samples in the vertical direction, and FIG. 23 is a view showing an example of a horizontal direction one-dimensional array arranging reference samples in the horizontal direction. The implementations of FIGS. 22 and 23 will be described on the assumption that 35 intra prediction modes are defined.

When the intra prediction mode index is any one among 11 to 18, a horizontal direction one-dimensional array in which top reference samples are rotated counterclockwise may be applied, and when the intra prediction mode index is any one among 19 to 25, a vertical direction one-dimensional array in which left reference samples are rotated clockwise may be applied. In arranging the reference samples in a line, an intra prediction mode angle may be considered.

A reference sample determination parameter may be determined based on an intra direction parameter. The reference sample determination parameter may include a reference sample index for specifying a reference sample and a weighting value parameter for determining a weighting value applied to the reference sample.

Reference sample index iIdx and weighting value parameter $i_{fact}$ may be acquired through Equations 9 and 10 shown below, respectively.

$$iIdx=(y+1)*P_{ang}/32 \quad \text{[Equation 9]}$$

$$i_{fact}=[(y+1)*P_{ang}]\&31 \quad \text{[Equation 10]}$$

In Equations 9 and 10, $P_{ang}$ denotes an intra direction parameter. The reference sample specified by reference sample index iIdx corresponds to an integer pel.

At least one or more reference samples may be specified to derive a prediction sample. Specifically, the position of a reference sample used for deriving a prediction sample may be specified considering the slope of the prediction mode. For example, a reference sample used for deriving a prediction sample may be specified using reference sample index iIdx.

At this point, when the slope of the intra prediction mode is not expressed by one reference sample, a prediction sample may be generated by interpolating a plurality of reference samples. For example, when the slope of the intra prediction mode is a value between a slope between a prediction sample and a first reference sample and a slope between a prediction sample and a second reference sample, the prediction sample may be acquired by interpolating the first reference sample and the second reference sample. That is, when an angular line following an intra prediction angle does not pass through a reference sample positioned at an integer pel, the prediction sample may be acquired by interpolating reference samples adjacent to the left and right or up and down sides of a position where the angular line passes through.

Equation 11 shows an example of acquiring a prediction sample based on reference samples.

$$P(x,y)=((32-i_{fact})/32)*\text{Ref\_1D}(x+iIdx+1)(i_{fact}/32)*\text{Ref\_1D}(x+iIdx+2) \quad \text{[Equation 11]}$$

In Equation 11, P denotes a prediction sample, and Ref_ID denotes any one among one-dimensionally arranged reference samples. At this point, the position of a reference sample may be determined by position (x, y) of the prediction sample and index iIdx of the reference sample.

When the slope of the intra prediction mode can be expressed as one reference sample, weighting value parameter $i_{fact}$ is set to 0. Accordingly, Equation 11 may be simplified as shown in Equation 12.

$$P(x,y)=\text{Ref\_1D}(x+iIdx+1) \quad \text{[Equation 12]}$$

Intra prediction for the current block may be performed based on a plurality of intra prediction modes. For example, an intra prediction mode may be derived for each prediction sample, and the prediction sample may be derived based on an intra prediction mode assigned to each prediction sample.

Alternatively, an intra prediction mode may be derived for each region, and intra prediction for each region may be performed based on the intra prediction mode assigned to each region. Here, the region may include at least one sample. At least one among the size and the shape of the region may be adaptively determined based on at least one among the size the current block, the shape the current block, and the intra prediction mode of the current block. Alternatively, at least one among the size and the shape of the region may be predefined in the encoder and the decoder to be independent from the size or the shape of the current block.

Alternatively, intra prediction may be performed based on each of a plurality of intra predictions, and a final prediction sample may be derived based on an average operation or a weighted sum operation of a plurality of prediction samples acquired through the plurality of intra predictions. For example, a first prediction sample may be acquired by performing intra prediction based on a first intra prediction mode, and a second prediction sample may be acquired by performing intra prediction based on a second intra prediction mode. Thereafter, a final prediction sample may be acquired based on an average operation or a weighted sum operation of the first prediction sample and the second prediction sample. At this point, a weighting value assigned to each of the first prediction sample and the second prediction sample may be determined considering at least one among whether or not the first intra prediction mode is a non-angular/angular prediction mode, whether or not the second intra prediction mode is a non-angular/angular prediction mode, and an intra prediction mode of a neighboring block.

The plurality of intra prediction modes may be a combination of a non-angular intra prediction mode and an angular prediction mode, a combination of angular prediction modes, or a combination of non-angular prediction modes.

Figure 24:
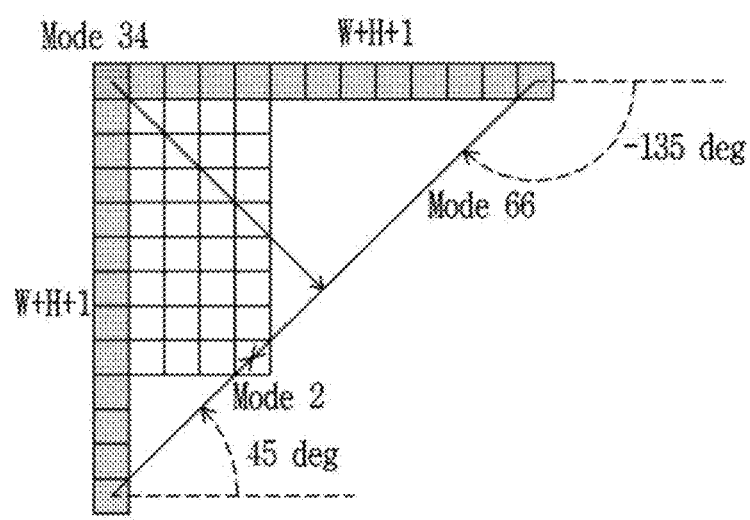
FIG. 24 is a view showing an example of angles formed between angular intra prediction modes and a straight line parallel to the x-axis.

FIG. 24 is a view showing an example of angles formed between angular intra prediction modes and a straight line parallel to the x-axis.

As shown in the example of FIG. 24, the angular prediction modes may exist between the bottom-left diagonal direction and the top-right diagonal direction. Describing in terms of an angle formed by the x-axis and the angular prediction mode, the angular prediction modes may exist between 45 degrees (bottom-left diagonal direction) and −135 degrees (top-right diagonal direction).

When the current block is a non-square shape, according to the intra prediction mode of the current block, there may be a case of deriving a prediction sample by using a reference sample farther from the prediction sample, instead of a reference sample further closer to the prediction sample, among the reference samples positioned on the angular line following the intra prediction angle.

Figure 25:
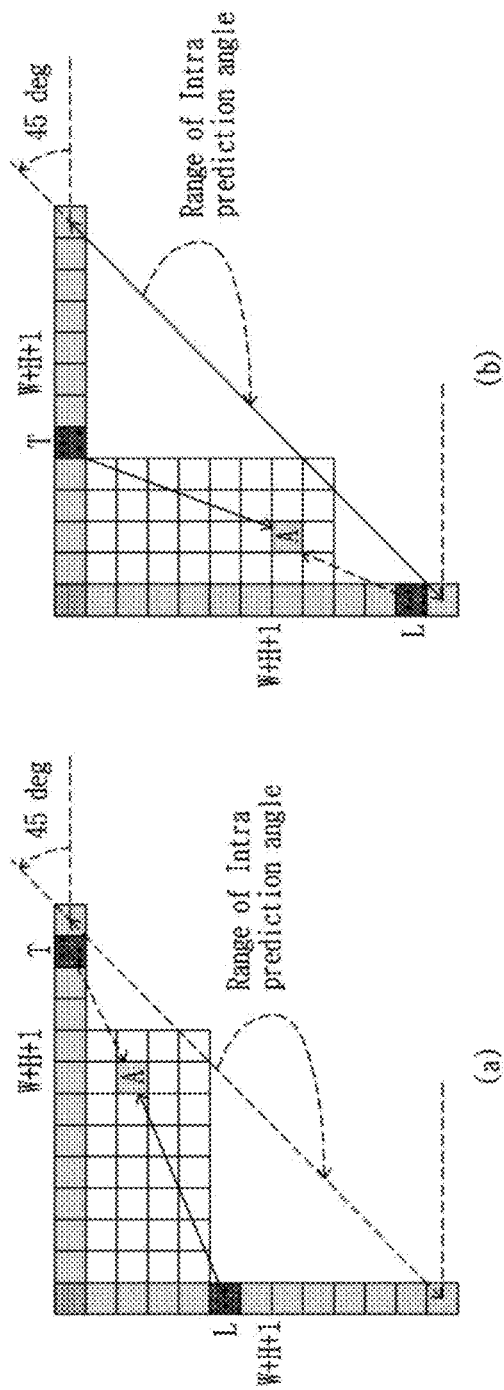
FIG. 25 is a view showing an implementation of acquiring prediction samples when the current block is a non-square shape.

FIG. 25 is a view showing an implementation of acquiring prediction samples when the current block is a non-square shape.

For example, as shown in the example of FIG. 25 (a), it is assumed that the current block is a non-square shape of which the width is greater than the height, and the intra prediction mode of the current block is an angular intra prediction mode having an angle between 0 and 45 degrees. In the above case, when prediction sample A near the right column of the current block is derived, there may be a case of using left reference sample L far from the prediction sample, instead of top reference sample T close to the prediction sample, among the reference samples positioned on an angular mode following the angle.

As another example, as shown in the example of FIG. 25 (b), it is assumed that the current block is a non-square shape of which the height is greater than the width, and the intra prediction mode of the current block is an angular intra prediction mode having an angle between −90 and −135 degrees. In the above case, when prediction sample A near the bottom row of the current block is derived, there may be a case of using top reference sample T far from the prediction sample, instead of left reference sample L close to the prediction sample, among the reference samples positioned on an angular mode following the angle.

To solve the problem described above, when the current block is a non-square shape, the intra prediction mode of the current block may be replaced with an intra prediction mode of the opposite direction. Accordingly, angular prediction modes having an angle greater or smaller than that of the angular prediction modes shown in FIG. 21 may be used for a non-square shaped block. The angular intra prediction mode like this may be defined as a wide-angle intra prediction mode. The wide-angle intra prediction mode represents an angular intra prediction mode that does not belong to the range of 45 to −135 degrees.

Figure 26:
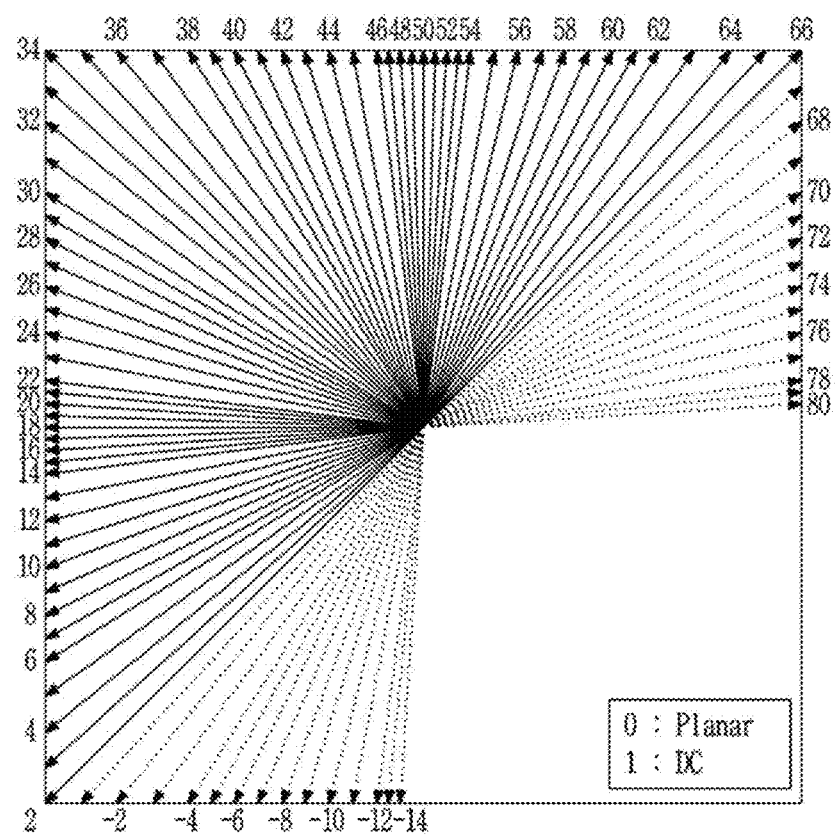
FIG. 26 is a view showing wide-angle intra prediction modes.

FIG. 26 is a view showing wide-angle intra prediction modes.

In the example shown in FIG. 26, intra prediction modes with an index of −1 to −14 and intra prediction modes with an index of 67 to 80 represent wide-angle intra prediction modes.

In FIG. 26, although 14 wide-angle intra prediction modes (−1 to −14) having an angle greater than 45 degrees and 14 wide-angle intra prediction modes (67 to 80) having an angle smaller than −135 degrees are shown, a larger or smaller number of wide-angle intra prediction modes may be defined.

When a wide-angle intra prediction mode is used, the length of top reference samples may be set to 2W+1, and the length of left reference samples may be set to 2H+1.

As a wide-angle intra prediction mode is used, sample A shown in FIG. 25 (a) may be predicted using reference sample T, and sample A shown in FIG. 25 (b) may be predicted using reference sample L.

By adding existing intra prediction modes and N wide-angle intra prediction modes, a total of 67+N intra prediction modes can be used. For example, Table 5 shows intra direction parameters of intra prediction modes when 20 wide-angle intra prediction modes are defined.

TABLE 5

| PredMode Intra | −10 | −9 | −8 | −7 | −6 | −5 | −4 | −3 | −2 |
|---|---|---|---|---|---|---|---|---|---|
| intraPred Angle | 114 | 93 | 79 | 68 | 60 | 54 | 49 | 45 | 39 |
| PredMode Intra | −1 | 2 | 3 | 4 | 5 | 6 | 7 | 8 | 9 |
| intraPred Angle | 35 | 32 | 29 | 26 | 23 | 21 | 19 | 17 | 15 |
| PredMode Intra | 10 | 11 | 12 | 13 | 14 | 15 | 16 | 17 | 18 |
| intraPred Angle | 13 | 11 | 9 | 7 | 5 | 3 | 2 | 1 | 0 |
| PredMode Intra | 19 | 20 | 21 | 22 | 23 | 24 | 25 | 26 | 27 |
| intraPred Angle | −1 | −2 | −3 | −5 | −7 | −9 | −11 | −13 | −15 |
| PredMode Intra | 28 | 29 | 30 | 31 | 32 | 33 | 34 | 35 | 36 |
| intraPred Angle | −17 | −19 | −21 | −23 | −26 | −29 | −32 | −29 | −26 |
| PredMode Intra | 37 | 38 | 39 | 40 | 41 | 42 | 43 | 44 | 45 |
| intraPred Angle | −23 | −21 | −19 | −17 | −15 | −13 | −11 | −9 | −7 |
| PredMode Intra | 46 | 47 | 48 | 49 | 50 | 51 | 52 | 53 | 54 |
| intraPred Angle | −5 | −3 | −2 | −1 | 0 | 1 | 2 | 3 | 5 |
| PredMode Intra | 55 | 56 | 57 | 58 | 59 | 60 | 61 | 62 | 63 |
| intraPred Angle | 7 | 9 | 11 | 13 | 15 | 17 | 19 | 21 | 23 |
| PredMode Intra | 64 | 65 | 66 | 67 | 68 | 69 | 70 | 71 | 72 |

TABLE 5-continued

| intraPred Angle | 26 | 29 | 32 | 35 | 39 | 45 | 49 | 54 | 60 |
|---|---|---|---|---|---|---|---|---|---|
| PredMode Intra | 73 | 74 | 75 | 76 | | | | | |
| intraPred Angle | 68 | 79 | 93 | 114 | | | | | |

When the current block is a non-square shape and the intra prediction mode of the current block acquired at step S2002 belongs to a transform range, the intra prediction mode of the current block may be transformed into a wide-angle intra prediction mode. The transform range may be determined based on at least one among the size, the shape, and the ratio of the current block. Here, the ratio may represent a ratio of width to height of the current block.

When the current block is a non-square shape of which the width is greater than the height, the transform range may be set from an intra prediction mode index (e.g., 66) of the top-right diagonal direction (an index of the intra prediction mode in the top-right diagonal direction—N). Here, N may be determined based on the ratio of the current block. When the intra prediction mode of the current block belongs to the transform range, the intra prediction mode may be transformed into a wide-angle intra prediction mode. The transform may be subtraction of a predefined value from the intra prediction mode, and the predefined value may be the total number (e.g., 67) of intra prediction modes excluding the wide-angle intra prediction modes.

According to the implementation described above, 66th to 53rd intra prediction modes may be transformed into −1st to −14th wide-angle intra prediction modes, respectively.

When the current block is a non-square shape of which the height is greater than the width, the transform range may be set from an intra prediction mode index (e.g., 2) of the bottom-left diagonal direction (an index of the intra prediction mode in the bottom-left diagonal direction+M). Here, M may be determined based on the ratio of the current block. When the intra prediction mode of the current block belongs to the transform range, the intra prediction mode may be transformed into a wide-angle intra prediction mode. The transform may be addition of a predefined value to the intra prediction mode, and the predefined value may be the total number (e.g., 65) of angular intra prediction modes excluding the wide-angle intra prediction modes.

According to the implementation described above, 2nd to 15th intra prediction modes may be transformed into 67th to 80th wide-angle intra prediction modes, respectively.

Hereinafter, intra prediction modes belonging to the transform range will be referred to as wide-angle intra replacement prediction modes.

The transform range may be determined based on the ratio of the current block. For example, Tables 6 and 7 show a transform range when 35 intra prediction modes and 67 intra prediction modes are defined excluding the wide-angle intra prediction modes, respectively.

TABLE 6

| Condition | Replaced Intra Prediction Modes |
|---|---|
| W/H = 2 | Modes 2, 3, 4 |
| W/H > 2 | Modes 2, 3, 4, 5, 6 |
| W/H = 1 | None |
| H/W = 1/2 | Modes 32, 33, 34 |
| H/W < 1/2 | Modes 30, 31, 32, 33, 34 |

TABLE 7

| Condition | Replaced Intra Prediction Modes |
|---|---|
| W/H = 2 | Modes 2, 3, 4, 5, 6, 7 |
| W/H > 2 | Modes 2, 3, 4, 5, 6, 7, 8, 9, 10, 11 |
| W/H =1 | None |
| H/W = 1/2 | Modes 61, 62, 63, 64, 65, 66 |
| H/W < 1/2 | Modes 57, 58, 59, 60, 61, 62, 63, 64, 65, 66 |

As shown in the examples of Tables 6 and 7, the number of wide-angle intra replacement prediction modes belonging to the transform range may vary according to the ratio of the current block.

A transform range as shown in Table 8 may be set by subdividing the ratio of the current block.

TABLE 8

| Condition | Replaced Intra Prediction Modes |
|---|---|
| W/H = 16 | Modes 12, 13, 14, 15 |
| W/H = 8 | Modes 12, 13 |
| W/H = 4 | Modes 2, 3, 4, 5, 6, 7, 8, 9, 10, 11 |
| H/W = 2 | Modes 2, 3, 4, 5, 6, 7 |
| H/W = 1 | None |
| W/H = 1/2 | Modes 61, 62, 63, 64, 65, 66 |
| W/H = 1/4 | Modes 57, 58, 59, 60, 61, 62, 63, 64, 65, 66 |
| W/H = 1/8 | Modes 55, 56 |
| H/W = 1/16 | Modes 53, 54, 55, 56 |

It may be set not to use the wide-angle intra prediction mode when a non-adjacent reference sample line is determined as the reference sample line of the current block or when a multi-line intra prediction encoding method of selecting any one among a plurality of reference sample lines is used. That is, although the current block is a non-square shape and the intra prediction mode of the current block belongs to the transform range, the intra prediction mode of the current block may not be transformed into the wide-angle intra prediction mode.

Alternatively, it may be set non-adjacent reference sample lines as not being available as the reference sample line of the current block or it may be set not to use the multi-line intra prediction encoding method of selecting any one among a plurality of reference sample lines, when the intra prediction mode of the current block is determined as the wide-angle intra prediction mode. When the multi-line intra prediction encoding method is not used, an adjacent reference sample line may be determined as the reference sample line of the current block.

When the wide-angle intra prediction mode is not used, the sum of nTbW and nTbH may be set as refW and refH. Accordingly, excluding the top-left reference sample, a non-adjacent reference sample having a distance of i from the current block may include as many as (nTbW+nTbH+offsetX[i]) top reference samples and as many as (nTbW+nTbH+offsetY[i]) left reference samples. That is, a non-adjacent reference sample having a distance of i from the current block may include as many as (2nTbW+2nTbH+offsetX[i]+offsetY[i]+1) reference samples. For example, when the value of whRatio is larger than 1, the value of offsetX may be set to be larger than the value of offsetY. For example, the value of offsetX may be set to 1, and the value of offsetY may be set to 0. On the other hand, when the value of whRatio is smaller than 1, the value of offsetY may be set to be larger than the value of offsetX. For example, the value of offsetX may be set to 0, and the value of offsetY may be set to 1.

As the wide-angle intra prediction modes are used in addition to the existing intra prediction modes, resources required for encoding the wide-angle intra prediction modes increase, and thus encoding efficiency may be lowered. Accordingly, the encoding efficiency may be improved by encoding replacement intra prediction modes for the wide-angle intra prediction modes, instead of encoding the wide-angle intra prediction modes as they are.

For example, when the current block is encoded using the 67th wide-angle intra prediction mode, the 2nd intra prediction mode, which is the replacement intra prediction mode of the 67th wide-angle intra prediction mode, may be encoded using the intra prediction mode of the current block. In addition, when the current block is encoded using the −1st wide-angle intra prediction mode, the 66th intra prediction mode, which is the replacement intra prediction mode of the −1st wide-angle intra prediction mode, may be encoded using the intra prediction mode of the current block.

The decoder may decode the intra prediction mode of the current block and determine whether the decoded intra prediction mode belongs to the transform range. When the decoded intra prediction mode is a wide-angle replacement intra prediction mode, the intra prediction mode may be transformed into the wide-angle intra prediction mode.

Alternatively, when the current block is encoded using the wide-angle intra prediction mode, the wide-angle intra prediction mode may be encoded as it is.

Encoding the intra prediction mode may be performed based on the MPM list described above. Specifically, when a neighboring block is encoded using a wide-angle intra prediction mode, the MPM may be set based on a wide-angle replacement intra prediction mode corresponding to the wide-angle intra prediction mode.

When a prediction block is generated as a result of performing the intra prediction, prediction samples may be updated based on the position of each of the prediction samples included in the prediction block. The update method like this may be referred to as an intra weighted prediction method based on a sample position or Position Dependent intra Prediction Combination (PDPC).

Whether or not to use the PDPC may be determined considering the intra prediction mode of the current block, the reference sample line of the current block, the size of the current block, or a color component. For example, when the intra prediction mode of the current block is at least one among of a planar mode, a DC mode, a vertical direction mode, a horizontal direction mode, a mode having an index value smaller than that of the vertical direction mode, and a mode having an index value larger than that of the horizontal direction mode, the PDPC may be used. Alternatively, only when at least one among the width and the height of the current block is greater than 4, the PDPC may be used. Alternatively, only when the index of the reference picture line of the current block is 0, the PDPC may be used. Alternatively, only when the index of the reference picture line of the current block is equal to or larger than a predefined value, the PDPC may be used. Alternatively, PDPC may be used only for a luminance component. Alternatively, depending on whether or not two or more of the conditions listed above are satisfied, whether or not to use the PDPC may be determined.

As another example, information indicating whether or not the PDPC is applied may be signaled through a bitstream.

When a prediction sample is acquired through the intra prediction sample, a reference sample used for correcting the prediction sample may be determined based on the position of the acquired prediction sample. For convenience of explanation, in the implementation described below, a reference sample used for correcting a prediction sample is referred to as a PDPC reference sample. In addition, a prediction sample acquired through intra prediction is referred to as a first prediction sample, and a prediction sample acquired by correcting the first prediction sample is referred to as a second prediction sample.

Figures 27, 28:
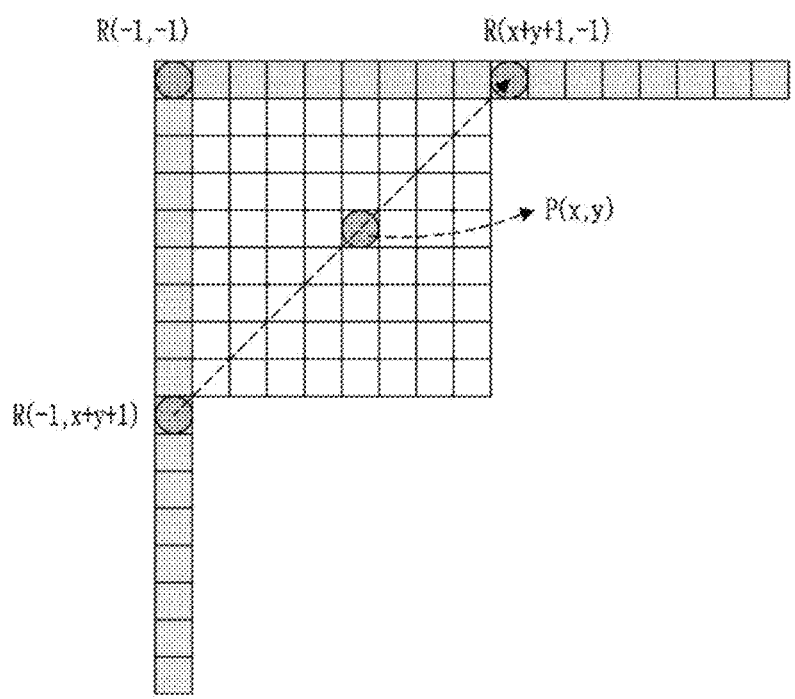
FIG. 27 is a view showing an implementation of applying PDPC.
FIG. 28 is a view showing application examples of weighting values.

FIG. 27 is a view showing an implementation of applying PDPC.

The first prediction sample may be corrected using at least one PDPC reference sample. The PDPC reference sample may include at least one among a reference sample adjacent to the top-left corner of the current block, a top reference sample positioned on the top of the current block, and a left reference sample positioned on the left side of the current block.

At least one among the reference samples belonging to the reference sample line of the current block may be set as the PDPC reference sample. Alternatively, regardless of the reference sample line of the current block, at least one among the reference samples belonging to the reference sample line having index 0 may be set as the PDPC reference sample. For example, although the first prediction sample is acquired using a reference sample included in a reference sample line of index 1 or index 2, the second prediction sample may be acquired using a reference sample included in the reference sample line of index 0.

The number or positions of the PDPC reference samples used for correcting the first prediction sample may be determined considering at least one among the intra prediction mode of the current block, the size of the current block, the shape of the current block, and the position of the first prediction sample.

For example, when the intra prediction mode of the current block is a planar mode or a DC mode, the second prediction sample may be acquired using a top reference sample and a left reference sample. At this point, the top reference sample may be a reference sample vertical to the first prediction sample (e.g., a reference sample of the same x-coordinate), and the left reference sample may be a reference sample horizontal to the first prediction sample (e.g., a reference sample of the same y-coordinate).

When the intra prediction mode of the current block is a horizontal direction intra prediction mode, the second prediction sample may be acquired using a top reference sample. At this point, the top reference sample may be a reference sample vertical to the first prediction sample.

When the intra prediction mode of the current block is a vertical direction intra prediction mode, the second prediction sample may be acquired using a left reference sample. At this point, the left reference sample may be a reference sample horizontal to the first prediction sample.

When the intra prediction mode of the current block is a bottom-left diagonal direction intra prediction mode or a top-right diagonal direction intra prediction mode, the second prediction sample may be acquired based on a top-left reference sample, a top reference sample, and a left reference sample. The top-left reference sample may be a reference sample adjacent to the top-left corner of the current block (e.g., a reference sample at the position of (−1, −1)). The top reference sample may be a reference sample positioned in the top-right diagonal direction of the first prediction sample, and the left reference sample may be a reference sample positioned in the bottom-left diagonal direction of the first prediction sample.

In summary, when the position of the first prediction sample is (x, y), R(−1, −1) may be set as the top-left reference sample, and R(x+y+1, −1) or R(x, −1) may be set as the top reference sample. In addition, R(−1, x+y+1) or R(−1, y) may be set as the left reference sample.

A prediction mode may be applied to the current block a plurality of times, or a plurality of prediction modes may be redundantly applied to the current block. Like this, a prediction method using a homogeneous or heterogeneous prediction mode may be referred to as a combined prediction mode (or Multi-hypothesis Prediction Mode).

The combined prediction mode includes at least one among a mode combining a merge mode and a merge mode, a mode combining inter prediction and intra prediction, a mode combining a merge mode and an advanced motion vector prediction mode, and a mode combining a merge mode and intra prediction.

In the combined prediction mode, a first prediction block may be generated based on the first prediction mode, and a second prediction block may be generated based on the second prediction mode. Then, a third prediction block may be generated based on a weighted sum operation of the first prediction block and the second prediction block. The third prediction block may be set as the final prediction block of the current block.

Whether or not to use the combined prediction mode may be determined based on the size or the shape of the current block. For example, whether or not to use the combined prediction mode may be determined based on at least one among the size of the coding block, the number of samples included in the coding block, the width of the coding block, and the height of the coding block. For example, when at least one among the width and the height of the coding block is greater than or equal to 128, or when the number of samples included in the coding block is smaller than or equal to 64, the combined prediction mode may not be applied to the coding block.

In addition, information indicating whether the combined prediction mode is applied to the current block may be signaled through a bitstream. For example, the information may be a 1-bit flag. For example, flag mh_intra_flag indicating whether the combined prediction mode combining the merge mode and the intra prediction is used may be signaled through a bitstream. When mh_intra_flag is 1, it indicates that the combined prediction mode combining the merge mode and the intra prediction is used, and when mh_intra_flag is 0, it indicates that the combined prediction mode combining the merge mode and the intra prediction is not used.

Only when the prediction encoding mode of the current block is the inter prediction mode and the merge mode is applied to the current block, the combined prediction mode combining the merge mode and the intra prediction may be applied to the current block. That is, mh_intra_flag may be signaled when the value of flag merge_flag indicating whether the merge mode is applied to the current block is 1.

In the combined prediction mode combining the merge mode and the intra prediction, the intra prediction mode of the current block may be set to a predefined intra prediction mode. For example, when the combined prediction mode is used, the intra prediction mode of the current block may be set to a planar mode.

As another example, when the combined prediction mode combining the merge mode and the intra prediction is used, one among the candidate intra prediction modes may be determined as the intra prediction mode of the current block. Here, the candidate intra prediction mode may include at least one among a non-angular intra prediction mode and an angular intra prediction mode of a specific direction. Here, the non-angular intra prediction mode includes at least one among the DC mode and the planar mode, and the angular intra prediction mode includes at least one among the intra prediction mode of the horizontal direction, the intra prediction mode of the vertical direction, and the intra prediction mode of a diagonal direction. For example, when the combined prediction mode is used, only the DC mode, the planar mode, the intra prediction mode of the horizontal direction, or the intra prediction mode of the vertical direction may be set as the intra prediction mode of the current block. Alternatively, when the combined prediction mode is used, only the planar mode, the intra prediction mode of the horizontal direction, or the intra prediction mode of the vertical direction may be set as the intra prediction mode of the current block. Alternatively, when the combined prediction mode is used, only the DC mode, the planar mode, or the intra prediction mode of the vertical direction may be set as the intra prediction mode of the current block. Alternatively, when the combined prediction mode is used, only the DC mode, the planar mode, or the intra prediction mode of the horizontal direction may be set as the intra prediction mode of the current block.

Index information for specifying any one among the candidate intra prediction modes may be signaled through a bitstream. For example, index mh_intra_idx specifying any one among the candidate intra prediction modes may be signaled through a bitstream. Tables 9 and 10 show intra prediction modes according to the value of mh_intra_idx. An intra prediction mode indicated by mh_intra_idx may be determined as the intra prediction mode of the current block.

TABLE 9

| mh_intra_idx | 0 | 1 | 2 | 3 |
|---|---|---|---|---|
| intra mode | PLANAR | DC | VERTICAL | HORIZONTAL |

TABLE 10

| mh_intra_idx | 0 | 1 | 2 |
|---|---|---|---|
| intra mode | PLANAR | VERTICAL | HORIZONTAL |

The number of candidate intra prediction modes may have a fixed value in the encoder and the decoder. Alternatively, the number or types of candidate intra prediction modes may vary according to at least one among the size of the current block, the shape of the current block, and whether a neighboring block is encoded by intra prediction.

As another example, when the combined prediction mode combining the merge mode and the intra prediction is applied, the intra prediction mode of the current block may be determined based on MPMs. At this point, the number of MPMs that the MPM list includes when general intra prediction is applied may be different from the number of MPMs that the MPM list includes when the combined prediction mode is applied. For example, when the combined prediction mode is not applied, the MPM list may include 6 or 5 MPMs, whereas when the combined prediction mode is applied, the MPM list may include 4 or 3 MPMs. That is, when the general intra prediction is performed, N MPMs are used, whereas when the combined prediction mode is applied, MPMs fewer than N may be used.

For example, it is assumed that when a general intra prediction mode is applied, MPMs derived based on the intra prediction mode of a neighboring block adjacent to the current block are planar mode, DC mode, INTRA_MODE32, INTRA_MODE31, INTRA_MODE33, and INTRA_MODE30. When the combined prediction mode is applied to the current block, the intra prediction mode of the current block may be determined using only some of the 6 MPMs. For example, the intra prediction mode of the current block may be determined using an MPM list including 3 MPMs having the smallest indexes among the MPMs, i.e., the planar mode, the DC mode, and INTRA_MODE32. Alternatively, any one having a predefined index value among the MPMs may be determined as the intra prediction mode of the current block.

As another example, it is possible to equally set the number of MPMs used for determining the intra prediction mode of the current block when a general intra prediction is applied, and the number of MPMs used for determining the intra prediction mode of the current block when the combined prediction mode is applied.

When the combined prediction mode is applied, encoding of the MPM flag may be omitted, and the MPM flag may be regarded as being true. That is, when the combined prediction mode is applied, any one among the MPMs may be determined as the intra prediction mode of the current block.

It may be set not to use the multi-line intra prediction encoding method when the combined prediction mode combining the merge mode and the intra prediction is applied to the current block. When the multi-line intra prediction encoding method is not used, an adjacent reference sample line may be used for the intra prediction of the current block.

Alternatively, it may be set to use the multi-line intra prediction encoding method when the combined prediction mode combining the merge mode and the intra prediction is applied to the current block. Information for determining the reference sample line of the current block among a plurality of reference sample lines may be signaled through a bitstream. Alternatively, the reference sample line of the current block may be determined considering at least one among the size of the current block, the shape of the current block, the intra prediction mode of the current block, and the reference sample line of a neighboring block.

The number of available candidate intra prediction modes may be set differently according to the reference sample line of the current block. For example, when an adjacent reference sample line is used, the candidate intra prediction mode may include at least one among the planar mode, the DC mode, the intra prediction mode of the horizontal direction, the intra prediction mode of the vertical direction, the intra prediction mode of the bottom-left diagonal direction, and the intra prediction mode of the top-right diagonal direction. On the other hand, when a non-adjacent reference sample line is used, the candidate intra prediction mode may include at least one among the intra prediction mode of the horizontal direction, the intra prediction mode of the vertical direction, the intra prediction mode of the bottom-left diagonal direction, and the intra prediction mode of the top-right diagonal direction.

A first prediction block may be generated using a merge candidate selected in the merge mode, and a second prediction block may be generated using the intra prediction mode. At this point, it may be set not to apply triangular partitioning to the current block when the first prediction block is generated. That is, triangular partitioning may not be allowed in the combined prediction mode combining the merge mode and the intra prediction. In addition, it may be set not to apply PDPC to the current block when the second prediction block is generated. That is, PDPC may not be allowed in the combined prediction mode combining the merge mode and the intra prediction.

A third prediction block may be generated based on a weighted sum operation of the first prediction block and the second prediction block. For example, Equation 13 shows an example of generating a third prediction block based on a weighted sum operation of the first prediction block and the second prediction block.

$$P_{comb}=(w*P_{merge}+(N-w)*P_{intra}+4)>>\log_2 N \quad \text{[Equation 13]}$$

In Equation 13, $P_{merge}$ denotes a first prediction block obtained based on the merge mode, and $P_{intra}$ denotes a second prediction block obtained based on the intra prediction. $P_{comb}$ denotes a third prediction block obtained by combining the first prediction block and the second prediction block. w denotes a first weighting value applied to the first prediction block. A second weighting value applied to the second prediction block may be derived by subtracting the first weighting value w from constant N. Here, N may have a predefined value in the encoder and the decoder. For example, N may be 4 or 8. Alternatively, constant N may be derived based on at least one among the size, the shape, and the intra prediction mode of the current block.

Unlike the example shown in Equation 13, w may be set as the second weighting value, and a value obtained by subtracting the second weighting value from predetermined constant N may be set as the first weighting value.

The weighting values applied to the first prediction block and the second prediction block may be determined based on at least one among the intra prediction mode of the current block and whether the merge mode has bidirectional motion information. For example, the first weighting value w when the intra prediction mode of the current block is angular prediction mode may be larger than the first weighting value w when the intra prediction mode of the current block is non-angular prediction mode. Alternatively, the first weighting value w when bidirectional prediction is performed by the merge candidate may be larger than the first weighting value w when unidirectional prediction is performed by the merge candidate.

As another example, weighting values may be determined considering prediction encoding modes of neighboring blocks adjacent to the current block. Here, the neighboring block may include at least one among a top neighboring block adjacent to the top of the current block, a left neighboring block adjacent to the left side of the current block, and a top-left neighboring block adjacent to the top-left corner of the current block. A weighting value may be determined based on the number of neighboring blocks encoded by intra prediction among the neighboring blocks adjacent to the current block. For example, as the number of neighboring blocks encoded by intra prediction among the neighboring blocks adjacent to the current block increases, the first weighting value may have a smaller value, and the second weighting value may have a larger value. On the other hand, as the number of neighboring blocks encoded by non-intra prediction among the neighboring blocks adjacent to the current block decreases, the first weighting value may have a larger value, and the second weighting value may have a smaller value. For example, when both the left neighboring block and the top neighboring block are encoded by intra prediction, the second weighting value may be set to n. When only one among the left neighboring block and the top neighboring block is encoded by intra prediction, the second weighting value may be set to n/2. When neither the left neighboring block nor the top neighboring block is encoded by intra prediction, the second weighting value may be set to n/4. Here, n represents an integer equal to or smaller than N.

The weighting value may be determined by the unit of sample or subblock in the current block. For example, the current block may be partitioned into a plurality of subblocks, and a weighting value applied to each subblock may be set to have a different value. At this point, the number of subblocks may have a fixed value in the encoder and the decoder. Alternatively, the number of subblocks may be adaptively determined based on at least one among the size of the current block, the shape of the current block, the intra prediction mode of the current block, and the prediction encoding mode of a neighboring block.

FIG. 28 is a view showing application examples of weighting values.

The current block may be partitioned into a plurality of subblocks, and a weighting value applied to each subblock may be set to a different value. For example, as shown in the examples of FIGS. 28 (a) and (b), for a subblock including a sample positioned at the top-left corner of the current block, the second weighting value is set to be larger than the first weighting value. On the other hand, for a subblock including a sample positioned at the bottom-right corner of the current block, the first weighting value may be set to be larger than the second weighting value.

A third prediction subblock for a subblock may be obtained by performing weighted prediction on the first prediction subblock and the second prediction subblock corresponding to the subblock. At this point, as shown in the example of FIG. 28, weighting values used for the weighted prediction may be set differently for each subblock.

A weighting value assigned to a subblock may be determined differently according to whether the merge candidate has bidirectional motion information.

FIG. 29 is a view showing examples of assigning a different weighting value to a subblock according to whether a merge candidate has bidirectional motion information.

When a merge candidate has bidirectional motion information, the first weighting value w assigned to at least one among the subblocks may be set to a large value compared with a case where the merge candidate has unidirectional motion information. For example, in FIGS. 29 (a) and (b), it is shown that for all subblocks, the weighting value w applied when bidirectional prediction is applied has a value larger than the weighting value w applied when unidirectional prediction is applied.

Alternatively, a weighting value applied to a subblock may be determined based on the intra prediction mode of the current block.

Figure 30:
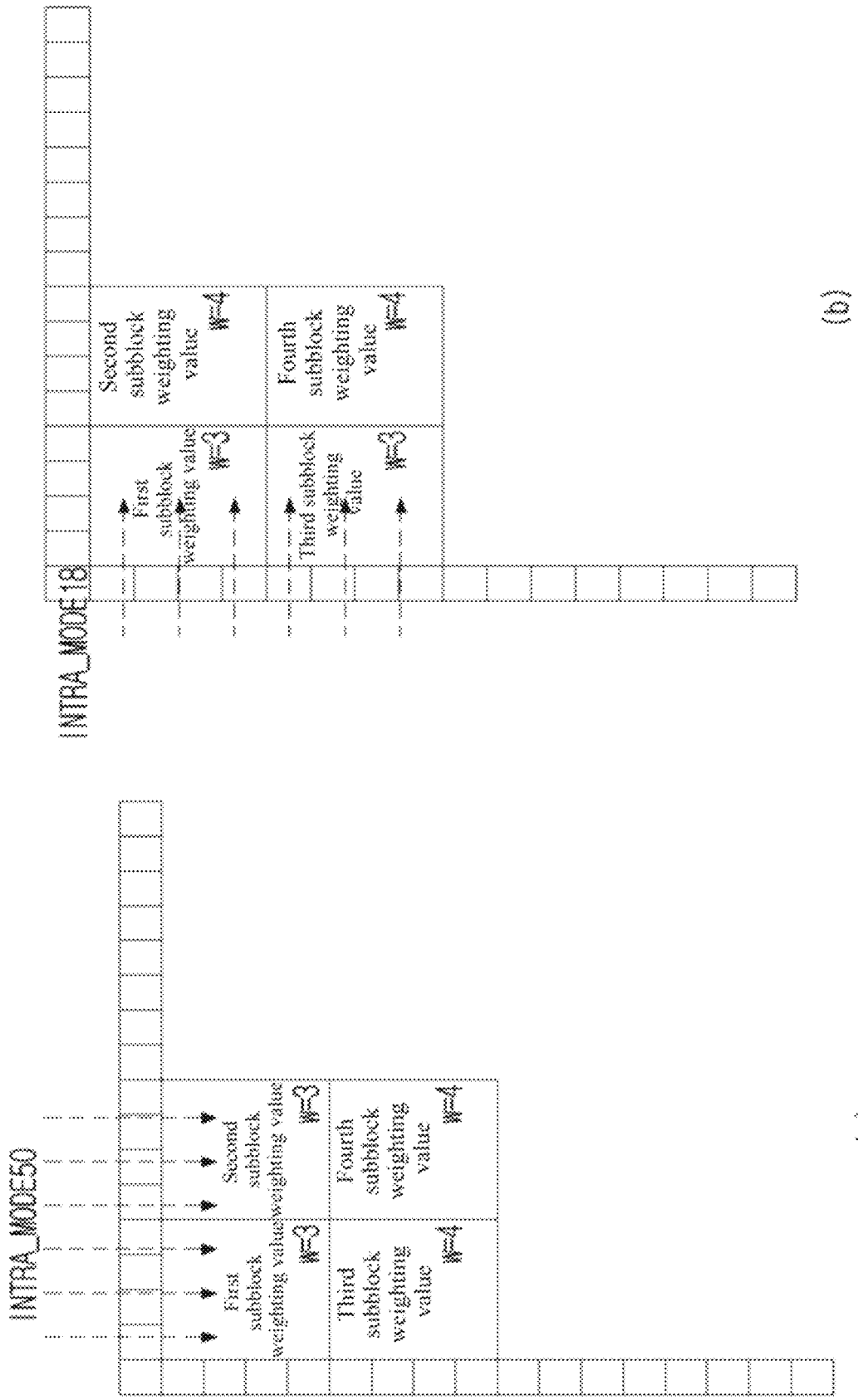
FIG. 30 is a view showing examples of assigning a different weighting value to a subblock according to the intra prediction mode of the current block.

FIG. 30 is a view showing examples of assigning a different weighting value to a subblock according to the intra prediction mode of the current block.

When the intra prediction mode of the current block is in vertical direction, the second weighting value of a subblock positioned on the top of the current block may be set to be larger than the second weighting value of a subblock positioned on the bottom of the current block.

For example, the second weighting value may be set to be larger than the first weighting value for a subblock positioned on the top of the current block, whereas the first weighting value and the second weighting value may be set equally or the first weighting value may be set to be larger than the second weighting value for a subblock positioned on the bottom of the current block.

When the intra prediction mode of the current block is in horizontal direction, the second weighting value of a subblock positioned on the left side of the current block may be set to be larger than the second weighting value of a subblock positioned on the right side of the current block.

For example, the second weighting value is set to be larger than the first weighting value for a subblock positioned on the left side of the current block, whereas the first weighting value and the second weighting value may be set equally or the first weighting value may be set to be larger than the second weighting value for a subblock positioned on the right side of the current block.

As another example, when the intra prediction mode of the current block is in vertical direction, the first weighting value of a subblock positioned on the top of the current block may be set to be larger than the first weighting value of the subblock positioned on the bottom of the current block, or when the intra prediction mode of the block is in horizontal direction, the first weighting value of a subblock positioned on the left side of the current block may be set to be larger than the first weighting value of a subblock positioned on the right side of the current block.

As another example, a weighting value assigned to each subblock may be determined based on the prediction encoding modes of neighboring blocks adjacent to the current block. For example, when the top neighboring block of the current block is encoded by intra prediction and the left neighboring block of the current block is not encoded by intra prediction, the second weighting value of a subblock positioned on the top of the current block may be set to be larger than the second weighting value of a subblock positioned on the bottom of the current block. On the other hand, when the top neighboring block of the current block is not encoded by intra prediction and the left neighboring block of the current block is encoded by intra prediction, the second weighting value of a subblock positioned on the left side of the current block may be set to be larger than the second weighting value of a subblock positioned on the right side of the current block.

For at least one among a plurality of subblocks, the first weighting value or the second weighting value may be set to 0. That is, for at least one among the plurality of subblocks, the first prediction subblock or the second prediction subblock may be set as the third prediction subblock. Accordingly, combined prediction may not be performed on at least one among the plurality of subblocks. For example, for at least one among the plurality of subblocks, the first weighting value w may be set to 0, or the first weighting value w may be set to constant N.

A block to which the combined prediction mode combining the merge mode and the intra prediction is applied may be regarded as being encoded by inter prediction. Accordingly, the intra prediction mode of a block encoded in the combined prediction mode may be set to be unavailable for deriving an intra prediction mode of a block that will be encoded/decoded thereafter. When an MPM is derived, the intra prediction mode of an unavailable block may be regarded as the planar mode.

On the other hand, motion information of a block encoded by the combined prediction mode may be set to be available for deriving motion information of a block that will be encoded/decoded thereafter.

In the mode combining a merge mode and a merge mode, motion compensation prediction may be performed using a plurality of merge candidates. Specifically, a first prediction block may be generated using a first merge candidate, and a second prediction block may be generated using a second merge candidate. A third prediction block may be generated based on a weighted sum operation of the first prediction block and the second prediction block.

Information for specifying the first merge candidate and the second merge candidate may be signaled through a bitstream, respectively. For example, index information merge_idx for specifying the first merge candidate and index information merge_2nd_idx for specifying the second merge candidate may be signaled through a bitstream. The second merge candidate may be determined based on index information merge_2nd_idx and index information merge_idx.

Index information merge_idx specifies any one among merge candidates included in the merge candidate list.

Index information merge_2nd_idx may specify any one among the remaining merge candidates excluding the merge candidate specified by merge_idx. Accordingly, when the value of merge_2nd_idx is smaller than that of merge_idx, a merge candidate of which the index is the value of merge_2nd_idx may be set as the second merge candidate. When the value of merge_2nd_idx is equal to or larger than the value of merge_idx, a merge candidate having a value obtained by adding 1 to the value of merge_2nd_idx as an index may be set as the second merge candidate.

Alternatively, the second merge candidate may be specified considering the search order of candidate blocks.

Figure 31:
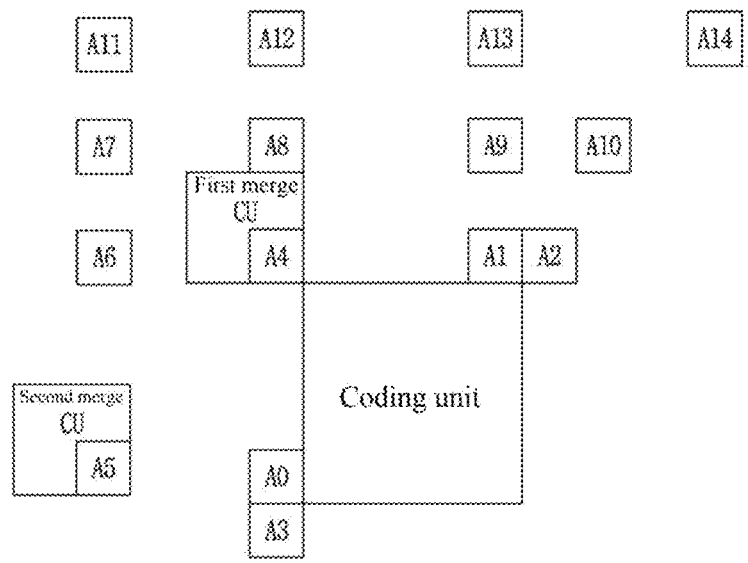
FIG. 31 is a view showing an example in which a second merge candidate is specified considering the search order of candidate blocks.

FIG. 31 is a view showing an example in which a second merge candidate is specified considering the search order of candidate blocks.

In the example shown in FIG. 31, indexes marked on neighboring samples and non-neighboring samples indicate the search order of candidate blocks. For example, candidate blocks may be sequentially searched from position A0 to position A14.

When block A4 is selected as the first merge candidate, a merge candidate derived from a candidate block having a search order next to A4 may be specified as the second merge candidate. For example, a merge candidate derived from A5 may be selected as the second merge candidate. When the candidate block at position A5 cannot be used as a merge candidate, a merge candidate derived from a next candidate block may be selected as the second merge candidate.

The first merge candidate and the second merge candidate may be selected among merge candidates derived from non-neighboring blocks.

Figure 32:
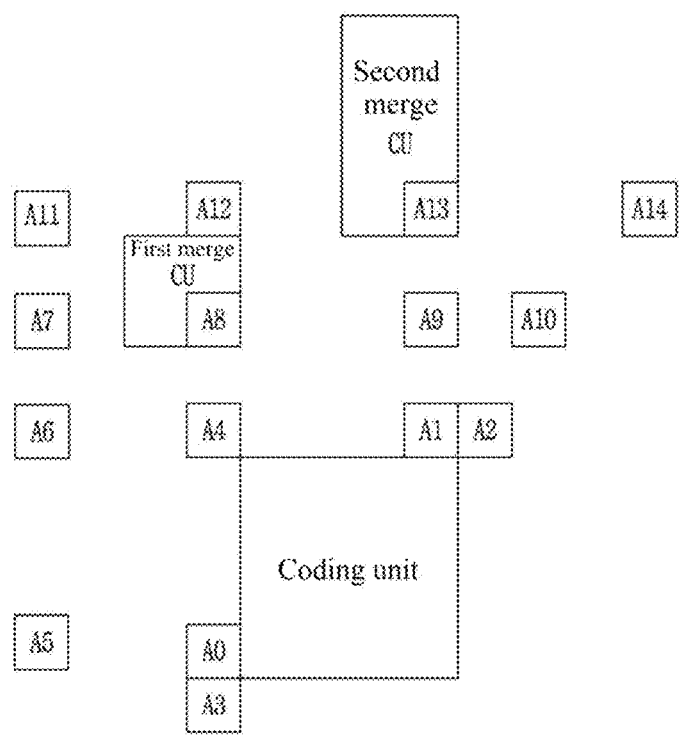
FIG. 32 is a view showing an example in which a first merge candidate and a second merge candidate are selected among merge candidates derived from non-neighboring blocks.

FIG. 32 is a view showing an example in which a first merge candidate and a second merge candidate are selected among merge candidates derived from non-neighboring blocks.

As shown in the example of FIG. 32, merge candidates derived from a first candidate block and a second candidate block that are not adjacent to the current block may be selected as the first merge candidate and the second merge candidate, respectively. At this point, the block line to which the first candidate block belongs and the block line to which the second candidate block belongs may be different. For example, the first merge candidate may be derived from any one among candidate blocks A5 to A10, and the second merge candidate may be derived from any one among candidate blocks A11 to A15.

Alternatively, it may be set such that the first candidate block and the second candidate block are not included in the same line (e.g., row or column).

As another example, the second merge candidate may be specified based on the first merge candidate. At this point, the first merge candidate may be specified by the index information merge_idx signaled from a bitstream. For example, a merge candidate adjacent to the first merge candidate may be specified as the second merge candidate. Here, the merge candidate adjacent to the first merge candidate may mean a merge candidate having an index difference of 1 with respect to the first merge candidate. For example, a merge candidate having an index value of merge_idx+1 may be set as the second merge candidate. At this point, when the value of merge_idx+1 is larger than the maximum index value (or when the index value of the first merge candidate is the maximum index), a merge candidate having an index value of merge_idx−1 or a merge candidate having an index value of a predefined value (e.g., 0) may be set as the second merge candidate.

Alternatively, the merge candidate adjacent to the first merge candidate may mean a merge candidate derived from a candidate block spatially adjacent to a candidate block used for deriving the first merge candidate. Here, the neighboring candidate block of the candidate block may mean a block adjacent to the candidate block in the left, right, top, bottom, or diagonal direction.

As another example, the second merge candidate may be specified based on motion information of the first merge candidate. For example, a merge candidate sharing the same reference picture with the first merge candidate may be selected as the second merge candidate. When there is a plurality of merge candidates sharing the same reference picture with the first merge candidate, a merge candidate having the smallest index among the plurality of merge candidates, a merge candidate having the smallest index difference from the first merge candidate, or a merge candidate having the smallest motion vector difference from the first merge candidate may be selected as the second merge candidate. Alternatively, the second merge candidate may be selected based on index information specifying any one among the plurality of merge candidates.

Alternatively, when the first merge candidate is unidirectional prediction of a first direction, a merge candidate including motion information in a second direction may be set as the second merge candidate. For example, when the first merge candidate has motion information of direction L0, a merge candidate having motion information of direction L1 may be selected as the second merge candidate. When there is a plurality of merge candidates having motion information of direction L1, a merge candidate having the smallest index or a merge candidate having the smallest index difference from the first merge candidate among the plurality of merge candidates may be set as the second merge candidate. Alternatively, the second merge candidate may be selected based on index information specifying any one among the plurality of merge candidates.

As another example, one among the merge candidates derived from neighboring blocks adjacent to the current block may be set as the first merge candidate, and one among the merge candidates derived from non-neighboring blocks not adjacent to the current block may be set as the second merge candidate.

As another example, one among the merge candidates derived from candidate blocks positioned on the top of the current block may be set as the first merge candidate, and one among the merge candidates derived from candidate blocks positioned on the left side may be set as the second merge candidate.

In the combined prediction mode combining a merge mode and a merge mode as described above, the merge mode may mean a merge mode based on a translational motion model (hereinafter, referred to as a translational merge mode) or a merge mode based on an affine motion model (hereinafter, referred to as an affine merge mode). That is, motion compensation prediction may be performed by combining a translational merge mode and a translational merge mode or by combining an affine merge mode and an affine merge mode.

As another example, when a neighboring block used for deriving the first merge candidate is encoded based on affine motion information, a merge candidate derived from the neighboring block encoded based on the affine motion information may be set as a second merge candidate. For example, when the first merge candidate is an affine merge candidate, or when the first merge candidate is derived based on motion information of a subblock in a coding block encoded based on the affine motion information, the affine merge candidate or the merge candidate derived based on motion information of a subblock in a coding block encoded based on the affine motion information may be selected as a second merge candidate. Here, the second merge candidate may include at least one among a merge candidate closest to the first merge candidate in the search order, a merge candidate having the smallest index difference from the first merge candidate, a merge candidate having the smallest index, and a merge candidate having the smallest motion vector difference from the first merge candidate, among the merge candidates that satisfy the above conditions.

Contrary to the example described above, when a neighboring block used for deriving the first merge candidate is encoded based on translational motion information (i.e., non-affine motion information), a merge candidate derived from the neighboring block encoded based on the translational motion information may be set as a second merge candidate. For example, when the first merge candidate is a non-affine merge candidate, a non-affine merge candidate may be selected as the second merge candidate. Here, the second merge candidate may include at least one among a merge candidate closest to the first merge candidate in the search order, a merge candidate having the smallest index difference from the first merge candidate, a merge candidate having the smallest index, and a merge candidate having the smallest motion vector difference from the first merge candidate, among the non-affine merge candidates.

Alternatively, the second merge candidate is derived by adding or subtracting an offset to or from the index of the first merge candidate, and when the encoding methods of neighboring blocks used for deriving the first merge candidate and the second merge candidate are different, the second merge candidate may be re-set to another merge candidate.

Figure 33:
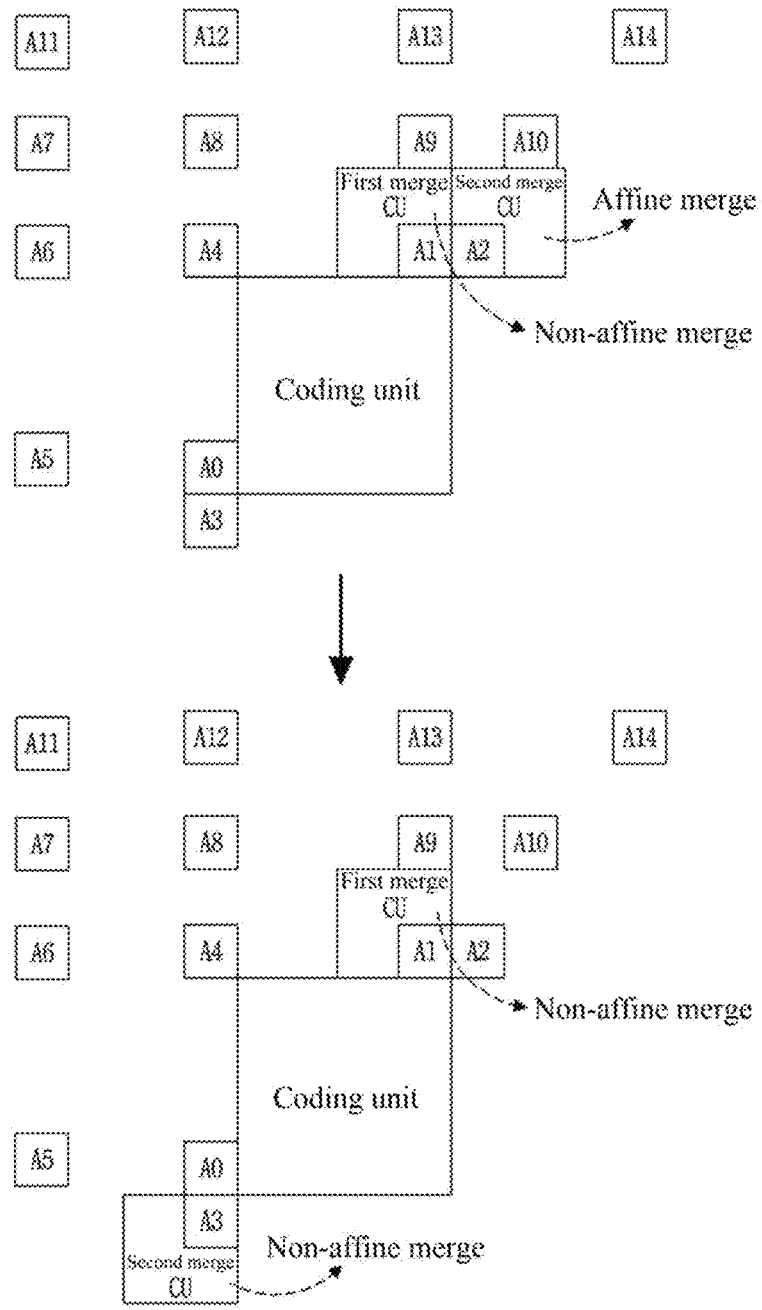
FIG. 33 is a view for describing an example of determining a second merge candidate.

FIG. 33 is a view for describing an example of determining a second merge candidate.

When the first merge candidate is selected, a merge candidate having an index derived by adding or subtracting an offset to or from the index of the first merge candidate may be selected as the second merge candidate. For example, a merge candidate having a value indicated by merge_idx signaled from a bitstream as an index may be selected as the first merge candidate, and a merge candidate having merge_idx+1 as an index may be selected as the second merge candidate.

At this point, when the first merge candidate is an affine merge candidate or is derived from a subblock belonging to a coding block encoded by an affine motion model, an affine merge candidate or a merge candidate derived from a subblock belonging to a coding block encoded by an affine motion model should be set as the second merge candidate. When a merge candidate having merge_idx+1 as an index is not an affine merge candidate or is not derived from a subblock belonging to a coding block encoded by an affine motion model, another merge candidate may be set as the second merge candidate. Here, another merge candidate may be the first merge candidate or a merge candidate having the smallest difference from merge_idx+1, among the affine merge candidates or the merge candidates derived from a subblock belonging to a coding block encoded by an affine motion model.

Contrarily, when the first merge candidate is a non-affine merge candidate, a non-affine merge candidate should be set as the second merge candidate. When a merge candidate having merge_idx+1 as an index is an affine merge candidate or is derived from a subblock belonging to a coding block encoded by an affine motion model, another merge candidate may be set as the second merge candidate. Here, another merge candidate may be the first merge candidate or a merge candidate having the smallest difference from merge_idx+1, among the non-affine merge candidates. For example, in the example shown in FIG. 33, it is shown that merge candidate A3 having merge_idx+2 as an index is set as the second merge candidate.

As another example, motion compensation prediction may be performed by combining a translational merge mode and an affine merge mode. That is, any one among the first merge candidate and the second merge candidate may be an affine merge candidate, and the other one may be a non-affine merge candidate.

A combined prediction block may be acquired through a weighted sum operation of the first prediction block derived from the first merge candidate and the second prediction block derived based on the second merge candidate. At this point, the weighting value applied to the first prediction block may be set to be larger than the weighting value applied to the second prediction block.

Alternatively, weighting values may be determined based on motion information of the first merge candidate and motion information of the second merge candidate. For example, weighting values applied to the first prediction block and the second prediction block may be determined based on the difference in the output order of the reference picture and the current picture. Specifically, as the difference in the output order of the reference picture and the current picture increases, the weighting value applied to the prediction block may be set to a smaller value.

Alternatively, weighting values applied to the first prediction block and the second prediction block may be determined considering the sizes or the shapes of the candidate block used for deriving the first merge candidate (hereinafter, referred to as the first candidate block) and the candidate block used for deriving the second merge candidate (hereinafter, referred to as the second candidate block). For example, a weighting value applied to a prediction block derived from the first candidate block or the second candidate block having a shape similar to that of the current block may be set to a large value. On the other hand, a weighting value applied to a prediction block derived from the first candidate block or the second candidate block having a shape dissimilar to that of the current block may be set to a small value.

Figure 34:
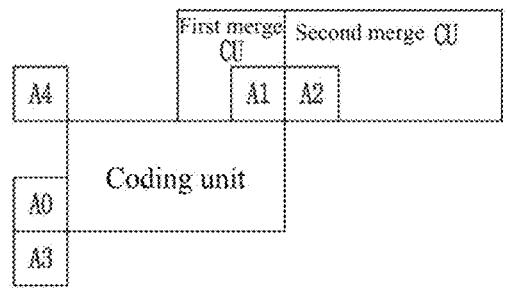
FIG. 34 is a view showing an example in which weighting values applied to prediction blocks are determined based on the shape of candidate blocks.

FIG. 34 is a view showing an example in which weighting values applied to prediction blocks are determined based on the shape of candidate blocks.

It is assumed that the current block is a non-square shape of which the width is greater than the height.

A first prediction block and a second prediction block may be derived based on the first merge candidate and the second merge candidate, and a combined prediction block may be generated based on a weighted sum operation of the first prediction block and the second prediction block. At this point, weighting values applied to the first prediction block and the second prediction block may be determined based on the shapes of the first candidate block and the second candidate block.

For example, in the example shown in FIG. 34, the first candidate block is a square shape, and the second candidate block is a non-square shape of which the width is greater than the height. Since the shape of the second candidate block is the same as that of the current block, the weighting value applied to the second prediction block may be set to be larger than the weighting value applied to the first prediction block. For example, a weighting value of ⅝ may be applied to the second prediction block, and a weighting value of ⅜ may be applied to the first prediction block. Equation 14 shows an example of deriving a combined prediction block based on a weighted sum operation of the first prediction block and the second prediction block.

$$P(x,y)=(3*P_1(x,y)+5*P_2(x,y))>>3 \qquad \text{[Equation 14]}$$

P(x, y) denotes a combined prediction block, $P_1$(x, y) denotes a first prediction block, and $P_2$(x, y) denotes a second prediction block.

As another example, weighting values applied to the first prediction block and the second prediction block may be determined based on the shape of the current block. For example, when the current block is a non-square shape of which the width is greater than the height, a larger weighting value may be applied to a prediction block generated based on a merge candidate derived based on a candidate block positioned on the top of the current block among the first merge candidate and the second merge candidate. When both the first merge candidate and the second merge candidate are derived from the candidate blocks positioned on the top of the current block, weighting values applied to the first prediction block and the second prediction block may be set equally. On the other hand, when the current block is a non-square shape of which the height is greater than the width, a larger weighting value may be applied to a prediction block generated based on a merge candidate derived based on a candidate block positioned on the left side of the current block among the first merge candidate and the second merge candidate. When both the first merge candidate and the second merge candidate are derived from the candidate blocks positioned on the left side of the current block, weighting values applied to the first prediction block and the second prediction block may be set equally. When the current block is a square shape, weighting values applied to the first prediction block and the second prediction block may be set equally.

As another example, a weighting value applied to each prediction block may be determined based on the distance between the current block and a candidate block. Here, the distance may be derived based on an x-axis coordinate difference, a y-axis coordinate difference from the current block, or a minimum value among them. A weighting value applied to a prediction block derived from a merge candidate having a small distance from the current block may be set to be larger than a weighting value applied to a prediction block derived from a merge candidate having a large distance from the current block. For example, in the example shown in FIG. 31, the first merge candidate is derived from a neighboring block adjacent to the current block, and the second merge candidate is derived from a non-neighboring block that is not adjacent to the current block. In this case, since the x-axis distance between the first candidate block and the current block is smaller than the x-axis distance between the second candidate block and the current block, the weighting value applied to the first prediction block may be set to be larger than the weighting value applied to the second prediction block.

Alternatively, when both the first merge candidate and the second merge candidate are derived from non-neighboring blocks, a larger weighting value may be assigned to a prediction block derived from a non-neighboring block at a distance closer to the current block among the non-neighboring blocks. For example, in the example shown in FIG. 32, since the y-axis distance between the first candidate block and the current block is smaller than the y-axis distance between the second candidate block and the current block, the weighting value applied to the first prediction block may be set to be larger than the weighting value applied to the second prediction block.

Integrated motion information may be derived based on the first merge candidate and the second merge candidate, and motion compensation prediction for the current block may be performed based on the integrated motion information. For example, a motion vector of the current block may be derived based on an average operation or a weighted sum operation of the motion vector of the first merge candidate and the motion vector of the second merge candidate. At this point, the weighting value applied to the motion vector of the first merge candidate and the weighting value applied to the motion vector of the second merge candidate may be determined by the implementations described above.

When the first merge candidate is a non-affine merge candidate and the second affine merge candidate is an affine merge candidate, a motion vector of the current block may be derived by scaling the motion vector of the second merge candidate. Equation 15 shows an example of deriving a motion vector of the current block.

$$(mvX, mvY) = (mc0x, mv0y) + ((mv1x, mv1y) >> M) \quad \text{[Equation 15]}$$

In Equation 15, (mvX, mvY) denotes the motion vector of the current block, (mv0x, mv0y) denotes the motion vector of the first merge candidate, and (mv1x, mv1y) denotes the motion vector of the second merge candidate. M denotes a scaling parameter. M may be predefined in the encoder and the decoder. Alternatively, the value of the scaling parameter M may be determined according to the size of the current block or a candidate block. For example, when the width or the height of the second candidate block is larger than 32, M may be set to 3, and in other cases, M may be set to 2.

Motion information of the first merge candidate or the second merge candidate may be stored as motion information of a block to which the combined prediction mode combining a merge mode and a merge mode is applied. The stored motion information may be used for deriving motion information of a block that will be encoded/decoded thereafter.

Alternatively, the block may be partitioned into a plurality of subblocks, and any one among motion information of the first merge candidate and motion information of the second merge candidate may be stored as motion information of each subblock. At this point, motion information of some of the plurality of subblocks may be set as motion information of the first merge candidate, and motion information of the others may be set as motion information of the second merge candidate.

Alternatively, integrated motion information derived based on the motion information of the first merge candidate and the second merge candidate may be stored as motion information of a block to which the combined prediction mode combining a merge mode and a merge mode is applied.

In the prediction mode in which a merge mode and an advanced motion vector prediction mode are combined, a first prediction block is generated using motion information derived from a merge candidate, and a second prediction block is generated using a motion vector derived from a motion vector prediction candidate.

In the advanced motion vector prediction mode, a motion vector prediction candidate may be derived from a neighboring block adjacent to the current block or a collocated block in a collocated picture. Thereafter, any one among a plurality of motion vector prediction candidates may be specified, and the specified motion vector prediction candidate may be set as the motion vector predictor of the current block. Thereafter, a motion vector of the current block may be derived by adding the motion vector predictor of the current block and a motion vector difference value.

In the prediction mode in which a merge mode and an advanced motion vector prediction mode are combined, the merge candidate and the motion vector prediction candidate may be derived from the same candidate block. For example, when the merge candidate is specified by merge_idx, a motion vector of a candidate block used for deriving the specified merge candidate may be set as the motion vector predictor. Alternatively, when the motion vector prediction candidate is specified by mvp_flag, a merge candidate derived from a candidate block used for deriving the specified merge candidate may be selected.

Alternatively, the candidate block used for deriving the merge candidate and the candidate block used for deriving the motion vector prediction candidate may be different. For example, when a merge candidate derived from a candidate block positioned on the top of the current block is selected, it may be set to select a motion vector prediction candidate derived from a candidate block positioned on the left side of the current block.

Alternatively, when the merge candidate selected by index information and the motion vector prediction candidate selected by index information are derived from the same candidate block, the motion vector prediction candidate may be replaced with a motion vector prediction candidate derived from a neighboring candidate block adjacent to the candidate block, or the merge candidate may be replaced with a merge candidate derived from a candidate block adjacent to the candidate block.

Figure 35:
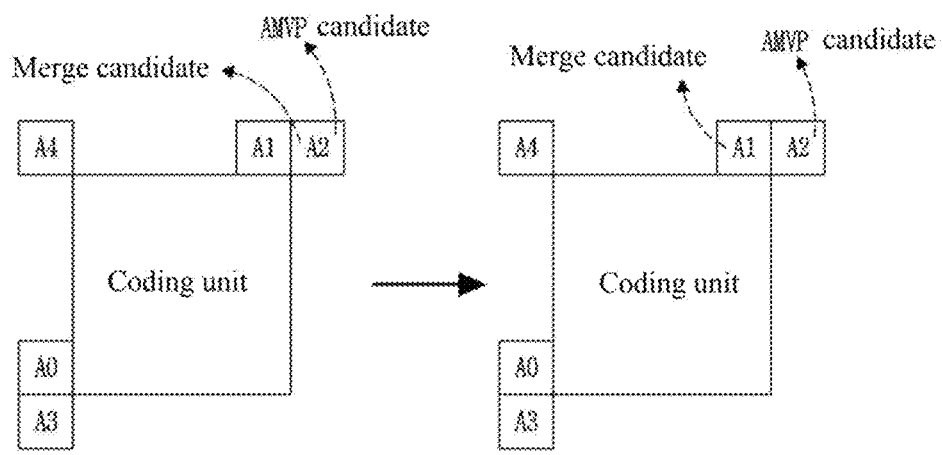
FIG. 35 is a view showing an example in which a merge candidate is replaced.

FIG. 35 is a view showing an example in which a merge candidate is replaced.

In the example shown in FIG. 35 (a), it is shown that a merge candidate and a motion vector prediction candidate derived from the candidate block at position A2 are selected. As shown in the figure, when a merge candidate and a motion vector prediction candidate are derived from the same candidate block, a merge candidate or a motion vector prediction candidate derived from a candidate block adjacent to the candidate block may be used instead of the merge candidate or the motion vector prediction candidate. For example, as shown in the example of FIG. 35 (b), a merge candidate at position A1 may be used instead of the merge candidate at position A2.

A first prediction block may be derived based on the merge candidate of the current block, and a second prediction block may be derived based on the motion vector prediction candidate. Thereafter, a combined prediction block may be derived through a weighted sum operation of the first prediction block and the second prediction block. At this point, the weighting value applied to the second prediction block generated using the advanced motion vector prediction mode may be set to be larger than the weighting value applied to the first prediction block generated using the merge mode.

A derived residual picture may be derived by subtracting a prediction video from an original video. At this point, when the residual video is changed to the frequency domain, subjective video quality of the video is not significantly lowered although the high-frequency components among the frequency components are removed. Accordingly, when values of the high-frequency components are converted to be small or the values of the high-frequency components are set to 0, there is an effect of increasing the compression efficiency without generating significant visual distortion. By reflecting this characteristic, the current block may be transformed to decompose a residual video into two-dimensional frequency components. The transform may be performed using a transform technique such as Discrete Cosine Transform (DCT) or Discrete Sine Transform (DST).

The DCT decomposes (or transforms) a residual video into two-dimensional frequency components using a cosine transform, and the DST decomposes (or transforms) a residual video into two-dimensional frequency components using a sine transform. As a result of transforming the residual video, the frequency components may be expressed as a basis video. For example, when DCT transform is performed on a block of an N×N size, as many basic pattern components as $N^2$ may be acquired. The size of each of the basic pattern components included in a block of an N×N size may be acquired through the transform. According to a transform technique used therefor, the size of the basic pattern component may be referred to as a DCT coefficient or a DST coefficient.

Transform technique DCT is mainly used to transform a video in which many non-zero low-frequency components are distributed. The transform technique DST is mainly used for videos in which many high-frequency components are distributed.

The residual video may be transformed using a transform technique other than the DCT or the DST.

Hereinafter, transform of a residual video into two-dimensional frequency components will be referred to as two-dimensional video transform. In addition, the size of the basic pattern components acquired as a result of the transform is referred to as a transform coefficient. For example, the transform coefficient may mean a DCT coefficient or a DST coefficient. When both first transform and second transform described below are applied, the transform coefficient may mean the size of a basic pattern component generated as a result of the second transform.

The transform technique may be determined for each block. The transform technique may be determined based on at least one among the prediction encoding mode of the current block, the size of the current block, and the shape of the current block. For example, when the current block is encoded in the intra prediction mode and the size of the current block is smaller than N×N, transform may be performed using the transform technique DST. On the other hand, when the above conditions are not satisfied, transform may be performed using the transform technique DCT.

The two-dimensional video transform may not be performed for some blocks of the residual video. Not performing the two-dimensional video transform may be referred to as a transform skip. When the transform skip is applied, quantization may be applied to residual coefficients that have not been transformed.

After the current block is transformed using DCT or DST, the transformed current block may be transformed again. At this point, the transform based on DCT or DST may be defined as a first transform, and transforming again a block to which the first transform is applied may be defined as a second transform.

The first transform may be performed using any one among a plurality of transform core candidates. For example, the first transform may be performed using any one among DCT2, DCT8, or DCT7.

Different transform cores may be used for the horizontal direction and the vertical direction. Information indicating combination of a transform core of the horizontal direction and a transform core of the vertical direction may be signaled through a bitstream.

Units for performing the first transform and the second transform may be different. For example, the first transform may be performed on an 8×8 block, and the second transform may be performed on a subblock of a 4×4 size among the transformed 8×8 block. At this point, the transform coefficients of the residual regions that has not been performed the second transform may be set to 0.

Alternatively, the first transform may be performed on a 4×4 block, and the second transform may be performed on a region of an 8×8 size including the transformed 4×4 block.

Information indicating whether or not the second transform has been performed may be signaled through a bitstream.

Alternatively, whether or not to perform the second transform may be determined based on whether the horizontal direction transform core and the vertical direction transform core are the same. For example, the second transform may be performed only when the horizontal direction transform core and the vertical direction transform core are the same.

Alternatively, the second transform may be performed only when the horizontal direction transform core and the vertical direction transform core are different from each other.

Alternatively, the second transform may be allowed only when transform of the horizontal direction and transform of the vertical direction use a predefined transform core. For example, when a DCT2 transform core is used for transform of the horizontal direction and transform of the vertical direction, the second transform may be allowed.

Alternatively, whether or not to perform the second transform may be determined based on the number of non-zero transform coefficients of the current block. For example, it may be set not to use the second transform when the number of non-zero transform coefficients of the current block is smaller than or equal to a threshold value, and it may be set to use the second transform when the number of non-zero transform coefficient of the current block is larger than the threshold value. It may be set to use the second transform only when the current block is encoded by intra prediction.

Based on the shape of the current block, the size or the shape of a subblock on which the second transform will be performed may be determined.

Figure 36:
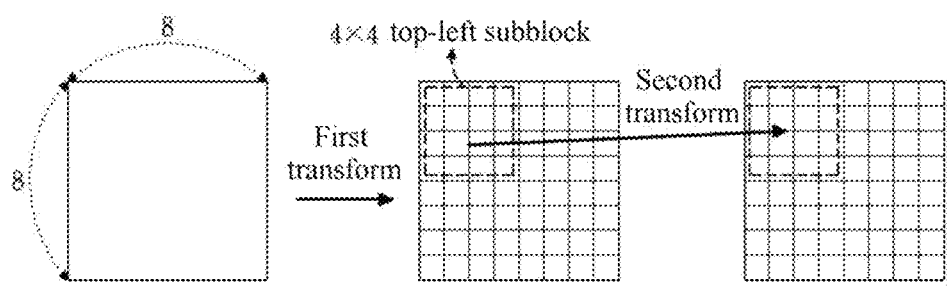
FIG. 36 is a view showing a subblock on which a second transform will be performed.
Figure 37:
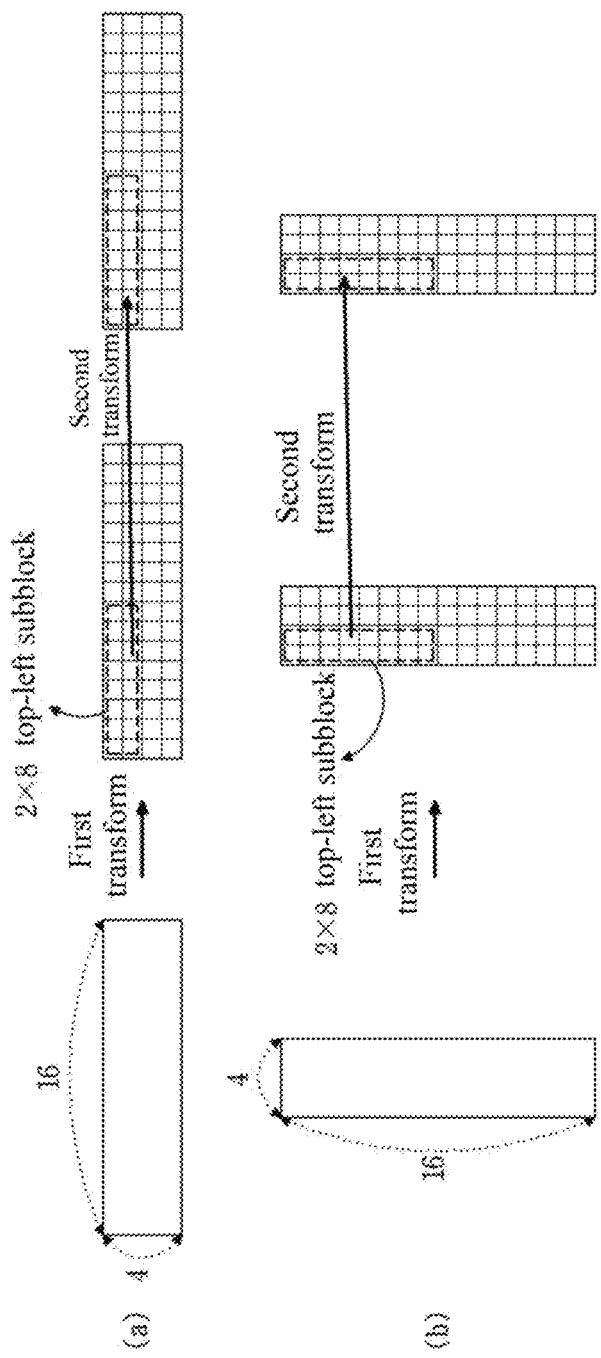
FIG. 37 is a view showing a subblock on which a second transform will be performed.

FIGS. 36 and 37 are views showing a subblock on which a second transform will be performed.

When the current block is a square shape, the second transform may be performed on a subblock having a N×N size at the top-left of the current block after the first transform is performed. For example, when the current block is a coding block of an 8×8 size, the second transform may be performed on a subblock having a 4×4 size at the top-left of the current block after the first transform is performed on the current block (see FIG. 36).

When the current block is a non-square shape of which the width is at least 4 times greater than the height, the second transform may be performed on a subblock of a (kN)×(4 kN) size at the top-left of the current block after the first transform is performed. For example, when the current block is a non-square shape of a 16×4 size, the second transform may be performed on a subblock of a 2×8 size at the top-left of the current block after the first transform is performed on the current block (see FIG. 37 (a)).

When the current block is a non-square shape of which the height is at least 4 times greater than the width, the second transform may be performed on a subblock of a (4 kN)×(kN) size at the top-left of the current block after the first transform is performed. For example, when the current block is a non-square shape of a 16×4 size, the second transform may be performed on a subblock of a 2×8 size at the top-left of the current block after the first transform is performed on the current block (see FIG. 37 (b)).

The decoder may perform inverse transform of the second transform (second inverse transform) and may perform inverse transform of the first transform (first inverse transform) on a result of the second inverse transform. As a result of performing the second inverse transform and the first inverse transform, residual signals for the current block may be acquired.

Information indicating the transform type of the current block may be signaled through a bitstream. The information may be index information tu_mts_idx indicating one among combinations of a transform type for the horizontal direction and a transform type for the vertical direction.

A transform core for the vertical direction and a transform core for the horizontal direction may be determined based on the transform type candidates specified by index information tu_mts_idx. Tables 11 and 12 show transform type combinations according to tu_mts_idx.

TABLE 11

| tu_mts_idx | transform type | |
|---|---|---|
| | horizontal | vertical |
| 0 | SKIP | SKIP |
| 1 | DCT-II | DCT-II |
| 2 | DST-VII | DST-VII |
| 3 | DCT-VIII | DST-VII |
| 4 | DST-VII | DCT-VIII |
| 5 | DCT-VIII | DCT-VIII |

TABLE 12

| tu_mts_idx | transform type | |
|---|---|---|
| | horizontal | vertical |
| 0 | DCT-II | DCT-II |
| 1 | SKIP | SKIP |
| 2 | DST-VII | DST-VII |
| 3 | DCT-VIII | DST-VII |
| 4 | DST-VII | DCT-VIII |
| 5 | DCT-VIII | DCT-VIII |

The transform type may be determined as any one among DCT2, DST7, DCT8, and skip transform. Alternatively, a transform type combination candidate may be configured using only transform cores except the transform skip.

In the case where Table 11 is used, when tu_mts_idx is 0, transform skip may be applied in the horizontal direction and the vertical direction. When tu_mts_idx is 1, DCT2 may be applied in the horizontal direction and the vertical direction. When tu_mts_idx is 3, DCT8 may be applied in the horizontal direction, and DCT7 may be applied in the vertical direction.

In the case where Table 12 is used, when tu_mts_idx is 0, DCT2 may be applied in the horizontal direction and the vertical direction. When tu_mts_idx is 1, transform skip may be applied in the horizontal direction and the vertical direction. When tu_mts_idx is 3, DCT8 may be applied in the horizontal direction, and DCT7 may be applied in the vertical direction.

Whether or not to encode the index information may be determined based on at least one among the size, the shape, and the number of non-zero coefficients of the current block. For example, when the number of non-zero coefficients is equal to or smaller than a threshold value, index information is not signaled, and a default transform type may be applied to the current block. Here, the default transform type may be DST7. Alternatively, the default mode may vary according to the size, the shape, or the intra prediction mode of the current block.

The threshold value may be determined based on the size or the shape of the current block. For example, when the size of the current block is smaller than or equal to 32×32, the threshold value may be set to 2, and when the current block is larger than 32×32 (e.g., when the current block is a coding block of a 32×64 or 64×32 size), the threshold value may be set to 4.

A plurality of lookup tables may be previously stored in the encoder/decoder. In the plurality of lookup tables, at least one among the index value assigned to the transform type combination candidates, the type of the transform type combination candidates, and the number of transform type combination candidates may be different.

A lookup table for the current block may be selected based on at least one among the size of the current block, the shape of the current block, the prediction encoding mode of the current block, the intra prediction mode of the current block, whether the second transform is applied, and whether transform skip is applied to a neighboring block.

For example, when the size of the current block is 4×4 or smaller or when the current block is encoded by inter prediction, the lookup table of Table 11 may be used, and when the size of the current block is larger than 4×4 or when the current block is encoded by intra prediction, the lookup table of Table 12 may be used.

Alternatively, information indicating any one among the plurality of lookup tables may be signaled through a bitstream. The decoder may select a lookup table for the current block based on the information.

As another example, the index assigned to the transform type combination candidate may be adaptively determined based on at least one among the size of the current block, the shape of the current block, the prediction encoding mode of the current block, the intra prediction mode of the current block, whether the second transform is applied, and whether transform skip is applied to a neighboring block. For example, when the size of the current block is 4×4, the index assigned to the transform skip may have a value smaller than that of the index assigned to the transform skip when the size of the current block is larger than 4×4. Specifically, when the size of the current block is 4×4, index 0 may be assigned to the transform skip, and when the current block is larger than 4×4 and smaller than or equal to 16×16, an index larger than 0 (e.g., index 1) may be assigned to the transform skip. When the current block is larger than 16×16, a maximum value (e.g., 5) may be assigned to the index of the transform skip.

Alternatively, when the current block is encoded by inter prediction, index 0 may be assigned to the transform skip. When the current block is encoded by intra prediction, an index larger than 0 (e.g., index 1) may be assigned to the transform skip.

Alternatively, when the current block is a block of a 4×4 size encoded by inter prediction, index 0 may be assigned to the transform skip. On the other hand, when the current block is not encoded by inter prediction or the current block is larger than 4×4, an index of a value larger than 0 (e.g., index 1) may be assigned to the transform skip.

Transform type combination candidates different from the transform type combination candidates listed in Tables 11 and 12 may be defined and used. For example, a transform type combination candidate may be used, in which transform skip is applied to any one among the horizontal direction transform and the vertical direction transform, and a transform core such as DCT7, DCT8, or DST2 is applied to the other one. At this time, whether or not to use the transform skip as a transform type candidate for the horizontal direction or the vertical direction may be determined based on at least one among the size (e.g., width and/or height), the shape, the prediction encoding mode, and the intra prediction mode of the current block.

Alternatively, information indicating whether a specific transform type candidate is available may be signaled through a bitstream. For example, a flag indicating whether the transform skip may be used as a transform type candidate for the horizontal direction and the vertical direction may be signaled. According to the flag, whether a specific transform type combination candidate is included in a plurality of transform type combination candidates may be determined.

Alternatively, whether a specific transform type candidate is applied to the current block may be signaled through a bitstream. For example, flag cu_mts_flag indicating whether or not to apply DCT2 for the horizontal direction and the vertical direction may be signaled. When the value of cu_mts_flag is 1, DCT2 may be set as a transform core for the vertical direction and the horizontal direction. When the value of cu_mts_flag is 0, DCT8 or DST7 may be set as a transform core for the vertical direction and the horizontal direction. Alternatively, when the value of cu_mts_flag is 0, information tu_mts_idx specifying any one among the plurality of transform type combination candidates may be signaled.

When the current block is a non-square shape of which the width is greater than the height or a non-square shape of which the height is greater than the width, encoding of cu_mts_flag may be omitted, and the value of cu_mts_flag may be regarded as 0.

The number of available transform type combination candidates may be set differently according to the size, the shape, or the intra prediction mode of the current block. For example, when the current block is a square shape, three or more transform type combination candidates may be used, and when the current block is a non-square shape, two transform type combination candidates may be used. Alternatively, when the current block is a square shape, only transform type combination candidates of which the transform type for the horizontal direction is different from the transform type for the vertical direction may be used among the transform type combination candidates.

When there are three or more transform type combination candidates that the current block may use, index information tu_mts_idx indicating one among the transform type combination candidates may be signaled. On the other hand, when there are two transform type combination candidates that the current block may use, flag mts_flag indicating any one among the transform type combination candidates may be signaled. Table 13 shows a process of encoding information for specifying transform type combination candidates according to the shape of the current block.

TABLE 13

| | Descriptor |
|---|---|
| residual_coding (x0, y0, log2TbWidth, log2TbHeight, cIdx) { . . . if (cu_mts_flag[x0][y0] && (cIdx == 0) && !transform_skip_flag[x0][y0][cIdx] && ((CuPredMode[x0][y0] == MODE_INTRA && numSigCoeff > 2) \|\| (CuPredMode[x0][y0] == MODE_INTER))) { if (cbHeight == cbWidth) { mts_idx[x0][y0] } else { mts_flag[x0][y0] } } } | ae(v) u(1) |

Indexes of the transform type combination candidates may be rearranged (or reordered) according to the shape of the current block. For example, the indexes assigned to the transform type combination candidates when the current block is a square shape may be different from the indexes assigned to the transform type combination candidates when the current block is a non-square shape. For example, when the current block is a square shape, a transform type combination may be selected based on Table 14 shown below, and when the current block is non-square shape, a transform type combination may be selected based on Table 15 shown below.

TABLE 14

| | INTRA | | INTER | |
|---|---|---|---|---|
| mts_idx mts_idx | Horizontal direction transform core | Vertical direction transform core | Horizontal direction transform core | Vertical direction transform core |
| 0 | DST7 | DST7 | DCT8 | DCT8 |
| 1 | DCT8 | DST7 | DST7 | DCT8 |

TABLE 14-continued

| | INTRA | | INTER | |
|---|---|---|---|---|
| mts_idx mts_idx | Horizontal direction transform core | Vertical direction transform core | Horizontal direction transform core | Vertical direction transform core |
| 2 | DST7 | DCT8 | DCT8 | DST7 |
| 3 | DCT8 | DCT8 | DST7 | DST7 |

TABLE 15

| | INTRA | | INTER | |
|---|---|---|---|---|
| mts_idx mts_idx | Horizontal direction transform core | Vertical direction transform core | Horizontal direction transform core | Vertical direction transform core |
| 0 | DCT8 | DST7 | DST7 | DCT8 |
| 1 | DST7 | DCT8 | DCT8 | DST7 |
| 2 | DST7 | DST7 | DST7 | DST7 |
| 3 | DCT8 | DCT8 | DST7 | DST7 |

A transform type may be determined based on the number of horizontal direction non-zero coefficients or the number of vertical direction non-zero coefficients of the current block. Here, the number of horizontal direction non-zero coefficients indicates the number of non-zero coefficients included in a 1×N block (where N is the width of the current block), and the number of vertical direction non-zero coefficients indicates the number of non-zero coefficients included in a N×1 block (where N is the height of the current block). When the maximum value of the horizontal direction non-zero coefficient is smaller than or equal to a threshold value, a first transform type may be applied in the horizontal direction, and when the maximum value of the horizontal direction non-zero coefficient is larger than the threshold value, a second transform type may be applied in the horizontal direction. When the maximum value of the vertical direction non-zero coefficient is smaller than or equal to a threshold value, the first transform type may be applied in the vertical direction, and when the maximum value of the vertical direction non-zero coefficient is larger than the threshold value, the second transform type may be applied in the vertical direction.

FIG. 38 is a view for describing examples of determining a transform type of the current block.

For example, when the current block is encoded by intra prediction and the maximum value of the horizontal direction non-zero coefficient of the current block is 2 or less (see FIG. 38 (a)), the transform type of the horizontal direction may be determined as DST7.

When the current block is encoded by intra prediction and the maximum value of the vertical direction non-zero coefficient of the current block is larger than 2 (see FIG. 38 (b)), DCT2 or DCT8 may be determined as the transform type of the vertical direction.

Information indicating whether or not to explicitly determine the transform type of the current block based on information signaled from a bitstream may be signaled through a bitstream. For example, information sps_explicit_intra_mts_flag indicating whether explicit transform type determination is allowed for a block encoded by intra prediction and/or information sps_explicit_inter_mts_flag indicating whether explicit transform type determination is allowed for a block encoded by inter prediction may be signaled at a sequence level.

When explicit transform type determination is allowed, a transform type of the current block may be determined based on index information tu_mts_idx signaled from a bitstream. On the other hand, when explicit transform type determination is not allowed, the transform type may be determined based on at least one among the size of the current block, the shape of the current block, whether transform of a subblock unit is allowed, and the position of a subblock including a non-zero transform coefficient. For example, the horizontal direction transform type of the current block may be determined based on the width of the current block, and the vertical direction transform type of the current block may be determined based on the height of the current block. For example, when the width of the current block is smaller than 4 or greater than 16, the transform type of the horizontal direction may be determined as DCT2. Otherwise, the transform type of the horizontal direction may be determined as DST7. When the height of the current block is smaller than 4 or greater than 16, the transform type of the vertical direction may be determined as DCT2. Otherwise, the transform type of the vertical direction may be determined as DST7. Here, in order to determine the transform type of the horizontal direction and the transform type of the vertical direction, threshold values compared with the width and the height may be determined based on at least one among the size, the shape, and the intra prediction mode of the current block.

Alternatively, when the current block is a square shape of which the height and the width are the same, the horizontal direction transform type and the vertical direction transform type are set to be the same, whereas when the current block is a non-square shape of which the height and the width are different, the horizontal direction transform type and the vertical transform The transform type may be set to be different from each other. For example, when the width of the current block is greater than the height, the horizontal direction transform type may be determined as DST7, and the vertical direction transform type may be determined as DCT2. When the height of the current block is greater than the width, the vertical direction transform type may be determined as DST7, and the horizontal direction transform type may be determined as DCT2.

The number and/or the type of transform type candidates or the number and/or the type of transform type combination candidates may vary according to whether explicit transform type determination is allowed. For example, when explicit transform type determination is allowed, DCT2, DST7, and DCT8 may be used as transform type candidates. Accordingly, each of the horizontal direction transform type and the vertical direction transform type may be set to DCT2, DST8, or DCT8. When explicit transform type determination is not allowed, only DCT2 and DST7 may be used as transform type candidates. Accordingly, each of the horizontal direction transform type and the vertical direction transform type may be determined as DCT2 or DST7.

When the encoder performs transform and quantization, the decoder may acquire a residual block through inverse quantization and inverse transform. The decoder may acquire a reconstructed block for the current block by adding a prediction block and the residual block.

When a reconstructed block of the current block is acquired, loss of information occurring in the quantization and encoding process may be reduced through in-loop filtering. An in-loop filter may include at least one among a deblocking filter, a sample adaptive offset filter (SAO), and an adaptive loop filter (ALF). Hereinafter, a reconstructed block before the in-loop filter is applied is referred to as a first reconstructed block, and a reconstructed block after the in-loop filter is applied is referred to as a second reconstructed block.

The second reconstructed block may be acquired by applying at least one among the deblocking filter, the SAO, and the ALF to the first reconstructed block. At this point, the SAO or the ALF may be applied after the deblocking filter is applied.

The deblocking filter is for mitigating degradation of video quality (blocking artifact) at the boundary of a block, which occurs as quantization is performed on individual blocks. In order to apply the deblocking filter, a block strength (BS) between the first reconstructed block and a neighboring reconstructed block may be determined.

Figure 39:
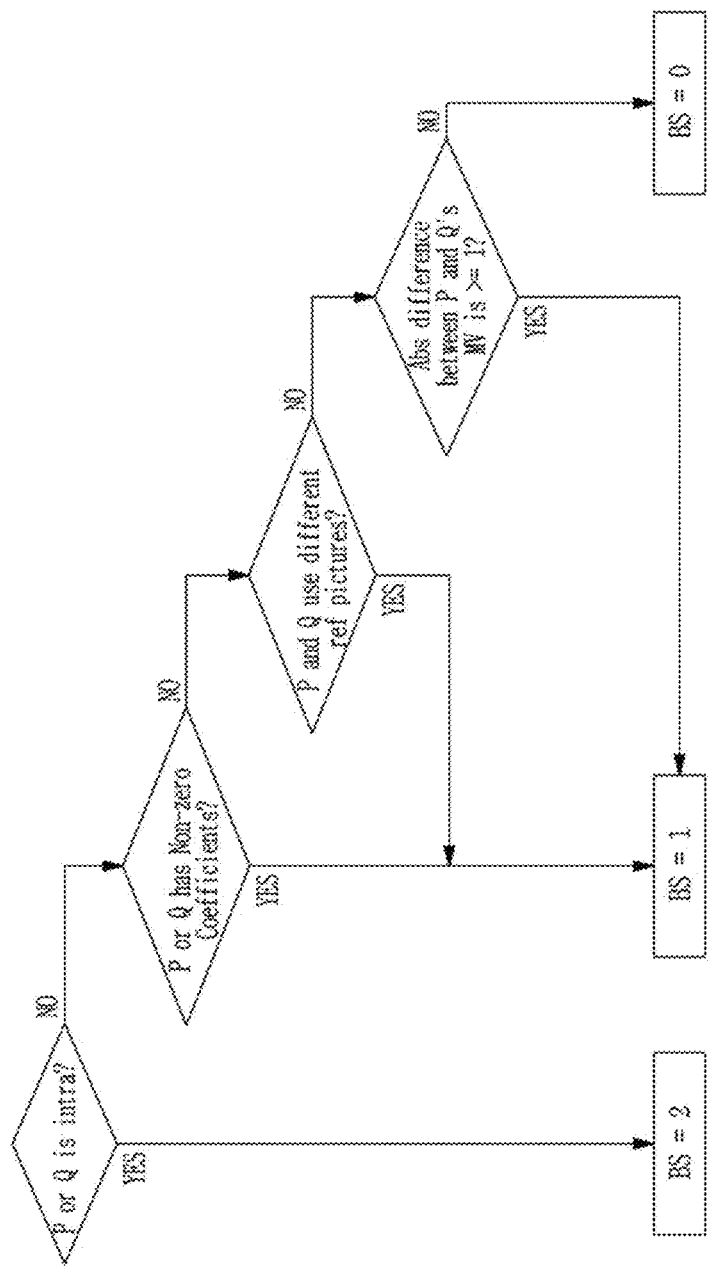
FIG. 39 is a flowchart illustrating a process of determining block strength.

FIG. 39 is a flowchart illustrating a process of determining block strength.

In the example shown in FIG. 39, P denotes a first reconstructed block, and Q denotes a neighboring reconstructed block. Here, the neighboring reconstructed block may be a block adjacent to the left side or the top side of the current block.

In the example shown in FIG. 39, it is shown that the block strength is determined considering the prediction encoding modes of P and Q, whether a non-zero transform coefficient is included, whether inter prediction is performed using the same reference picture, and whether the difference value of motion vectors is larger than or equal to a threshold value.

Whether or not to apply the deblocking filter may be determined based on the block strength. For example, when the block strength is 0, filtering may not be performed.

The SAO is for mitigating a ringing phenomenon (ringing artifact) that occurs as quantization is performed in the frequency domain. The SAO may be performed by adding or subtracting an offset determined considering the pattern of the first reconstructed video. The method of determining the offset includes an edge offset (EO) or a band offset (BO). EO denotes a method of determining an offset of a current sample according to the pattern of surrounding pixels. BO denotes a method of applying a common offset to a set of pixels having similar brightness values in a region. Specifically, pixel brightness may be divided into 32 equal sections, and pixels having similar brightness values may be set as one set. For example, four adjacent bands among 32 bands may be set as one group, and the same offset value may be applied to the samples belonging to the four bands.

The ALF is a method of generating a second reconstructed video by applying a filter having a predefined size/shape to the first reconstructed video or a reconstructed video to which a deblocking filter has been applied. Equation 16 shows an example of applying the ALF.

$$R'(i, j) = \sum_{k=-\frac{N}{2}}^{\frac{N}{2}} \sum_{l=-\frac{N}{2}}^{\frac{N}{2}} f(k, l) \cdot R(i+k, j+l)$$ [Equation 16]

Any one among predefined filter candidates may be selected by the unit of a picture, a coding tree unit, a coding block, a prediction block, or a transform block. Each of the filter candidates may be different in either the size or the shape.

Figure 40:
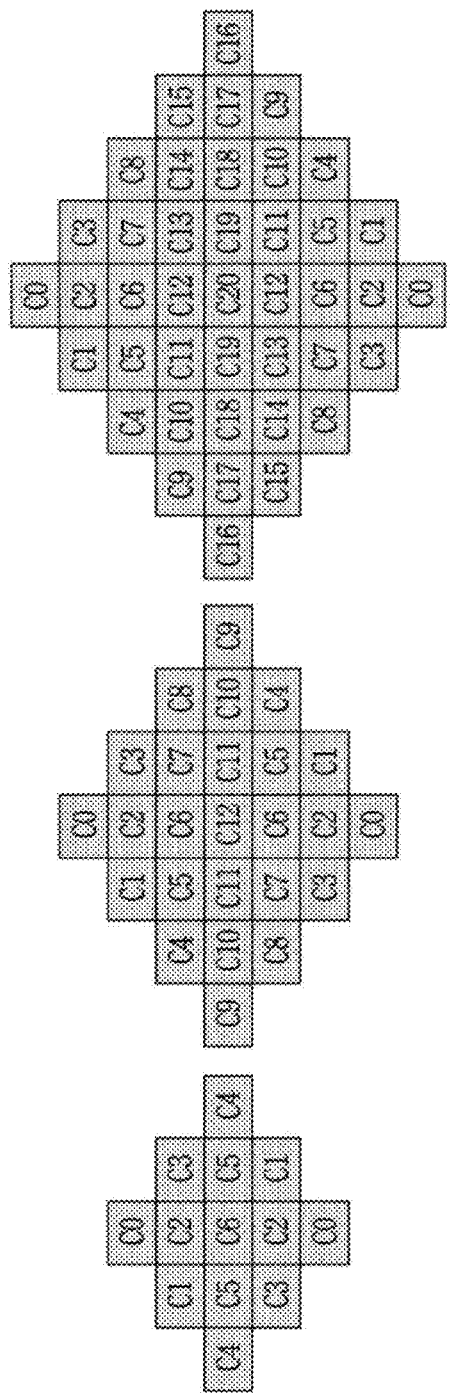
FIG. 40 is a view showing predefined filter candidates.

FIG. 40 is a view showing predefined filter candidates.

As shown in the example of FIG. 40, at least one among 5×5, 7×7 and 9×9 diamond shapes may be selected.

Only a diamond shape of a 5×5 size may be used for a chroma component.

Applying the implementations described above focusing on a decoding process or an encoding process to an encoding process or a decoding process is included in the scope of the present disclosure. Changing the implementations described in a predetermined order in an order different from the described order is also included in the scope of the present disclosure.

Although the implementations above have been described based on a series of steps or flowcharts, this does not limit the time series order of the present disclosure, and may be performed simultaneously or in a different order as needed. In addition, each of the components (e.g., units, modules, etc.) constituting the block diagram in the implementations described above may be implemented as a hardware device or software, or a plurality of components may be combined to be implemented as a single hardware device or software. The implementations described above may be implemented in the form of program commands that can be executed through various computer components and recorded in a computer-readable recording medium. The computer-readable recording medium may include program commands, data files, data structures and the like independently or in combination. The computer-readable recording medium includes, for example, magnetic media such as a hard disk, a floppy disk and a magnetic tape, optical recording media such as a CD-ROM and a DVD, magneto-optical media such as a floptical disk, and hardware devices specially configured to store and execute program commands, such as a ROM, a RAM, a flash memory and the like. The hardware devices described above can be configured to operate using one or more software modules to perform the process of the present disclosure, and vice versa.

The present disclosure can be applied to an electronic device that encodes and decodes a video.

What is claimed is:
1. A video decoding method comprising the steps of:
determining whether or not to apply a combined prediction mode to a current block;
obtaining a first prediction block and a second prediction block for the current block when the combined prediction mode is applied to the current block, wherein the first prediction block is obtained based on motion information of a merge candidate of the current block, and the second prediction block is obtained based on an intra prediction mode of the current block; and obtaining a third prediction block for the current block based on a weighted sum operation of the first prediction block and the second prediction block wherein when the combined prediction mode is applied to the current block, triangular partitioning is disabled for the current block.

2. The method according to claim 1, wherein the intra prediction mode of the current block is set to a planar mode.

3. The method according to claim 2, wherein the second prediction block is obtained based on a reference sample line included in an adjacent reference sample line.

4. The method according to claim 1, wherein in performing the weighted sum operation, weighting values applied to the first prediction block and the second prediction block are determined based on prediction modes of neighboring blocks adjacent to the current block.

5. The method according to claim 1, wherein when at least one among a width and a height of the current block is greater than a threshold value, the combined prediction mode is not applied to the current block.

6. A video encoding method comprising the steps of:
determining whether or not to apply a combined prediction mode to a current block;

obtaining a first prediction block and a second prediction block for the current block when the combined prediction mode is applied to the current block, wherein the first prediction block is obtained based on motion information of a merge candidate of the current block, and the second prediction block is obtained based on an intra prediction mode of the current block; and obtaining a third prediction block for the current block based on a weighted sum operation of the first prediction block and the second prediction block, wherein when the combined prediction mode is applied to the current block, triangular partitioning is disabled for the current block.

7. The method according to claim 6, wherein the intra prediction mode of the current block is set to a planar mode.

8. The method according to claim 7, wherein the second prediction block is obtained based on a reference sample line included in an adjacent reference sample line.

9. The method according to claim 6, wherein in performing the weighted sum operation, weighting values applied to the first prediction block and the second prediction block are determined based on prediction modes of neighboring blocks adjacent to the current block.

10. The method according to claim 6, wherein when at least one among a width and a height of the current block is greater than a threshold value, the combined prediction mode is not applied to the current block.

11. A video decoding apparatus comprising: a processor and a memory configured to store a computer program capable of being run on the processor, wherein the processor is configured to determine whether or not to apply a combined prediction mode to a current block, obtain a first prediction block and a second prediction block for the current block when the combined prediction mode is applied to the current block, and obtain a third prediction block for the current block based on a weighted sum operation of the first prediction block and the second prediction block, and the first prediction block is obtained based on motion information of a merge candidate of the current block, and the second prediction block is obtained based on an intra prediction mode of the current block, wherein when the combined prediction mode is applied to the current block, triangular partitioning is disabled for the current block.

12. The video decoding apparatus according to claim 11, wherein the intra prediction mode of the current block is set to a planar mode.

13. The video decoding apparatus according to claim 12, wherein the second prediction block is obtained based on a reference sample line included in an adjacent reference sample line.

14. The video decoding apparatus according to claim 11, wherein in performing the weighted sum operation, weighting values applied to the first prediction block and the second prediction block are determined based on prediction modes of neighboring blocks adjacent to the current block.

15. The video decoding apparatus according to claim 11, wherein when at least one among a width and a height of the current block is greater than a threshold value, the combined prediction mode is not applied to the current block.

16. A video encoding apparatus comprising: a processor and a memory configured to store a computer program capable of being run on the processor, wherein the processor is configured to determine whether or not to apply a combined prediction mode to a current block;

obtain a first prediction block and a second prediction block for the current block when the combined prediction mode is applied to the current block, wherein the first prediction block is obtained based on motion information of a merge candidate of the current block, and the second prediction block is obtained based on an intra prediction mode of the current block; and obtain a third prediction block for the current block based on a weighted sum operation of the first prediction block and the second prediction block, wherein when the combined prediction mode is applied to the current block, triangular partitioning is disabled for the current block.

17. The video encoding apparatus according to claim 16, wherein the intra prediction mode of the current block is set to a planar mode.

18. The video encoding apparatus according to claim 17, wherein the second prediction block is obtained based on a reference sample line included in an adjacent reference sample line.

19. The video encoding apparatus according to claim 16, wherein in performing the weighted sum operation, weighting values applied to the first prediction block and the second prediction block are determined based on prediction modes of neighboring blocks adjacent to the current block.

20. The video encoding apparatus according to claim 16, wherein when at least one among a width and a height of the current block is greater than a threshold value, the combined prediction mode is not applied to the current block.

* * * * *